United States Patent

Poon et al.

[11] Patent Number: 6,144,698
[45] Date of Patent: *Nov. 7, 2000

[54] DIGITAL VIDEO DECODER AND METHOD OF DECODING A DIGITAL VIDEO SIGNAL

[75] Inventors: Tommy C. Poon, Murray Hill; Huifang Sun, Cranbury; Jay Bao, Plainsboro, all of N.J.; Anthony Vetro, Staten Island, N.Y.

[73] Assignee: Mitsubishi Electric Information Technology Center America, Inc. (ITA), Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,124

[22] Filed: Oct. 31, 1996

[51] Int. Cl.$^7$ .................................................... H04N 7/12
[52] U.S. Cl. ......................... 375/240; 348/416; 348/413; 382/233; 382/236; 386/111
[58] Field of Search ..................................... 348/416, 387, 348/390, 384, 400–403, 413, 420, 407, 409, 699; 382/233, 236, 238, 244; 386/27, 33, 109, 111–112; 375/240

[56] References Cited

U.S. PATENT DOCUMENTS

| | | | |
|---|---|---|---|
| 5,043,808 | 8/1991 | Knauer et al. | 348/409 |
| 5,262,854 | 11/1993 | Ng | 348/420 |
| 5,311,310 | 5/1994 | Jozawa et al. | 348/416 |
| 5,408,274 | 4/1995 | Chang et al. | 348/700 |
| 5,576,765 | 11/1996 | Cheney et al. | 348/407 |
| 5,623,312 | 4/1997 | Yan et al. | 348/416 |
| 5,629,736 | 5/1997 | Haskell et al. | 348/387 |
| 5,708,732 | 1/1998 | Merhav et al. | 348/398 |
| 5,727,113 | 3/1998 | Shimoda | 386/68 |
| 5,754,233 | 5/1998 | Takashima | 348/390 |
| 5,796,434 | 8/1998 | Lempel | 348/403 |
| 5,870,147 | 2/1999 | Sugiyama | 348/409 |

OTHER PUBLICATIONS

Assuncao et al, "Fast Computation of MC–DCT for Video Transcoding", Electronics Letters, vol. 33, No. 4, pp. 284–286, Feb. 1997.

Johnson et al, "Frequency Scalable Video Coding Using the MDCT", Telecom Research Laboratories, IEEE, pp. V–477 to V–480, 1994.

Merhav et al, "A Fast Algorithm for DCT–Domain Inverse Motion Compensation", Hewlett–Packard Laboratories, IEEE, pp. 2307–2310, 1996.

(List continued on next page.)

Primary Examiner—Vu Le
Attorney, Agent, or Firm—Dirk Brinkman

[57] ABSTRACT

A digital video decoder and method therefor receives a digital video signal and performs motion compensation on the digital video signal in the frequency domain. The motion compensation is performed by forming, for each inter-coded picture in the digital video signal, a composite picture in the frequency domain representing a reference picture corresponding to the inter-coded picture, and then adding the composite picture to the corresponding inter-coded picture. Each macro block of the composite picture is formed based on corresponding macro blocks of at least one anchor picture stored in memory. The anchor pictures are stored as compressed bits via quantization and variable length coding of frequency domain blocks to reduce required memory capacity. The synthesis technique employed by the compositor to form the composite macro blocks accounts for both field and frame motion compensation with half-pel accuracy. The intra-coded pictures produced as a result of the motion compensation are then reformatted in a display order.

58 Claims, 5 Drawing Sheets

OTHER PUBLICATIONS

Ito et al, "On Motion Compensation of Wavelet Coefficients", University of Maryland College Park, Electrical Engineering Dept., IEEE, pp. 2161–2164, May 1995.

"Frequency–Domain Motion Estimation Using a Complex Lapped Transform", IEEE Trans. on Image Processing, vol. 2, No. 1, pp. 1–17, Jan. 1993.

"Interframe Video Coding Using Overlapped Motion Compensation and Perfect Reconstruction Filter Banks", ICASSP, vol. 4, pp. IV–649 to IV–652, Sep. 1992.

"Manipulation and Compositing of MC–DCT Compressed Video," Chang et al., IEEE, vol. 13, No. 1, Jan. 1995.

Final Technical Report, Federal Comm. Commision, Advisory Committee on Advanced Television Services, Oct. 31, 1995.

"Hierarchical Decoder for MPEG Compressed Video Data," IEEE Trans. on Cons. Electronics, Aug. 1993, vol.39, pp.559–562, H. Sun.

"An SDTV Decoder with HDTV Capability: An All–format ATV Decoder," SMPTE Fall Conf., New Orleans, 1995, Boyce et al.

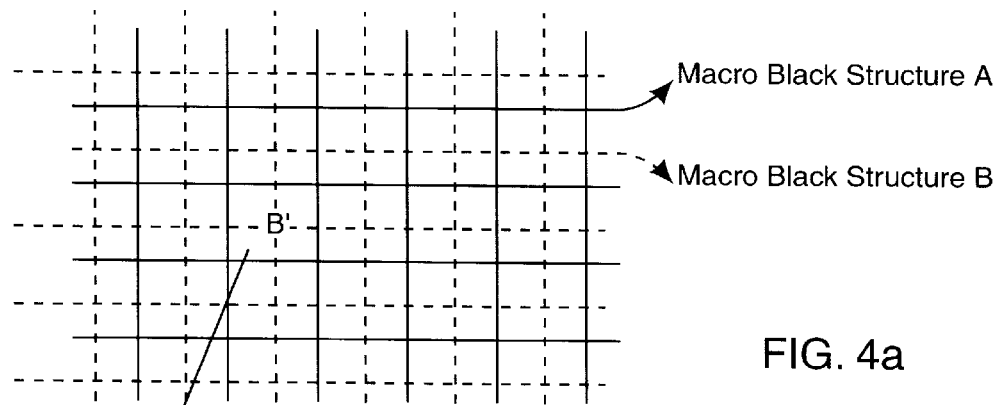
FIG. 4a
Align object B to block structure A
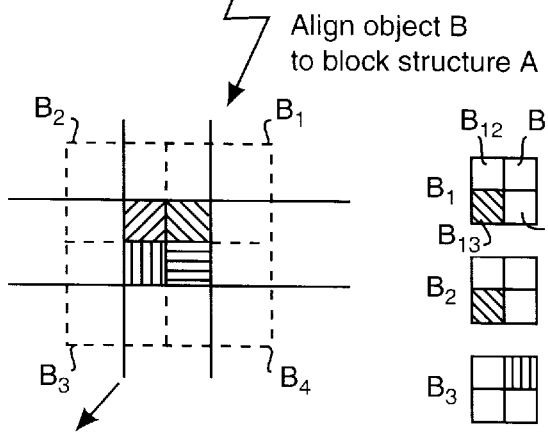
Macro Block Structure A
FIG. 4b
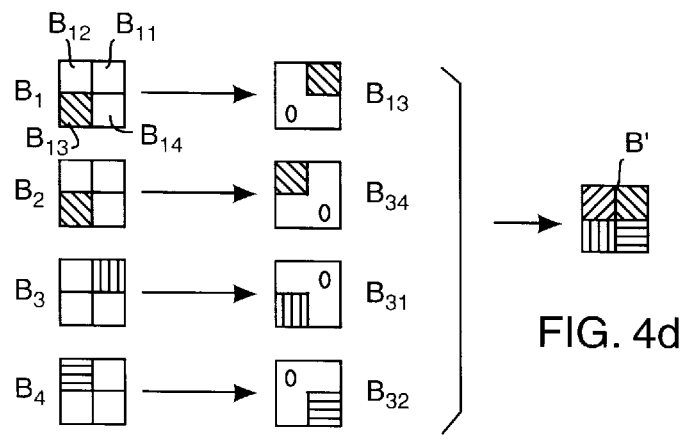
FIG. 4c
FIG. 4d

DIGITAL VIDEO DECODER AND METHOD OF DECODING A DIGITAL VIDEO SIGNAL

BACKGROUND OF THE INVENTION

1. Field of the Invention

The present invention relates to a method and apparatus for decoding a digital video signal.

2. Description of the Related Art

Digital video signal processing is an area of science and engineering that has developed rapidly over the past decade. The maturity of the moving Picture Expert Group (MPEG) video coding standard represents a very important achievement for the video industry and provides strong support for digital compression and other techniques such as digital modulation and packetization, a s well as VLSI technology, the fundamentals of television have been reinvented for the digital age.

The first U.S. digital television transmission standard developed for broadcast of high and low definition television by a Grand Alliance of companies has been proposed to the Federal Communications Commission (FCC). High definition digital television broadcasts are typically referred to as HDTV, while low definition digital television broadcasts are generally referred to as SDTV. These terms will be used throughout this application, but are not tied to a particular format or standard. Instead, these terms are used to cover the high and low definition digital television of any coding standard (e.g., such as for VTRs and television).

In 1994 SDTV broadcasts became a reality when the first digital television services, broadcasted via satellite, went on the air. The Digital Satellite Service (DSS) units developed by Thomson Consumer Electronics, etc. have been distributed to more than 1 million homes. The highly sophisticated methods of transmitting and receiving digital television not only produce higher-quality television broadcasts, but also create new services, such as movies on demand, interactive programming, multimedia applications as well as telephone and computer services through the television.

Soon, HDTV will become a reality and join SDTV. Accordingly, in the near future, expect advanced television (ATV) broadcasts which include co-existent broadcasts of HDTV and SDTV.

When performing, for example, MPEG video encoding of HDTV, image blocks of 8×8 pixels in the spatial domain are converted into 8×8 DCT (discrete cosine transform) blocks of DCT coefficients in the DCT or frequency domain. Specifically, in most coding formats such as MPEG, the HDTV signal is divided into a luminance component (Y) and two chroma components (U) and (V). Furthermore, instead of U and V chroma blocks, some standards use color difference signal chroma blocks. For the purposes of discussion only, U and V chroma blocks will be used. Most formats such as MPEG specify different encoding sequences. In each encoding sequence a sequence header identifies the encoding sequence. Furthermore, in each encoding sequence, macro blocks of 8×8 DCT blocks of DCT coefficients are formed.

Encoding sequences for HDTV typically include the 4:2:0 encoding sequence, the 4:2:2 encoding sequence, and the 4:4:4 encoding sequence. In the 4:2:0 encoding sequence a macro block consists of four 8×8 luminance DCT blocks, one 8×8 U chroma DCT block, and one 8×8 V chroma DCT block. In the 4:2:2 encoding sequence a macro block consists of four 8×8 luminance DCT blocks, two 8×8 U chroma DCT blocks, and two 8×8 V chroma DCT blocks. Finally, in the 4:4:4 encoding sequences a macro block consists of four 8×8 luminance DCT blocks, four 8×8 U chroma DCT blocks, and four 8×8 V chroma DCT blocks. SDTV includes similar coding sequences, but the DCT blocks are 4×4 DCT blocks.

Besides variable length encoding, many standards such as MPEG provide for intra- and inter-coding. Intra-coding is where a field or frame of the digital video signal, referred to as a picture, is encoded based on the pixels therein. Several well known techniques exist for intra-coding. An intra-coded picture is typically referred to as an I-picture.

Inter-coding, sometimes referred to as predictive encoding, is where a picture is encoded based on a reference picture, referred to as an anchor picture. In inter-coding, each macro block (i.e., related luminance and chroma blocks) of the picture being encoded is compared with the macro blocks of the anchor picture to find the macro block of the anchor picture providing the greatest correlation therewith. The vector between the two macro blocks is then determined as the motion vector. The inter-coded digital video signal for the macro block being encoded will then include the motion vector and the differences between the macro block being encoded and the corresponding macro block of the anchor picture providing the greatest correlation.

For example, a series of pictures may have the display order $I_1 B_1 B_2 P_1 B_3 B_4 P_2 B_5 B_6 P_3 B_7 B_8 I_2$ .... The transmitted HDTV signal, however, will have the pictures arranged in the order of encoding as follows: $I_1 P_1 B_1 B_2 P_2 B_3 B_4 P_3 B_5 B_6 I_2 B_7 B_8$. P-pictures are encoded using the previous I-picture or P-picture as the anchor picture. In the above example, P-pictures $P_1$, $P_2$, and $P_3$ were encoded using I-picture $I_1$, P-picture $P_1$, and P-picture $P_2$, respectively, as the anchor picture.

The B-pictures may be forward encoded, backward encoded, or bi-directionally encoded. For instance, if B-picture $B_1$ was encoded using I-picture $I_1$ as the anchor picture, then B-picture $B_1$ is backward or back encoded. Alternatively, if B-picture $B_1$ was encoded using P-picture picture $P_1$ as the anchor picture, then B-picture $B_1$ is forward encoded. If B-picture $B_1$ was encoded using both I-picture $I_1$ and P-picture $P_1$ (typically a weighted average thereof) as anchor pictures, then B-picture $B_1$ is bi-directionally encoded.

The headers in the digital video signal indicate whether pictures are I, B, or P-pictures and the direction of encoding. These headers also indicate the group of picture (GOP) size N and the distance between anchor pictures M. The GOP size indicates the distance between I-pictures, which in the above example would be N=12. Since I-pictures and P-pictures are anchor pictures, the distance between anchor pictures in the above example would be M=3. Based on the information provided in the headers, the digital video signal can be properly decoded.

Unfortunately, conventional decoders must store two complete anchor pictures in the spatial domain to decode a digital video signal. Consequently, the memory requirements for conventional decoders are quite larger. Because the memory requirements of a digital decoder account for a large part of the overall device cost, the large memory requirements of conventional digital decoders adversely impacts the cost of such devices.

SUMMARY OF THE INVENTION

An object of the present invention is to provide a method and apparatus for decoding digital signals which overcomes the drawbacks of conventional decoders.

Another object of the present invention is to provide a method and apparatus for decoding digital signals which requires significantly less memory than conventional decoders.

The method and apparatus for decoding a digital video signal according to the present invention achieves the above objectives by decoding the digital video signal in the frequency domain. More specifically, in performing motion compensation to decode inter-coded pictures into intra-coded picture, the present invention stores two anchor pictures in the frequency domain as opposed to the spatial domain. Furthermore, the stored anchor picture shave been both quantized and variable length coded to further educe the amount of memory required to store the anchor pictures. The digital decoder further includes a compositer which produces composite macro blocks which, when added to an inter-coded macro block, form an intra-coded macro block. Using a synthesis technique which accounts for field and frame motion compensation, as well as, full and half-pel accuracy, the compositor forms the composite macro blocks entirely by processing anchor picture macro blocks in the frequency domain. Accordingly, the need for inverse frequency and frequency (e.g., DCT) converters has been eliminated.

The objectives of the present invention are achieved by providing an apparatus for decoding a digital video signal, comprising: motion compensation means for receiving a digital video signal and performing motion compensation on said digital video signal in the frequency domain; and a reformatter reformatting pictures in said digital video signal output by said motion compensation means such that said pictures are in a display order.

The objectives of the present invention are further achieved by providing a motion compensation means which forms, for each inter-coded picture in said digital video signal, a composite picture in said frequency domain representing a reference picture corresponding to said inter-coded picture, and adds said composite picture to said inter-coded picture to perform said motion compensation.

The objectives of the present invention are still further achieved by providing an apparatus for decoding a digital video signal, comprising: a converter receiving a digital video signal and converting, in the frequency domain, inter-coded pictures in said digital video signal into intra-coded in said digital video reformatter reformating pictures in said digital video signal output by said converter such that said pictures are in a display order.

The objectives of the present invention are also achieved by providing a method for decoding a digital video signal, comprising: (a) receiving a digital video signal; (b) performing motion compensation on said digital video signal in the frequency domain; and (c) reformatting pictures in said digital video signal output by said step (b) such that said pictures are in a display order.

The objectives of the present invention are additionally achieved by providing the above method wherein step (b) comprises the steps of: (b1) forming, for each inter-coded picture in said digital video signal, a composite picture in said frequency domain representing a reference picture corresponding to said inter-coded picture; and (b2) adding said composite picture to said inter-coded picture to perform said motion compensation.

The objectives of the present invention are further achieved by providing a method for decoding a digital video signal, comprising: (a) receiving a digital video signal; (b) converting, in the frequency domain, inter-coded pictures in said digital video signal into intra-coded pictures; and (c) reformatting pictures in said digital video signal output by said step (b) such that said pictures are in a display order.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A–4D illustrate the formation of a composite macro block in the spatial domain.

DETAILED DESCRIPTION OF THE PREFERRED EMBODIMENTS

Figure 1:
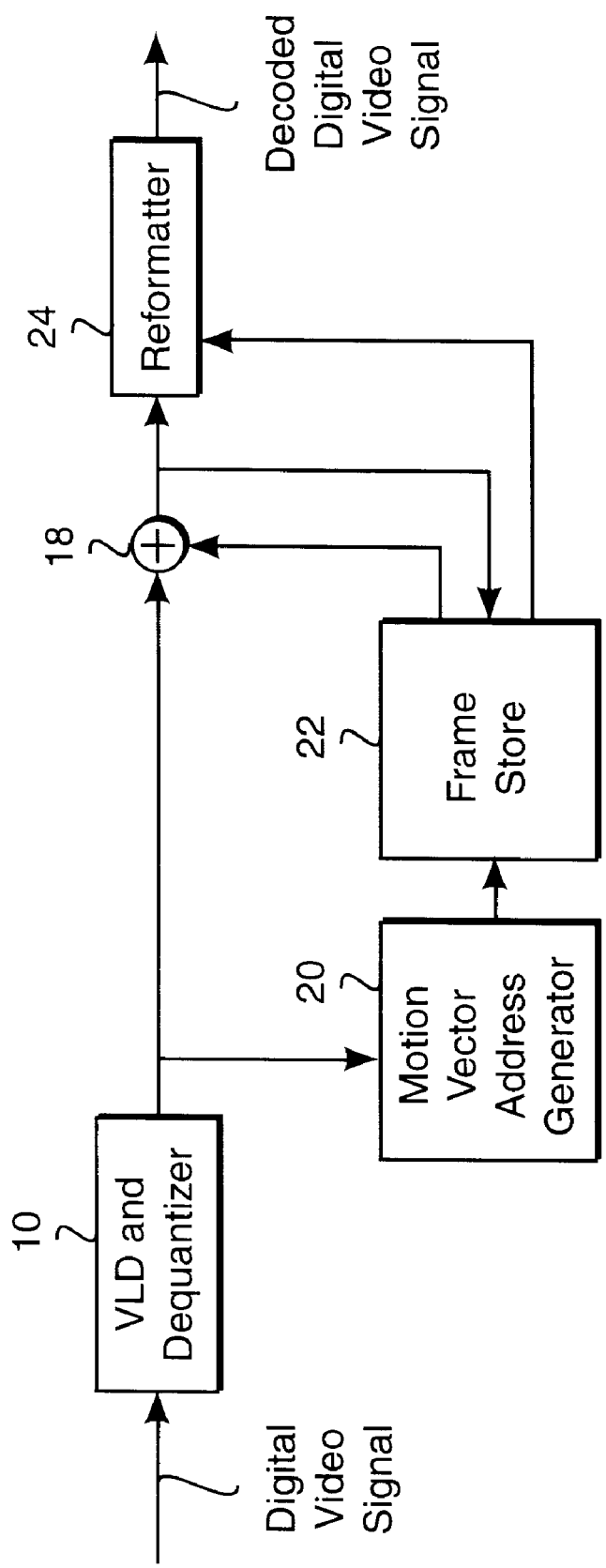
FIG. 1 illustrates a conventional apparatus for decoding digital video signals.

More particularly, with respect to the prior art, FIG. 1 illustrates a conventional decoder for decoding digital video signals. As shown in FIG. 1, a variable length decoder and dequantizer 10 receives a digital signal. A motion vector address generator 20 and an adder 18 are connected to the output of the variable length decoder and dequantizer 10. The motion vector address generator 20 sends output to a frame store 22. The frame store 22 has a first output connected to the adder 18 and a second output connected to the reformatter 24. Additionally, the frame store 22 has an input connected to the output of the adder 18. Besides the output of the frame store 22, the reformatter 24 also receives the output of the adder 18.

The operation of the conventional decoder illustrated in FIG. 1 will now be described. The variable length decoder and dequantizer 10 receives the digital video signal, and variable length decodes and dequantizes the digital video signal. The output of the VLD and dequantizer 10 is received by a motion vector address generator 20. The motion vector address generator 20 identifies the motion vectors for inter-coded pictures, and generates motion vector addresses corresponding thereto. The motion vector addresses are output to the frame store 22. The frame store 22 stores the two previous anchor pictures (e.g., I or P-pictures). The frame store 22 will output the macro blocks of an anchor picture addressed by the motion vector addresses. These macro blocks are received by an adder 18. The adder 18 also receives the output of the variable length decoder and dequantizer 10. Consequently, when a B or P-picture is being decoded, a complete I-picture can be obtained by adding the output of the variable length decoder and dequantizer 10, which represents the differences between the picture and an anchor picture, with the anchor picture to create a complete picture. When an I-picture is output from the variable length decoder and dequantizer 10, there is no need to add anchor picture information thereto, consequently the frame store 22 will not send output to the adder 18.

As discussed above, when B-pictures are bi-directionally encoded, a weighted average of two anchor frames is used to inter-code these pictures. The weighting is encoded into the motion vectors by the original encoder. When the frame store 22 receives the two motion vectors, the anchor frame macro blocks pointed thereby are averaged by the frame store 22 to form the weighted average macro block. The frame store 22 then outputs the weighted average macro block to the adder 18.

The frame store 22 also monitors the output of the output of the adder 18. When the frame store 22 determines that the adder 18 outputs an I or P-picture, the frame store 22 replaces the oldest stored anchor frame with the I or P-picture output by the adder 18.

The operation of forming I-pictures from B and P-pictures is referred to as motion compensation. When the pictures are frames, frame motion compensation is performed. When the pictures are fields, field motion compensation is performed. During original encodation, inter-coded even and odd fields are encoded independently based on either the even or odd fields of a previous frame.

The output of the adder 18 is received by a reformatter 24. The reformatter 24 is also connected to the frame store 22. Since the transmission, and therefore, reception order of the pictures is not in the proper display order, the reformatter 24 operates to reformat the order of the pictures into the proper display order.

To better understand the operation of the reformatter 24 illustrated in FIG. 1, assume that a digital video signal such as discussed above is received. The reformatter 24 determines what output should be sent as the decoded digital video signal according to the following rules: (1) if the picture received is the first anchor pictures received then no output will be sent; (2) if the picture received is an anchor picture but no the first anchor picture received, then the previously received anchor picture will be output; and (3) if the picture received is a B-picture, then the B-picture will be immediately output.

Therefore, upon receipt of I-picture $I_1$, the reformatter 24 will not send any output. The next picture received will be P-picture $P_1$. The adder 18 will then receive the output of the variable length decoder and dequantizer 10 and macro blocks from the I-picture $I_1$ pointed to by the motion vectors detected by motion vector detector 20. Consequently, the adder 18 will generate a complete picture. Since this complete picture is an anchor picture, the frame store 22 will then store the complete picture $P_1$. According to the rules discussed above, the reformatter 24 will then output from the frame store 22 the I-picture $I_1$ (i.e., the previous anchor picture).

The next two pictures received are B-pictures $B_1$ and $B_2$. Complete pictures will be formed from these B-pictures in the same manner as discussed above with respect to P-picture $P_1$, except that, depending on the direction of encoding, either the I-picture $I_1$ and/or the P-picture $P_1$ will be used as the anchor picture. Since the adder 18 outputs a B-picture, the reformatter 24 will immediately output the B-picture. Consequently, the output from the reformatter 24 will be $I_1B_1B_2$.

Next, the P-picture $P_2$ is received and processed in the same manner as P-picture $P_1$. When the adder 18 outputs the complete P-picture $P_2$, the frame store 22 will replace the I-picture $I_1$ with the P-picture $P_2$. The reformatter 24, according to the rules discussed above, will then output the P-picture $P_1$. In this manner, the reformatter 24 will output the pictures in the proper display order.

As previously mentioned, the conventional digital video decoder of prior art FIG. 1 unfortunately requires storing two anchor pictures in the spatial domain to decode a digital video signal. Consequently, the memory requirement for the digital video decoder of FIG. 1 is quite large.

Figure 2:
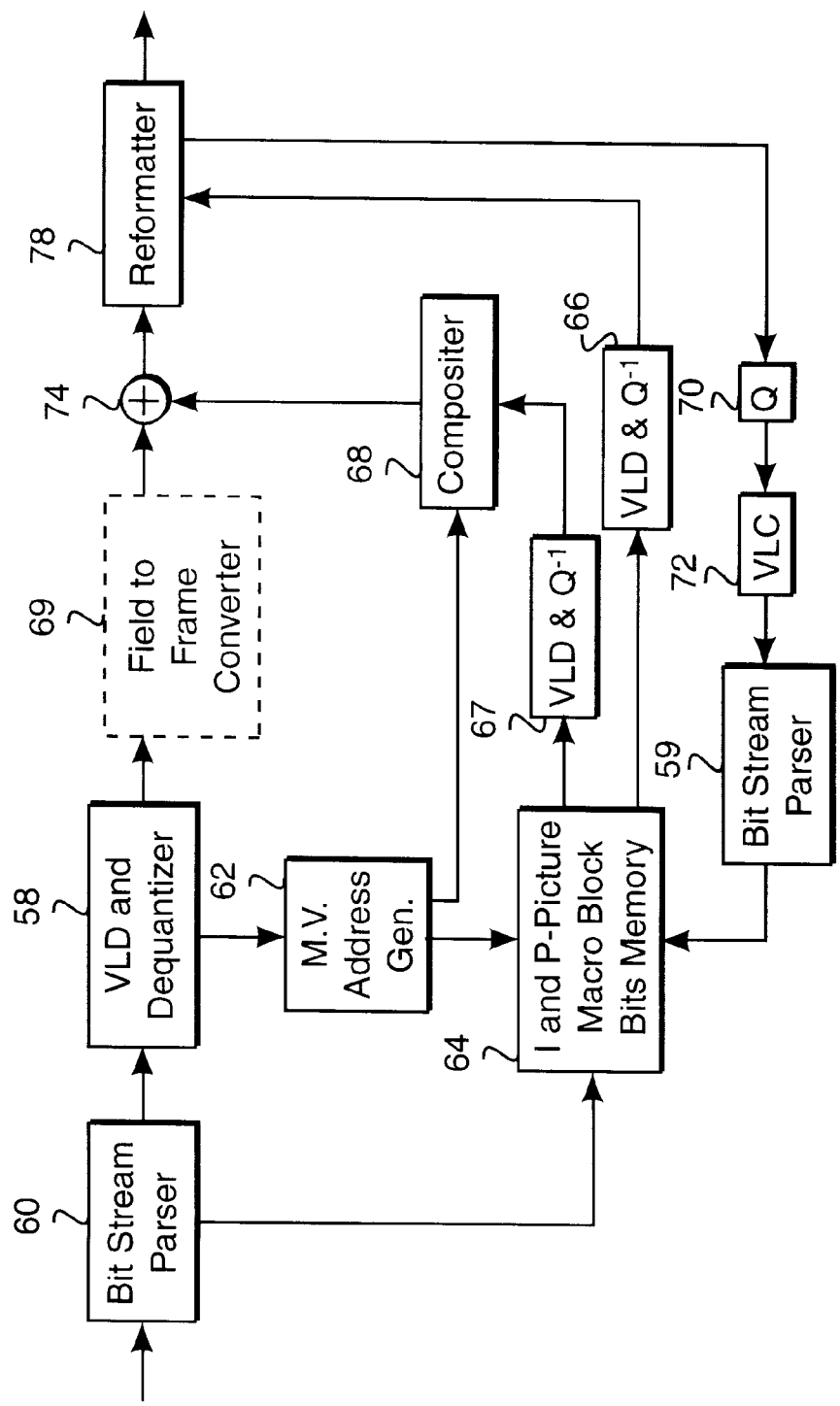
FIG. 2 illustrates an apparatus, according to the present invention, for decoding digital video signals.

FIG. 2 illustrates an apparatus according to the present invention for decoding digital video signals. In contrast to the conventional digital video decoder of FIG. 1, the digital video decoder according to the present invention does not require memory capacity sufficient to store two anchor pictures in the spatial domain. Instead, the digital video decoder of FIG. 2 converts inter-coded pictures into I-pictures in the frequency or DCT domain.

Accordingly, the digital video decoder of FIG. 2 only requires storing two anchor pictures in the frequency domain. Additionally, the digital video decoder of FIG. 2 stores the variable length coded and quantized versions of these frequency domain anchor pictures. As a result, the memory requirements for storing these anchor pictures as compared to FIG. 1 are considerably reduced. The inventors estimate that the memory requirements of the digital video decoder of FIG. 2 are at least one-third less than the memory requirements for the prior art digital video decoder illustrated in FIG. 1. Since the requisite memory capacity for a digital video decoder is a large component of the cost therefore, this reduction in memory capacity results in a significant decrease in the cost of the resulting device.

The digital video decoder illustrated in FIG. 2 receives a digital video signal including intra-coded and inter-coded pictures, and outputs a digital video signal comprised of intra-coded pictures only. As illustrated in FIG. 2, the digital video signal to be decoded is received by a bit stream parser 60. A variable length decoder and dequantizer 58 receives one of the outputs of the bit stream parser 60. The variable length decoder and dequantizer 58 outputs pictures to an adder 74 and outputs motion vectors to a motion vector address generator 62. As indicated by dashed lines, the variable length decoder and dequantizer 58 outputs pictures to the adder 74 via an optional field-to-frame converter 69. Both the bit stream parser 60 and the motion vector address generator 62 supply output signals to an I and P-picture macro block bits memory 64 (hereinafter referred to as "memory 64"). A variable length decoder and dequantizer 67 is connected to an output of the memory 64, and has an output thereof connected to a compositer 68. Another variable length decoder and dequantizer 66 is connected to an output of the memory 64, and has an output thereof connected to the reformatter 78.

The compositer 68 also receives an output from the motion vector address generator 62. Besides receiving the output of the variable length decoder and dequantizer 58, the adder 74 also receives the output of the compositer 68. The output of the adder 74 is connected to the reformatter 78, and one of the outputs of the reformatter 78 serves as the output of the reformatter 78 is received by a quantizer 70 within the I-picture converter 76. A variable length encoder 72 is connected to the output of the quantizer 70, and a bit stream parser 59 is connected to the output of the variable length encoder 72. The bit stream parser 59 supplies another input of the memory 64.

It should be understood that in FIG. 2 the various data paths have been represented in greatly simplified form for clarity. In reality, many separate data paths into and out of the various components are required. Additionally, many data and control lines have been omitted entirely from FIG. 2 for clarity.

The operation of the embodiment illustrated in FIG. 2 will now be described. As discussed above, the digital video decoder receives a digital video signal, and converts all inter-coded pictures therein into I-pictures. For purposes of discussion, assume that the digital video signal to be decoded has the order of encodation as follows: $I_1P_1B_1B_2P_2B_3B_4P_3B_5B_6I_2B_7b_8$, and when displayed, these pictures have the display order of $I_1B_1B_2P_1B_3B_4P_2B_5B_6P_3B_7B_8I_2$.

As discussed above, a digital video signal including inter-coded pictures includes both picture data and a motion vector corresponding thereto. The bit stream parser 60 receives the digital video signal, and parses out the header information for each anchor picture. The header information includes the picture type, the picture timing stamp PTS, the slice header etc. The header information for each anchor picture is output by the bit stream parser 60 to the memory 64. The memory 64 stores the header information on a picture-by-picture basis. The bit stream parser 60 also outputs the digital video signal to the variable length decoder and dequantizer 58.

The variable length decoder and dequantizer 58 receives the digital video signal, variable length decodes and dequantizes the digital video signal, sends the decoded digital video signal to the adder 74, and sends the motion vectors to the motion vector address generator 62. When the pictures of the digital video signal could include fields, as opposed to, or in addition to frames, the digital video decoder includes a field-to-frame converter 69 which converts the separate even and odd fields for a frame into a single frame. This is accomplished by simple interlacing the even and odd fields.

As discussed in more detail below, the compositer 68 produces a composite macro block based on the output of the motion vector address generator 62 and the macro blocks output by the memory 64. The adder 74 adds the composite macro block to the macro block of the picture data currently output by the variable length decoder and dequantizer 58, or optionally the field-to-frame converter 69, to reconstruct a complete macro block. In this manner, both P-pictures and B-pictures are converted into I-pictures.

Of course, if an I-picture is currently being output by the variable length decoder and dequantizer 58, then the adder 74 will not receive anything from the compositer 68 to add thereto. The motion vector address generator 62 will have recognized the I-picture as an I-picture and disabled the compositer 68 from sending output to the adder 74.

As discussed in detail below, when the adder 74 outputs I-pictures or I-pictures which were formally P-pictures, the reformatter 78 outputs these anchor pictures to the memory 64 for storage via the quantizer 70, the variable length encoder 72, and the bit stream parser 59. The memory 64 only stores two anchor pictures at a time, and will replace the oldest stored anchor picture with the newly received anchor picture. Specifically, the I and P-pictures (i.e., anchor pictures) in I-picture format output from the reformatter 78 to the memory 64 are quantized by the quantizer 70, and variable length encoded by the variable length encoder 72.

Because variable length coding is lossless coding, only the distortion caused by the quantization step needs to be accounted for by the quantizer 70. Furthermore, tests have shown that if the quantizer 70 quantizes the anchor frames using the quantization scale determined by the original encoder, no noticeable distortion is introduced. The elimination of distortion, however, can be assured by performing quantization as discussed in detail below. Assuming that Q is the quantization scale determined by the original encoder, I is the intra macro block data before quantization and I' is the data after quantization, then $$I' = \left[\frac{I}{Q}\right] \cdot Q \quad (1)$$

where the operation [.] is an integer operator, and I' can be seen as the reconstructed data.

Assume that $Q_r$, is the quantizations scale used in the requantization, and I" is the data obtained after requantization, then $$I'' = \left[\frac{I'}{Qr}\right] \cdot Qr = \left[\left[\frac{I}{Q}\right] \cdot \frac{Q}{Qr}\right] \cdot Qr = \left[\frac{I}{Q}\right] \cdot \left[\frac{Q}{Qr}\right] \cdot Qr \quad (2)$$

and, therefore, $$I'' = \left[\frac{I}{Q}\right] \cdot Q = I', \text{if } \left[\frac{Q}{Qr}\right] = \text{integer} \quad (3)$$

In other words, if the requantization scale is chosen as an integer times the original quantization scale, requantization will not cause any additional distortion.

For uni-directionally inter-coded macro blocks (i.e., macro blocks from P-picture, $$P' = I' + E', \quad (4)$$

where P' is the reconstructed data of the inter-coded macro block from the P-picture, I' represents the reconstructed reference data for motion-compensation (i.e., the composite macro block) and E' is the reconstructed prediction error (i.e., the macro block from the variable length decoder and dequantizer 58). Let Qi be the quantizer for I', Qp for P' and Qe for E', then expression (4) can be re-written as:

$$P' = \left[\frac{P}{Qp}\right] \cdot Qp = \left[\frac{I}{Qi}\right] \cdot Qi + \left[\frac{E}{Qe}\right] \cdot Qe \quad (5)$$

After requantization with quantizer scale Qr, $$P'' = \left[\frac{P}{Qr}\right] \cdot Qr = \left[\left[\frac{I}{Qi}\right] \cdot \frac{Qi}{Qr} + \left[\frac{P}{Qp}\right] \cdot \frac{Qp}{Qr}\right] \cdot Qr \quad (6)$$

where P" is the requantized reconstructed data. Accordingly, $$P'' = \left[\frac{I}{Qi}\right] \cdot Qi + \left[\frac{E}{Qe}\right] \cdot Qe = P', \quad (7)$$

provided that both, $$\frac{Qi}{Qr} = \text{integer}, \quad \frac{Qe}{Qr} = \text{integer} \quad (8)$$

are satisfied. Therefore, if Qr is chosen according to the following expression, there is no additional distortion caused by the process of requantizing uni-directionally inter-coded macro blocks.

$$Qr = GCD(Qi, QE), \quad (9)$$

where GCD stands for greatest common division. If the distortion eliminating equations are utilized by the quantizer 70, then the quantizer 70 may need to perform bit rate control to obtain the original bit rate of the digital video signal. This bit rate control can be performed using any well-known bit rate control technique.

Using the various headers within the digital video signal, the bit stream parser 59 identifies each macro block in an anchor picture. The bit stream parser 59 then separates the macro blocks for the anchor picture, and stores them in the memory 64. These anchor frames are stored in the DCT domain and have been variable length encoded and quantized. Consequently, the memory 64 can be much smaller than the memory needed to implement the frame store 22.

Figure 3:
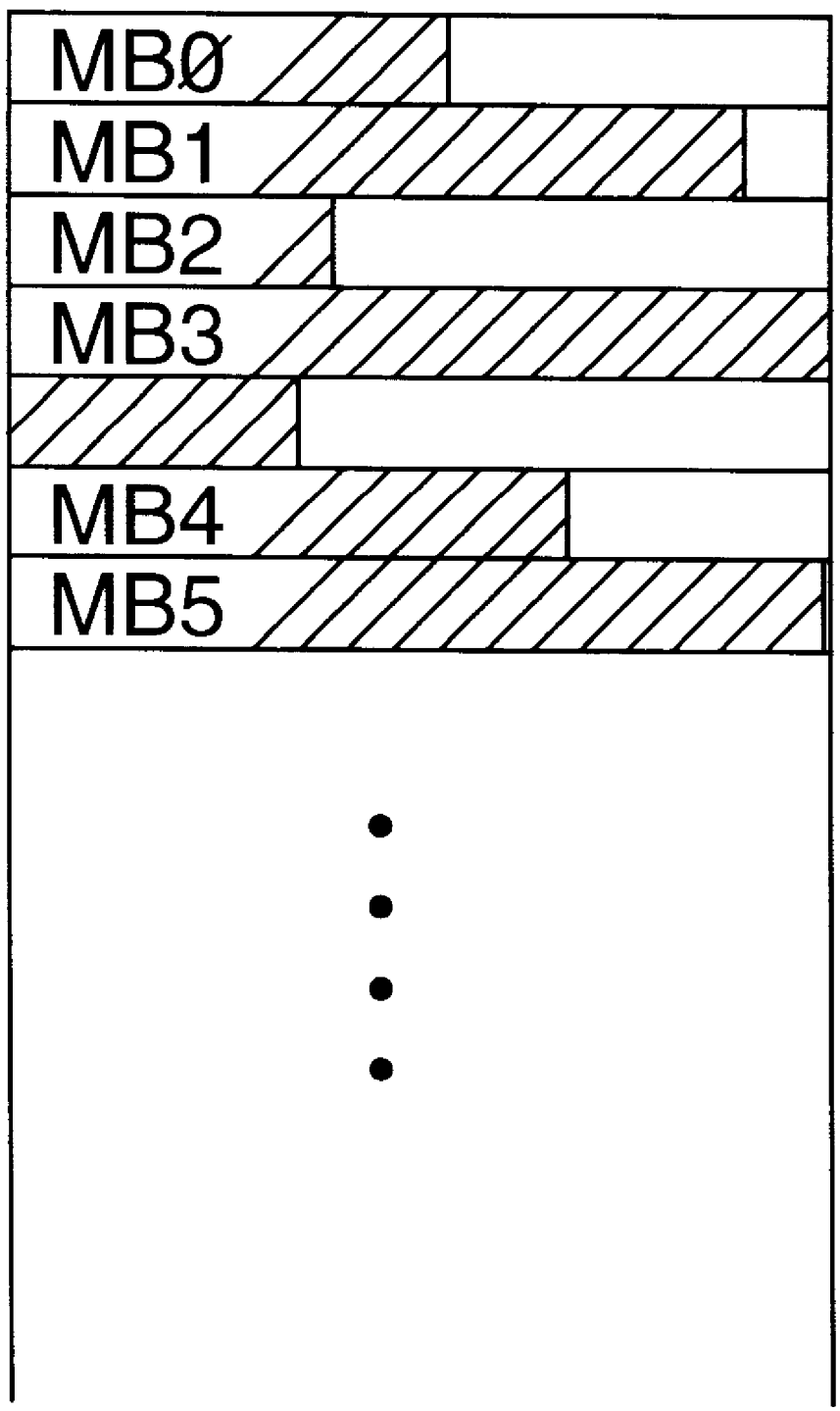
FIG. 3 illustrates an embodiment of the memory in the digital video signal decoder of FIG. 2.

One possible embodiment of memory 64 is illustrates in FIG. 3. As shown in FIG. 3, the memory 64 resembles a memory stack. Each location in the memory stack only stores the data for one macro block. Because the macro blocks are variable length encoded and quantized, the macro blocks can be variable lengths. As illustrated, the macro block HB0 takes up only a portion of the first stack location, the same with macro blocks MB2 and MB2. The fourth macro block MB3, however, contains more data than a single stack location. In this instance, the macro block MB3 fills up an entire stack location and a portion of another stack location. The macro block MB4 following macro block MB3 is then stored in the next stack location. Accordingly, each macro block stored in the memory 64 will be stored beginning in a new stack location. In this manner, each macro block can be stored and retrieved independently of the other macro blocks. Preferably the memory 64 includes two such stacks for storing the macro blocks of two anchor frames. Alternatively, a single, large stack could be divided in half. Furthermore, the memory 64 links the macro blocks of an anchor picture to the previously stored header information therefor.

In the embodiment of FIG. 1, the macro blocks of the anchor pictures (I-pictures and P-pictures) used to form a complete picture were stored in the spatial domain. Accordingly, if the motion vectors caused a shift in the block structure of the anchor picture, the data for the new macro blocks could be easily obtained from the original macro block structure for the anchor picture as discussed in "Manipulation and Compositing of MC-DCT compressed Video" by Shih-Fu Chang, IEEE Journal on Selected Areas in Communication, Vol. 13, No. 1, January 1995 (hereinafter "the Chang article"); which is hereby incorporated by reference.

For instance, as discussed in the Chang article, FIG. 4A illustrates a macro block structure B shown by dashed lines and a macro block structure A illustrated by solid lines. Assume that the macro block structure B represents the macro block structure of an anchor picture stored in frame store memory 22 of FIG. 1, and that the macro block structure A represents the macro block structure as indicated by the motion vector supplied to the frame store memory 22. If the macro block indicated by the motion vector is the macro block indicated as B' in FIG. 4A, then the macro block is simply formed from the data of the four macro blocks in the macro block structure B such as shown in FIGS. 4B–4D. Since the macro blocks are stored in the spatial domain, that portion of the macro block structure B forming the macro block B' in the macro block structure A can simply be read out. Think of it as a picture on a display screen and a window is simply moved about that display screen.

By contrast, macro blocks in the frequency domain (i.e., DCT blocks) do not operate in the same fashion. Instead, the DCT coefficients represent different frequency components of the corresponding macro block in the spatial domain. Namely, the new macro block B' contains contributions from the lower left corner $B_{13}$ of block $B_1$, the lower right corner $B_{24}$ of macro block $B_2$, the upper right corner $B_{31}$ of block $B_3$ and the upper left corner $B_{42}$ of macro block $B_4$. While in the spatial domain, the four contributions can be supplemented by zeros as shown in FIG. 4C and added according to the equation $B' = B_{13} + B_{24} + B_{31} + B_{42}$ as shown in FIG. 4D, this same method cannot be applied in the DCT domain. Instead, as discussed in the Chang article, the DCT macro block B' can be calculated according to the following expression:

$$DCT(B') = \sum_{i=1}^{4} DCT(H_{i1})DCT(B_i)DCT(H_{i2}). \quad (10)$$

where $H_1 = \begin{bmatrix} 0 & 0 \\ I_h & 0 \end{bmatrix} H_2 = \begin{bmatrix} 0 & I_w \\ 0 & 0 \end{bmatrix}$ where $I_h$ and $I_w$ are identity matrices with size h×h and w×w, respectively; and h and w are the number of rows and columns extracted.

Formation of Composite Macro Block

In a preferred embodiment, however, a different set of expressions is used to determine the composite macro block. First the formation of a composite macro block to perform frame-motion compensation will be described. Field-motion compensation will be described thereafter.

Frame-Motion Compensation Full Pixel Accuracy

Figure 5:
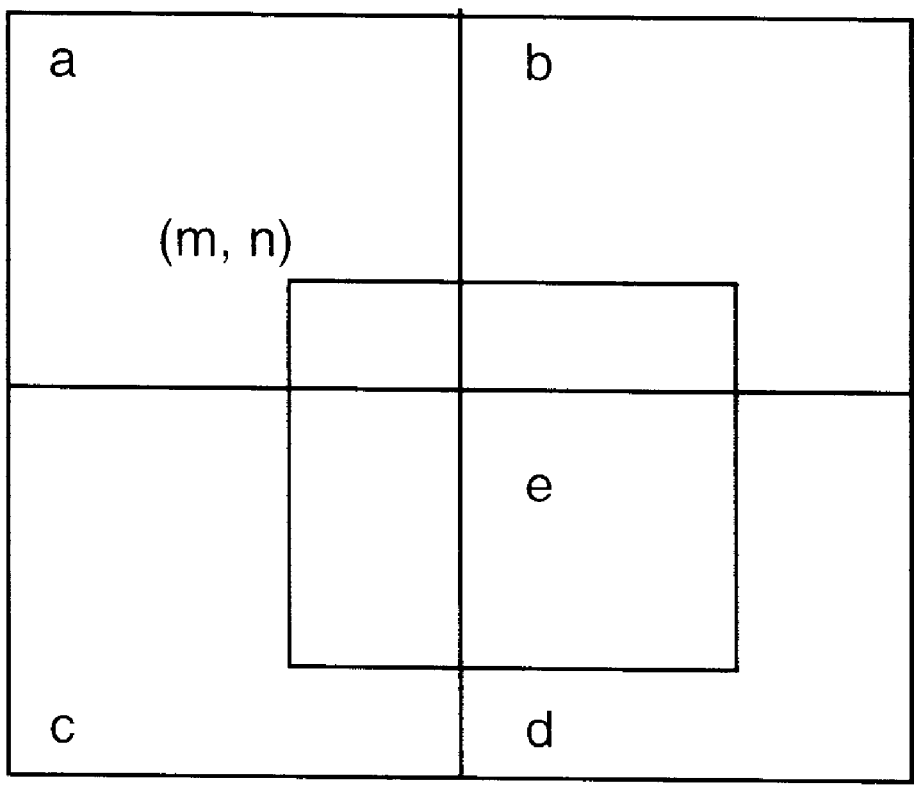
FIG. 5 illustrates a composite macro block with respect to anchor frame macro blocks.

FIG. 5 illustrates macro blocks a, b, c and d from the anchor frame in the spatial domain, and block e the macro block pointed to by the motion vector, albeit in the spatial domain. As shown in FIG. 5, the macro block e has an upper left hand coordinate of (m,n). The motion vector received by the motion vector address generator 62 points to this coordinate (m,n). Based on the motion vector, the motion vector address generator 62 instructs the memory 64 as to which macro blocks of the anchor frame to output to the composite 68. The motion vector address generator 62 also outputs a signal to the composite 68 indicating the coordinate (m,n).

Macro blocks a, b, c, d and e have the relationship shown below by expression (44).

$$e_{ij} = \begin{cases} a_{i+m,j+n} & 0 \le i \le 7-m; \ 0 \le j \le 7-n \\ b_{i+m,j+n-8} & 0 \le i \le 7-m; \ 8-n \le j \le 7 \\ c_{i+m-8,j+n} & 8-m \le i \le 7; \ 0 \le j \le 7-n \\ d_{i+m-8,j+n-8} & 8-m \le i \le 7; \ 8-n \le j \le 7 \end{cases} \quad (11)$$

For instance, if (m,n=2,3) then whereas if (m,n)=(6,5) then $$e_{ij} = \begin{bmatrix} a_{2,3} & a_{2,4} & a_{2,5} & a_{2,6} & a_{2,7} & b_{2,0} & b_{2,1} & b_{2,2} \\ a_{3,3} & a_{3,4} & a_{3,5} & a_{3,6} & a_{3,7} & b_{3,0} & b_{3,1} & b_{3,2} \\ a_{4,3} & a_{4,4} & a_{4,5} & a_{4,6} & a_{4,7} & b_{4,0} & b_{4,1} & b_{4,2} \\ a_{5,3} & a_{5,4} & a_{5,5} & a_{5,6} & a_{5,7} & b_{5,0} & b_{5,1} & b_{5,2} \\ a_{6,3} & a_{6,4} & a_{6,5} & a_{6,6} & a_{6,7} & b_{6,0} & b_{6,1} & b_{6,2} \\ a_{7,3} & a_{7,4} & a_{7,5} & a_{7,6} & a_{7,7} & b_{7,0} & b_{7,1} & b_{7,2} \\ c_{0,3} & c_{0,4} & c_{0,5} & c_{0,6} & c_{0,7} & d_{0,0} & d_{0,1} & d_{0,2} \end{bmatrix}$$

$$e_{ij} = \begin{bmatrix} a_{6,5} & a_{6,6} & a_{6,7} & b_{6,0} & b_{6,1} & b_{6,2} & b_{6,3} & b_{6,4} \\ a_{7,5} & a_{7,6} & a_{7,7} & b_{7,0} & b_{7,1} & b_{7,2} & b_{7,3} & b_{7,4} \\ c_{0,5} & c_{0,6} & c_{0,7} & d_{0,0} & d_{0,1} & d_{0,2} & d_{0,3} & d_{0,4} \\ c_{1,5} & c_{1,6} & c_{1,7} & d_{1,0} & d_{1,1} & d_{1,2} & d_{1,3} & d_{1,4} \\ c_{2,5} & c_{2,6} & c_{2,7} & d_{2,0} & d_{2,1} & d_{2,2} & d_{2,3} & d_{2,4} \\ c_{3,5} & c_{3,6} & c_{3,7} & d_{3,0} & d_{3,1} & d_{3,2} & d_{3,3} & d_{3,4} \\ c_{4,5} & c_{4,6} & c_{4,7} & d_{4,0} & d_{4,1} & d_{4,2} & d_{4,3} & d_{4,4} \\ c_{5,5} & c_{5,6} & c_{5,7} & d_{5,0} & d_{5,1} & d_{5,2} & d_{5,3} & d_{5,4} \end{bmatrix}$$

Assume that arrays A, B, C, D and E are the corresponding DCT macro blocks of macro blocks a, b, c, d and e, respectively. Accordingly, E and e have the relationship shown in expression (12) below.

$$E_{kl} = \sum_{i=0}^{7}\sum_{j=0}^{7} e_{ij} \cdot \cos(2i+1)k\frac{\pi}{16} \cdot \frac{(2j+1)l\pi}{16} \quad (12)$$

Substituting a, b, c and d in for e in expression (12) based on expression (11) results in expression (13) below.

$$E_{kl} = \sum_{i=0}^{7-m}\sum_{j=0}^{7-n} a_{i+m,j+n} \cdot \cos(2i+1)k\frac{\pi}{16} \cdot \cos(2j+1)l\frac{\pi}{16} + \quad (13)$$

$$\sum_{i=0}^{7-m}\sum_{j=8-n}^{7} b_{i+m,j+n-8} \cdot \cos(2i+1)k\frac{\pi}{16} \cdot \cos(2j+1)l\frac{\pi}{16} +$$

$$\sum_{i=8-m}^{7}\sum_{j=0}^{7-n} c_{i+m-8,j+n} \cdot \cos(2i+1)k\frac{\pi}{16} \cdot \cos(2i+1)l\frac{\pi}{16} +$$

$$\sum_{i=8-m}^{7}\sum_{j=8-n}^{7} d_{i+m-8,j+n-8} \cdot \cos(2i+1)k\frac{\pi}{16} \cdot \cos(2j+1)l\frac{\pi}{16} =$$

$$\sum_{i=0}^{7-m}\sum_{j=0}^{7-n} a_{i+m,j+n} \cdot \cos(2i+1)k\frac{\pi}{16} \cdot \cos(2j+1)l\frac{\pi}{16} +$$

$$\sum_{i=0}^{7-m}\sum_{j=0}^{n-1} b_{i+m,j+n-8} \cdot \cos(2i+1)k\frac{\pi}{16} \cdot \cos(2(j-n)+17)l\frac{\pi}{16} +$$

$$\sum_{i=0}^{m-1}\sum_{j=0}^{7-n} c_{i+m-8,j+n} \cdot \cos(2(i-m)+17)k\frac{\pi}{16} \cdot \cos(2i+1)l\frac{\pi}{16} +$$

$$\sum_{i=0}^{m-1}\sum_{j=0}^{n-1} d_{i,j} \cdot \cos(2(i-m)+17)k\frac{\pi}{16} \cdot \cos(2(j-n)+17)l\frac{\pi}{16}$$

Representing a, b, c and d with the corresponding DCT coefficients A, B, C and D, respectively, using expression (12) and substituting A, B, C, or D for E and a, b, c, or d for e results in expression (14) below.

$$E_{kl} = \sum_{i=0}^{7-m}\sum_{j=0}^{7-n} \cos(2i+1)k\frac{\pi}{16} \cdot \cos(2j+1)l \quad (14)$$

$$\frac{\pi}{16} \cdot \sum_{p=0}^{7}\sum_{q=0}^{7} A_{pq}\cos(2i+2m+1)p\frac{\pi}{16} \cdot \cos(2j+2n+1)q\frac{\pi}{16} +$$

$$\sum_{i=0}^{7-m}\sum_{j=0}^{n-1} \cos(2i+1)k\frac{\pi}{16} \cdot \cos(2j-2n+17)l$$

$$\frac{\pi}{16} \cdot \sum_{p=0}^{7}\sum_{q=0}^{7} B_{pq}\cos(2i+2m+1)p\frac{\pi}{16} \cdot \cos(2j+1)q\frac{\pi}{16} +$$

$$\sum_{i=0}^{m-1}\sum_{j=0}^{7-n} \cos\left(\frac{2(i-m+17)k\pi}{16}\right) \cdot \cos(2j+1)l$$

$$\frac{\pi}{16} \cdot \sum_{p=0}^{7}\sum_{q=0}^{7} C_{pq}\cos(2i+1)p\frac{\pi}{16} \cdot \cos(2j+2n+17)q\frac{\pi}{16} +$$

-continued $$\sum_{i=0}^{m-1}\sum_{j=0}^{n-1}\cos(2(i-m)+17)k\frac{\pi}{16}\cdot\cos(2(j-n)+17)l$$

$$\frac{\pi}{16}\cdot\sum_{p=0}^{7}\sum_{q=0}^{7}D_{pq}\cos(2i+1)p\frac{\pi}{16}\cdot\cos(2j+1)q\frac{\pi}{16}$$

Changing the summing order and rewriting expression (14) results in expression (15) below.

$$E_{kl}=\sum_{p=0}^{7}\sum_{q=0}^{7}A_{pq}\sum_{i=0}^{7-m}\sum_{j=0}^{7-n}\cos(2i+2m+1)p \quad (15)$$

$$\frac{\pi}{16}\cdot\cos\frac{(2j+2n+1)q\pi}{16}\cos\frac{(2i+1)k\pi}{16}\cos(2j+1)l\frac{\pi}{16}+$$

$$\sum_{p=0}^{7}\sum_{q=0}^{7}B_{pq}\sum_{i=0}^{7-m}\sum_{j=0}^{n-1}\cos(2i+2m+1)p\frac{\pi}{16}\cdot$$

$$\cos\frac{(2j+1)q\pi}{16}\cos\frac{(2i+1)k\pi}{16}\cos(2(j-n)+17)l\frac{\pi}{16}+$$

$$\sum_{p=0}^{7}\sum_{q=0}^{7}c_{pq}\sum_{i=0}^{m-1}\sum_{j=0}^{7-n}\cos\frac{(2i+1)p\pi}{16}\cos(2j+2n+1)q$$

$$\frac{\pi}{16}\cdot\cos\frac{(2(i-m)+17)k\pi}{16}\cos(2i+1)l\frac{\pi}{16}+$$

$$\sum_{p=0}^{7}\sum_{q=0}^{7}D_{pq}\sum_{i=0}^{m-1}\sum_{j=0}^{n-1}\cos\frac{(2i+1)p\pi}{16}\cos(2j+1)q$$

$$\frac{\pi}{16}\cdot\cos\frac{(2(i-m)+17)k\pi}{16}\cos(2(j-n)+17)l\frac{\pi}{16}$$

Expression (15) can be simplified to expression (16) below.

$$E_{kl}=\sum_{p=0}^{7}\sum_{q=0}^{7}(A_{pq}\cdot M_A+B_{pq}\cdot M_B+C_{pq}\cdot M_C+D_{pq}\cdot M_D) \quad (16)$$

where $M_A$, $M_B$, $M_C$ and $M_D$ are the matrices which are independent of the DCT coefficients and only depend on the values of p, q, k, l, m and n. Therefore, matrices $M_A$, $M_B$, $M_C$ and $M_D$ can be precalculated according to the following expressions for $0 \leq p, q, k, l <= 7$:

$$M_A=\sum_{i=0}^{7-m}\sum_{j=0}^{7-n}\cos(2i+2m+1)p \quad (17a)$$

$$\frac{\pi}{16}\cos\frac{(2j+2n+1)q\pi}{16}\cdot\cos\frac{(2i+1)k\pi}{16}\cos\frac{(2j+1)l\pi}{16}$$

$$M_B=\sum_{i=0}^{7-m}\sum_{j=0}^{n-1}\cos(2i+2m+1)p \quad (17b)$$

$$\frac{\pi}{16}\cos\frac{(2j+1)q\pi}{16}\cdot\cos\frac{(2i+1)k\pi}{16}\cos\frac{(2j-2n+17)l\pi}{16}$$

$$M_C=\sum_{i=0}^{7-m}\sum_{j=0}^{n-1}\cos\frac{(2i+1)p\pi}{16}\cos\frac{(2j+2n+1)q\pi}{16}\cdot \quad (17c)$$

$$\cos\frac{(2i-2m+17)k\pi}{16}\cos\frac{(2j+1)l\pi}{16} \text{ and}$$

$$M_D=\sum_{i=0}^{7-m}\sum_{j=0}^{n-1}\cos(2i+1)p \quad (17d)$$

$$\frac{\pi}{16}\cos\frac{(2j+1)q\pi}{16}\cdot\cos\frac{(2i-2m+17)k\pi}{16}\cos\frac{(2j-2n+17)l\pi}{16}$$

Accordingly, using expressions (16) and (17a)–(17d), the DCT coefficients for the composite macro block E can be determined. As one skilled in the art will readily appreciate from the above disclosure, the expressions above provide a composite macro block for full pixel accuracy. In other words, the coordinate (m,n) is the coordinate for a pixel in the composite macro block e. The coordinate (m,n) does not, however, always fall on a pixel in a macro block of an anchor frame, Instead, this coordinate could fall between two pixels in the horizontal direction, between two pixels in the vertical direction, or between two pixels in the diagonal direction.

Frame-Motion Compensation—Half-Pel Accuracy
Horizontal Half-Pel Accuracy

If coordinate (m,n) falls between two pixels in the horizontal direction, then motion compensation must be performed with half-pel (i.e., half pixel) accuracy in the horizontal direction.

Expression (18) below illustrates the relationship between the composite macro block e and the macro blocks a–d in the anchor frame in the spatial domain.

$$e_{ij}=\begin{cases}\frac{1}{2}(a_{i+m,j+n}+a_{i+m,j+n+1}) & 0\leq i\leq 7-m;\ 0\leq j\leq 6-n \\ \frac{1}{2}(b_{i+m,j+n-8}+b_{i+m,j+n-7}) & 0\leq i\leq 7-m;\ 8-n\leq i\leq 7 \\ \frac{1}{2}(c_{i+m-8,j+n}+c_{i+m-8,j+n+1}) & 8-m\leq i\leq 7;\ 0\leq j\leq 6-n \\ \frac{1}{2}(d_{i+m-8,j+n-8}+d_{i+m-8,j+n-7}) & 8-m\leq i\leq 7;\ 8-n\leq i\leq 7 \\ \frac{1}{2}(a_{i+m,7}+b_{i+m,0}) & 0\leq i\leq 7-m;\quad j=7-n \\ \frac{1}{2}(c_{i+m-8,7}+d_{i+m-8,0}) & 8-m\leq i\leq 7\end{cases} \quad (18)$$

Expressions (19a)–(19d) below are derived in the same manner as expressions (17a)–(17d) above using expression (18).

$$M_A=\left[\sum_{i=0}^{7-m}\sum_{j=0}^{6-n}\overline{Y}\cos\frac{(2i+1)k\pi}{16}\cos\frac{(2j+1)l\pi}{16}+\sum_{i=0}^{7-m}\frac{1}{2}\cos\right. \quad (19a)$$

$$\left.\frac{(2i+2m+1)p\pi}{16}\cos\frac{15q\pi}{16}\cos\frac{(2i+1)k\pi}{16}\cos\frac{(15-2n)l\pi}{16}\right]$$

-continued $$M_B = \left[\sum_{i=0}^{7-m}\sum_{j=-n}^{-1} \underline{Y}\cos\frac{(2i+1)k\pi}{16}\cos\frac{(2j+17)l\pi}{16} + \right. \tag{19b}$$
$$\left.\sum_{i=0}^{7-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right]$$

$$M_C = \left[\sum_{i=-m}^{-1}\sum_{j=0}^{6-m} \underline{Y}\cos\frac{(2i+17)k\pi}{16}\cos\frac{(2j+1)l\pi}{16} + \sum_{i=-m}^{-1}\frac{1}{2}\cos\right. \tag{19c}$$
$$\left.\frac{(2i+2m+1)p\pi}{16}\cos\frac{15q\pi}{16}\cos\frac{(2i+17)k\pi}{16}\cos\frac{(15-2n)l\pi}{16}\right]$$

$$M_D = \left[\sum_{i=-m}^{-1}\sum_{j=-n}^{-1} \underline{Y}\cos\frac{(2i+17)k\pi}{16}\cos\frac{(2j+17)l\pi}{16} + \sum_{i=-m}^{-1}\frac{1}{2}\cos\right. \tag{19d}$$
$$\left.\frac{(2i+2m+1)p\pi}{16}\cos\frac{q\pi}{16}\cos\frac{(2i+17)k\pi}{16}\cos\frac{(15-2n)l\pi}{16}\right]$$

where $\underline{Y}$ represents expression (20) below $$\underline{Y} = \cos\frac{(2i+2m+1)p\pi}{16}\cos\frac{q\pi}{16}\cos\frac{(j+n+1)}{8}q\pi \tag{20}$$

Using expressions (16) and (19a)–(19d), the composite macro block E can be derived with horizontal half-pel accuracy.

Vertical Half-Pel Accuracy

If coordinate (m,n) falls between two pixels in the vertical direction, then motion compensation must be performed with half-pel (i.e., half pixel) accuracy in the vertical direction. Equation (54) below illustrates the relationship between the composite macro block e and the macro blocks a–d of the anchor frame in the spatial domain.

$$e_{ij} = \begin{cases} \frac{1}{2}(a_{i+m,j+n} + a_{i+m+1,j+n}) & 0 \le i \le 6-m;\ 0 \le j \le 7-n \\ \frac{1}{2}(b_{i+m,j+n-8} + b_{i+m+1,j+n-8}) & 0 \le i \le 6-m;\ 8-n \le i \le 7 \\ \frac{1}{2}(c_{i+m-8,j+n} + c_{i+m-7,j+n}) & 8-m \le i \le 7;\ 0 \le j \le 7-n \\ \frac{1}{2}(d_{i+m-8,j+n-8} + d_{i+m-7,j+n-8}) & 8-m \le i \le 7;\ 8-n \le i \le 7 \\ \frac{1}{2}(a_{i+m,j+n} + b_{i+m-7,j+n}) & 0 \le i \le 7-m;\ j = 7-n \\ \frac{1}{2}(b_{i+m,j+n-8} + d_{i+m-7,j+n-8}) & 8-m \le i \le 7 \end{cases} \tag{21}$$

Expression (22a)–(22d) below are derived in the same manner as expression (17a)–(17d) using expression (21).

$$M_A = \left[\sum_{i=0}^{6-m}\sum_{j=0}^{7-n} \overline{X}\cos\frac{(2i+1)k\pi}{16}\cos\frac{(2j+1)l\pi}{16} + \sum_{j=0}^{7-n}\frac{1}{2}\cos\frac{15p\pi}{16}\right. \tag{22a}$$
$$\left.\cos\frac{(2j+2n+1)q\pi}{16}\cos\frac{(15-2m)k\pi}{16}\cos\frac{(2j+1)l\pi}{16}\right]$$

$$M_B = \tag{22b}$$
$$\left[\sum_{i=0}^{6-m}\sum_{j=-n}^{-1} \overline{X}\cos\frac{(2i+1)k\pi}{16}\cos\frac{(2j+17)l\pi}{16} + \sum_{j=-n}^{-1}\frac{1}{2}\cos\frac{15p\pi}{16}\cos\right.$$
$$\left.\frac{(2j+2n+1)q\pi}{16}\cos\frac{(15-2m)k\pi}{16}\cos\frac{(2j+17)l\pi}{16}\right]$$

$$M_C = \left[\sum_{i=-m}^{-1}\sum_{j=0}^{7-n} \overline{X}\cos\frac{(2i+17)k\pi}{16}\cos\frac{(2j+1)l\pi}{16} + \right. \tag{22c}$$
$$\left.\sum_{j=0}^{7-n}\frac{1}{2}\cos\frac{p\pi}{16}\cos\frac{(2j+2n+1)q\pi}{16}\cos\frac{(15-2m)k\pi}{16}\cos\frac{(2j+1)l\pi}{16}\right]$$

$$M_D = \tag{22d}$$
$$\left[\sum_{i=-m}^{-1}\sum_{j=-n}^{-1} \overline{X}\cos\frac{(2i+17)k\pi}{16}\cos\frac{(2j+17)l\pi}{16} + \sum_{j=-n}^{-1}\frac{1}{2}\cos\frac{p\pi}{16}\cos\right.$$
$$\left.\frac{(2j+2n+1)q\pi}{16}\cos\frac{(15-2m)k\pi}{16}\cos\frac{(2j+17)l\pi}{16}\right]$$

where $\overline{X}$ represents expression (56) below.

$$\overline{X} = 2\cos\frac{(2j+2n+1)q\pi}{16}\cos\frac{(7+m+1)}{8}\cos\frac{q\pi}{16} \tag{23}$$

Using expression (16) and (22a)–(22d), the composite macro block E can be derived with vertical half-pel accuracy.

Diagonal Half-Pel Accuracy

If coordinate (m,n) falls between two pixels in the diagonal direction, then motion compensation must be performed with half-pel accuracy in the diagonal direction. Expression (24) below illustrates the relationship between the composite macro block e and the macro blocks a–d of the anchor frame in the spatial domain.

$$e_{ij} = \begin{cases} \frac{1}{4}(a_{i+m,j+n} + a_{i+m,j+m+1} + a_{i+m+1,j+n} + a_{i+m+1,j+n+1}) & 0 \leq i \leq 6-n; \quad 0 \leq i \leq 6-n \\ \frac{1}{4}(b_{i+n,j+m-8} + b_{i+m,j+n-7} + b_{i+m+1,j+n-8} + b_{i+m+1,j+n-7}) & 0 \leq i \leq 6-m; \quad 8 \leq n \leq j \leq 7 \\ \frac{1}{4}(c_{i+m-8,j+n} + c_{i+m-8,j+n+1} + c_{i+m-7,j+n} + c_{i+m-7,j+n+1}) & 8 \leq m \leq i \leq 7; \quad 0 \leq j \leq 6-n \\ \frac{1}{4}(d_{i+m-8,j+n-8} + d_{i+m-8,j+n-7} + d_{i+m-7,j+n-8} + d_{i+m-7,j+n-7}) & 8-m \leq i \leq 7; \quad 8-n \leq i \leq 7 \\ \frac{1}{4}(a_{7,j+n} + a_{7,j+n+1} + c_{0,j+n} + c_{0,j+n+1}) & i = 7-m; \quad 0 \leq i \leq 6-n \\ \frac{1}{4}(b_{7,j+n-8} + b_{1,j+n-7} + d_{0,j+n-8} + d_{0,j+n-7}) & i = 7-m; \quad 8-n \leq j \leq 7 \\ \frac{1}{4}(a_{i+m,7}a_{i+m+1,7} + b_{i+m,0} + b_{i+m+1,0}0) & 0 \leq i \leq 6-m; \quad j = 7-n \\ \frac{1}{4}(c_{i+m-8,7} + c_{i+m-7,7} + d_{i+m-8,0} + d_{i+m-7,0}) & 8-m \leq i \leq 7; \quad j = 7-n \\ \frac{1}{4}(a_{7,7} + b_{7,0} + c_{0,7} + d_{0,0}, & i = 7-m; \quad j = 7-n \end{cases} \quad (24)$$

Expressions (25a)–(25d) below are derived in the same manner as expressions (17a)–(17d) using expression (24).

$$M_A = \left[ \sum_{i=0}^{6-m} \sum_{j=0}^{6-n} \cos\frac{p\pi}{16} \cos\frac{q\pi}{16} \cos\frac{(i+m+1)p\pi}{8} \cos\frac{(j+n+1)p\pi}{8} \cdot \cos\frac{(2i+1)k\pi}{16} \cos\frac{(2j+1)l\pi}{16} + \frac{1}{2}\sum_{j=0}^{6-n} \cos\frac{15p\pi}{16} \cos\frac{(j+n+1)q\pi}{8} \cos\frac{q\pi}{16} \cos\frac{(15-2m)k\pi}{16} \cos\frac{(2j+1)l\pi}{16} + \frac{1}{2}\sum_{i=0}^{6-m} \cos\frac{15q\pi}{16} \cos\frac{(j+m+1)p\pi}{8} \cos\frac{p\pi}{16} \cos\frac{(15-2n)l\pi}{16} \cos\frac{(2i+1)k\pi}{16} + \frac{1}{4}\cos\frac{15p\pi}{16} \cos\frac{15q\pi}{16} \cos\frac{(15-2m)k\pi}{16} \cos\frac{(15-2n)l\pi}{16} \right] \quad (25a)$$

$$M_B = \left[ \sum_{i=0}^{6-m} \sum_{j=-n}^{-1} \cos\frac{p\pi}{16} \cos\frac{q\pi}{16} \cos\frac{(i+m-1)p\pi}{8} \cos\frac{(j+n+1)q\pi}{8} \cdot \cos\frac{(2j+1)k\pi}{16} \cos\frac{(2j+17)l\pi}{16} + \frac{1}{2}\sum_{j=-n}^{-1} \cos\frac{15p\pi}{16} \cos\frac{(j+n+1)q\pi}{8} \cos\frac{q\pi}{16} \cos\frac{(15-2m)k\pi}{16} \cos\frac{(2j+17)l\pi}{16} + \frac{1}{2}\sum_{i=0}^{6-m} \cos\frac{q\pi}{16} \cos\frac{(j+m+1)p\pi}{8} \cos\frac{p\pi}{16} \cos\frac{(2i+1)k\pi}{16} \cos\frac{(15-2n)l\pi}{16} + \frac{1}{4}\cos\frac{15p\pi}{16} \cos\frac{q\pi}{16} \cos\frac{(15-2m)k\pi}{16} \cos\frac{(15-2n)l\pi}{16} \right] \quad (25b)$$

$$M_C = \left[ \sum_{i=-m}^{-i} \sum_{j=0}^{6-n} \cos\frac{p\pi}{16} \cos\frac{q\pi}{16} \cos\frac{(i+m+1)p\pi}{8} \cos\frac{(j+n+1)q\pi}{8} \cdot \cos\frac{(2i+17)k\pi}{16} \cos\frac{(2j+1)l\pi}{16} + \frac{1}{2}\sum_{j=0}^{6-n} \cos\frac{p\pi}{16} \cos\frac{(j+n+1)q\pi}{8} \cos\frac{q\pi}{16} \cos\frac{(15-2m)k\pi}{16} \cos\frac{(2j+1)l\pi}{16} + \frac{1}{2}\sum_{i=-m}^{-i} \cos\frac{15q\pi}{16} \cos\frac{(j+m+1)p\pi}{8} \cos\frac{P\pi}{16} \cos\frac{(2i+17)k\pi}{16} \cos\frac{(15-2n)l\pi}{16} + \frac{1}{4}\cos\frac{p\pi}{16} \cos\frac{15q\pi}{16} \cos\frac{(15-2m)k\pi}{16} \cos\frac{(15-2n)l\pi}{16} \right] \quad (25c)$$

$$M_D = \left[ \sum_{i=-m}^{-i} \sum_{j=-n}^{-i} \cos\frac{p\pi}{16} \cos\frac{q\pi}{16} \cos\frac{(i+m+1)p\pi}{8} \cos\frac{(j+n+1)q\pi}{8} \cdot \cos\frac{(2i+17)k\pi}{16} \cos\frac{(2j+17)l\pi}{16} + \frac{1}{2}\sum_{j=-n}^{-i} \cos\frac{p\pi}{16} \cos\frac{(j+n+1)q\pi}{8} \cos\frac{q\pi}{16} \cos\frac{(15-2m)k\pi}{16} \cos\frac{(2j+17)l\pi}{16} + \frac{1}{2}\sum_{i=-m}^{-i} \cos\frac{q\pi}{16} \cos\frac{(i+m+1)p\pi}{8} \cos\frac{P\pi}{16} \cos\frac{(2i+17)k\pi}{16} \cos\frac{(15-2n)l\pi}{16} + \frac{1}{4}\cos\frac{p\pi}{16} \cos\frac{q\pi}{16} \cos\frac{(15-2m)k\pi}{16} \cos\frac{(15-2n)l\pi}{16} \right] \quad (25d)$$

Using expressions (16) and (25a)–(25d), the composite macro block E can be derived with diagonal half-pel accuracy.

The compositer 68 uses expressions (16)–(25d) to form composite macro blocks in the DCT domain when the inter-coded pictures have been encoded on a frame-by-frame basis. Accordingly, when the adder 74 adds the composite macro blocks to the macro blocks of P and B-pictures output from the variable length decoder and dequantizer 58, frame-motion compensation is performed,

Field-Motion Compensation

The digital video signal can, however, also include fields. The even and odd fields of a frame may be inter-coded independently based on the even and odd fields of a previous frame. Namely, the even field may be inter-coded based on either the even or odd field of the previous frame regardless of whether the odd field was inter-coded based on the even or odd field of the previous frame. As discussed above, decoding inter-coded fields is referred to as field-motion compensation.

To perform field-motion compensation, the motion vector address generator 62 receives the odd field motion vector and the even field motion vector from the variable length decoder and dequantizer 58. The odd field motion vector points to a first coordinate (m,n) of a composite odd field macro block e, white the even field motion vector points to a second coordinate (m',n') of a composite even field macro block e'. Based on the first and second motion vectors, the motion vector address generator 62 instructs the memory 64 as to which of the anchor frame macro blocks to output to the composer 68.

For purposes of discussion, assume that the motion vector address generator instructs the memory 64 to output anchor frame macro blocks A–D with respect to the odd field motion vector and output anchor frame macro blocks A'–D' with respect to the even field motion vector. The motion vector address generator 62 also outputs a signal to the composer 68 indicating the coordinates (m,n) and (m',n'). Additionally, the signal output by the motion vector address generator 62 to the composer 68 indicates whether frame or field motion compensation is to be performed. If field-motion compensation is to be performed, the composer 68 then forms a frame composite macro block according to expressions (26)–(61) discussed below.

Because of the operation of the field-to-frame converter 69, the adder 74 receives macro blocks of a frame even when the HDTV signal includes fields. Therefore, the composer 68 has to output frame composite macro blocks. Also, the macro blocks received from the memory 64 via the variable length decoder and dequantizer 67 are frame macro blocks. Accordingly, when performing field-motion compensation, the composer 68 (1) separates the anchor frame macro blocks into even and odd fields, (2) forms respective even and odd field composite macro blocks, and (3) interlaces the even and odd field composite macro blocks to form a frame composite macro block. Operations (1), (2), and (3) are simultaneously performed by the composer 68 according to expressings (26)–(61) discussed below.

Full-Pel Accuracy

With field-motion compensation, four possible encoding schemes exist:

(1) o→o o→e
(2) e→o e→e
(3) o→o e→e
(4) o→e e→o where o→e means that the current even field was encoded based on the previous odd field. In other words, "o" stands for odd field and "e" stands for even field.

Case (1) o→o and o→e

Expression (26) below represents the relationship between the frame composite macro block e and the macro blocks a–d and a'–d' of the anchor frame in the spatial domain when the even and odd fields are encoded based on the odd field of the anchor frame.

$$e_{i,j} = \begin{cases} a_{i+m,j+n} & 0 \le i \le 6-m & 0 \le j \le 7-n \\ b_{i+m,j+n-8} & 0 \le i \le 6-m & 8-n \le j \le 7 \\ c_{i+m-8,j+n} & 8-m \le i \le 6 & 0 \le j \le 7-n \\ d_{i+m-8,j+n-8} & 8-m \le i \le 6 & 8-n \le j \le 7 \\ a'_{i+m'-1,j+n'} & 1, 3 \le i \le 7-m' & 0 \le j \le 7-n' \\ b'_{i+m'-1,j+n'-8} & 1, 3 \le i \le 7-m' & 8-n' \le j \le 7 \\ c'_{i+m'-9,j+n'} & 9-m' \le i \le 7 & 0 \le j \le 7-n' \\ d'_{i+m'-9,j+n'-8} & 9-m' \le i \le 7 & 8-n' \le j \le 7 \end{cases} \quad (26)$$

where $m = 0, 2, 4, 6$ and $m' = 0, 2, 4, 6$

The top half of expression (26) represents the o→o portion of the frame composite macro block e, while the bottom portion of expression (26) represents the o→e portion of the frame composite macro block e.

Using expression (26), expression (27) below is derived in the same manner as expression (14).

$$E_{kl} = \sum_{i=0}^{7}\sum_{j=0}^{7} e_{ij} \cos\frac{(2i+1)k\pi}{16}\cos\frac{(2j+1)l\pi}{16} \quad (27)$$

$$E_{kl} = \sum_{p=0}^{7}\sum_{q=0}^{7} A_{pq} \sum_{i=0,2}^{6-m}\sum_{j=0}^{7-n} \cos\frac{(2i+2m+1)p\pi}{16}\cos\frac{(2j+2n+1)q\pi}{16} \cdot F +$$

$$\sum_{p=0}^{7}\sum_{q=0}^{7} B_{pq} \sum_{i=0,2}^{6-m}\sum_{j=8-n}^{7} \cos\frac{(2i+2m+1)p\pi}{16}\cos\frac{(2j+2n+15)q\pi}{16} \cdot F +$$

$$\sum_{p=0}^{7}\sum_{q=0}^{7} C_{pq} \sum_{i=8-m}^{6}\sum_{j=0}^{7-n} \cos\frac{(2i+2m-15)p\pi}{16}\cos\frac{(2j+2n+1)q\pi}{16} \cdot F +$$

$$\sum_{p=0}^{7}\sum_{q=0}^{7} D_{pq} \sum_{i=8-m}^{6}\sum_{j=8-n}^{7} \cos\frac{(2i+2m-15)p\pi}{16}\cos\frac{(2j+2n-15)q\pi}{16} \cdot F +$$

$$\sum_{p=0}^{7}\sum_{q=0}^{7}A'_{pq}\sum_{i=1,3}^{7-m'}\sum_{j=0}^{7-n'}\cos\frac{(2i+2m'-1)p\pi}{16}\cos\frac{(2j+2n'+1)q\pi}{16}\cdot F+$$

$$\sum_{p=0}^{7}\sum_{q=0}^{7}B'_{pq}\sum_{i=1,3}^{7-m'}\sum_{j=8-n'}^{7}\cos\frac{(2i+2m'-1)p\pi}{16}\cos\frac{(2j+2n'-15)q\pi}{16}\cdot F+$$

$$\sum_{p=0}^{7}\sum_{q=0}^{7}C'_{pq}\sum_{i=9-m}^{7}\sum_{j=0}^{7-n'}\cos\frac{(2i+2m'-17)p\pi}{16}\cos\frac{(2j+2n'+1)q\pi}{16}\cdot F+$$

$$\sum_{p=0}^{7}\sum_{q=0}^{7}D'_{pq}\sum_{i=9-m}^{7}\sum_{j=8-n'}^{7}\cos\frac{(2i+2m'-17)p\pi}{16}\cos\frac{(2j+2n'-15)q\pi}{16}\cdot F$$

where $$F=\cos\frac{(2i+1)k\pi}{16}\cos\frac{(2j+1)l\pi}{16} \quad (28)$$

The quadruple summations including the terms $A_{pq}$, $B_{pq}$, $C_{pq}$, and $D_{pq}$ in equation (27) represent the o→o portion of the frame composite macro block E, while the quadruple summations including the terms $A'_{pq}$, $B'_{pq}$, $C'_{pq}$, and $D'_{pq}$ represent the o→e portion of the frame composite macro block E.

Using expression (27), the motion compensated frame macro block E can be derived for full-pel accuracy when the even and odd fields are encoded based on the odd field of the anchor frame.

As expressions (26) and (27) show, the frame composite macro block e can be represented in the spatial domain such that the frame composite macro block E can be derived without having to separately perform the following operations: (1) separate the frame anchor macro blocks into even and odd fields, (2) form respective even and odd field composite macro blocks, and (3) interlace the even and odd field composite macro blocks to form a frame composite macro block.

Case (2) e→o and e→e

Expression (29) below represents the relationship between frame composite macro block e and the macro blocks a–d and a'–d' in the spatial domain when the even and odd fields are encoded based on the even field of the anchor frame.

$$e_{i,j}=\begin{cases} a_{i+m,j+n} & 0,2\le i\le 7-m \quad 0\le j\le 7-n \\ b_{i+m,j+n-8} & 0,2\le i\le 7-m \quad 8-n\le j\le 7 \\ c_{i+m-8,j+n} & 9-m\le i\le 6 \quad 0\le j\le 7-n \\ d_{i+m-8,j+n-8} & 9-m\le i\le 6 \quad 8-n\le j\le 7 \\ a'_{i+m'-1,j+n'} & 1,3\le i\le 8-m' \quad 0\le j\le 7-n' \\ b'_{i+m'-1,j+n'-8} & 1,3\le i\le 8-m' \quad 8-n'\le j\le 7 \\ c'_{i+m'-9,j+n'} & 10-m'\le i\le 7 \quad 0\le j\le 7-n' \\ d'_{i+m'-9,j+n'-8} & 9-m'\le i\le 7 \quad 8-n'\le j\le 7 \end{cases} \quad (29)$$

where $m=1,3,5,7$ and $m'=1,3,5,7$

The top half of expression (29) represents the e→o portion of the frame composite macro block e, while the bottom portion of expression (29) represents the e→e portion of the frame composite macro block e.

Using expression (29), expression (30) below is derived in the same manner as expression (14).

$$E_{kl}=\sum_{p=0}^{7}\sum_{q=0}^{7}A_{pq}\sum_{i=0,2}^{7-m}\sum_{j=0}^{7-n}\cos\frac{(2i+2m+1)p\pi}{16}\cos\frac{(2j+2n+1)q\pi}{16}\cdot F+ \quad (30)$$

$$\sum_{p=0}^{7}\sum_{q=0}^{7}B_{pq}\sum_{i=0,2}^{7-m}\sum_{j=8-n}^{7}\cos\frac{(2i+2m+1)p\pi}{16}\cos\frac{(2j+2n-15)q\pi}{16}\cdot F+$$

$$\sum_{p=0}^{7}\sum_{q=0}^{7}C_{pq}\sum_{i=9-m}^{6}\sum_{j=0}^{7-n}\cos\frac{(2i+2m-15)p\pi}{16}\cos\frac{(2j+2n+1)q\pi}{16}\cdot F+$$

$$\sum_{p=0}^{7}\sum_{q=0}^{7}D_{pq}\sum_{i=9-m}^{6}\sum_{j=8-n}^{7}\cos\frac{(2i+2m-15)p\pi}{16}\cos\frac{(2j+2n-15)p\pi}{16}\cdot F+$$

$$\sum_{p=0}^{7}\sum_{q=0}^{7}A'_{pq}\sum_{i=1,3}^{8-m'}\sum_{j=0}^{7-n'}\cos\frac{(2i+2m'-1)p\pi}{16}\cos\frac{(2j+2n'+1)q\pi}{16}\cdot F+$$

$$\sum_{p=0}^{7}\sum_{q=0}^{7}B'_{pq}\sum_{i=1,3}^{8-m'}\sum_{j=8-n'}^{7}\cos\frac{(2i+2m'-1)p\pi}{16}\cos\frac{(2j+2n'-15)q\pi}{16}\cdot F+$$

$$\sum_{p=0}^{7}\sum_{q=0}^{7}C'_{pq}\sum_{i=10-m'}^{7}\sum_{j=0}^{7-n'}\cos\frac{(2i+2m'-17)p\pi}{16}\cos\frac{(2j+2n'+1)q\pi}{16}\cdot F+$$

$$\sum_{p=0}^{7}\sum_{q=0}^{7}D'_{pq}\sum_{i=10-m'}^{7}\sum_{j=8-n'}^{7}\cos\frac{(2i+2m-17)p\pi}{16}\cos\frac{(2j+2n'-15)q\pi}{16}\cdot F$$

The summation terms including $A_{pq}$, $B_{pq}$, $C_{pq}$, and $D_{pq}$ in expression (30) represent the e→o portion of the frame composite macro block E, while the summation terms including $A'_{pq}$, $B'_{pq}$, $C'_{pq}$, and $D'_{pq}$ in expression (30) represent the e→e portion of the frame composite macro block E.

Using expression (30), the motion compensated frame macro block E can be derived for full-pel accuracy when the even and odd fields are encoded based on the even field of the anchor frame.

Case (3) o→o and e→e

Expression (31) below represents the relationship between frame composite macro block e and the macro blocks a–d and a'–d' in the spatial domain when the odd and even fields are encoded based on the odd and even fields, respectively, of the anchor frame.

$$e_{i,j} = \begin{cases} a_{i+m,j+n} & 0 \le i \le 6-m & 0 \le j \le 7-n \\ b_{i+m,j+n-8} & 0 \le i \le 6-m & 8-n \le j \le 7 \\ c_{i+m-8,j+n} & 8-m \le i \le 6 & 0 \le j \le 7-n \\ d_{i+m-8,j+n-8} & 8-m \le i \le 6 & 8-n \le j \le 7 \\ a'_{i+m'-1,j+n'} & 1, 3 \le i \le 8-m' & 0 \le j \le 7-n' \\ b'_{i+m'-1,j+n'-8} & 1, 3 \le i \le 8-m' & 8-n' \le j \le 7 \\ c'_{i+m'-9,j+n'} & 10-m' \le i \le 7 & 0 \le j \le 7-n' \\ d'_{i+m'-9,j+n'-8} & 9-m' \le i \le 7 & 8-n' \le j \le 7 \end{cases} \quad (31)$$

where $m = 0, 2, 4, 6$ and $m' = 1, 3, 5, 7$

The top half of expression (31) represents the o→o portion of the frame composite macro block e, while the bottom portion of expression (31) represents the e→e portion of the frame composite macro block e.

Using expression (31), expression (32) below is derived in the same manner as expression (14).

$$E_{kl} = \sum_{p=0}^{7}\sum_{q=0}^{7}A_{pq}\sum_{i=0,2}^{6-m}\sum_{j=0}^{7-n}\cos\frac{(2i+2m+1)p\pi}{16}\cos\frac{(2j+2n+1)q\pi}{16}\cdot F+ \quad (32)$$

$$\sum_{p=0}^{7}\sum_{q=0}^{7}B_{pq}\sum_{i=0,2}^{6-m}\sum_{j=8-n}^{7}\cos\frac{(2i+2m+1)p\pi}{16}\cos\frac{(2j+2n-15)q\pi}{16}\cdot F+$$

$$\sum_{p=0}^{7}\sum_{q=0}^{7}C_{pq}\sum_{i=8-m}^{6}\sum_{j=0}^{7-n}\cos\frac{(2i+2m-15)p\pi}{16}\cos\frac{(2j+2n+1)q\pi}{16}\cdot F+$$

$$\sum_{p=0}^{7}\sum_{q=0}^{7}D_{pq}\sum_{i=8-m}^{6}\sum_{j=8-n}^{7}\cos\frac{(2i+2m-15)p\pi}{16}\cos\frac{(2j+2n-15)p\pi}{16}\cdot F+$$

$$\sum_{p=0}^{7}\sum_{q=0}^{7}A'_{pq}\sum_{i=1,3}^{8-m'}\sum_{j=0}^{7-n'}\cos\frac{(2i+2m'-1)p\pi}{16}\cos\frac{(2j+2n'+1)q\pi}{16}\cdot F+$$

$$\sum_{p=0}^{7}\sum_{q=0}^{7}B'_{pq}\sum_{i=1,3}^{8-m'}\sum_{j=8-n'}^{7}\cos\frac{(2i+2m'-1)p\pi}{16}\cos\frac{(2j+2n'-15)q\pi}{16}\cdot F+$$

$$\sum_{p=0}^{7}\sum_{q=0}^{7}C'_{pq}\sum_{i=10-m'}^{7}\sum_{j=0}^{7-n'}\cos\frac{(2i+2m'-17)p\pi}{16}\cos\frac{(2j+2n'+1)q\pi}{16}\cdot F+$$

$$\sum_{p=0}^{7}\sum_{q=0}^{7}D'_{pq}\sum_{i=10-m'}^{7}\sum_{j=8-n'}^{7}\cos\frac{(2i+2m'-17)p\pi}{16}\cos\frac{(2j+2n'-15)q}{16}\cdot F$$

The summation terms including $A_{pq}$, $B_{pq}$, $C_{pq}$, and $D_{pq}$ in expression (32) represent the o→o portion of the frame composite macro block E, while the summation terms including $A'_{pq}$, $B'_{pq}$, $C'_{pq}$, and $D'_{pq}$ in expression (32) represent the e→e portion of the frame composite macro block E.

Using expression (32), the motion compensated frame macro block E can be derived for full-pel accuracy when the odd and even fields are encoded based on the odd and even fields, respectively, of the anchor frame.

Case (4) e→o and o→e

The top half of expression (33) represents the e→o portion of the frame composite macro block e, while the bottom portion of expression (33) represents the o→e portion of the frame composite macro block e.

Using expression (33), expression (34) below is derived in the same manner as expression (14).

$$E_{kl} = \sum_{p=0}^{7}\sum_{q=0}^{7} A_{pq} \sum_{i=0,2}^{7-m}\sum_{j=0}^{7-n} \cos\frac{(2i+2m+1)p\pi}{16}\cos\frac{(2j+2n+1)q\pi}{16}\cdot F + \tag{34}$$

$$\sum_{p=0}^{7}\sum_{q=0}^{7} B_{pq} \sum_{i=0,2}^{7-m}\sum_{j=8-n}^{7} \cos\frac{(2i+2m+1)p\pi}{16}\cos\frac{(2j+2n-15)q\pi}{16}\cdot F +$$

$$\sum_{p=0}^{7}\sum_{q=0}^{7} C_{pq} \sum_{i=9-m}^{6}\sum_{j=0}^{7-n} \cos\frac{(2i+2m-15)p\pi}{16}\cos\frac{(2j+2n+1)q\pi}{16}\cdot F +$$

$$\sum_{p=0}^{7}\sum_{q=0}^{7} D_{pq} \sum_{i=9-m}^{6}\sum_{j=8-n}^{7} \cos\frac{(2i+2m-15)p\pi}{16}\cos\frac{(2j+2n-15)q\pi}{16}\cdot F +$$

$$\sum_{p=0}^{7}\sum_{q=0}^{7} A'_{pq} \sum_{i=1,3}^{7-m'}\sum_{j=0}^{7-n'} \cos\frac{(2i+2m'-1)p\pi}{16}\cos\frac{(2j+2n'+1)q\pi}{16}\cdot F +$$

$$\sum_{p=0}^{7}\sum_{q=0}^{7} B'_{pq} \sum_{i=1,3}^{7-m'}\sum_{j=8-n'}^{7} \cos\frac{(2i+2m'-1)p\pi}{16}\cos\frac{(2j+2n'-15)q\pi}{16}\cdot F +$$

$$\sum_{p=0}^{7}\sum_{q=0}^{7} C'_{pq} \sum_{i=9-m'}^{7}\sum_{j=0}^{7-n'} \cos\frac{(2i+2m'-17)p\pi}{16}\cos\frac{(2j+2n'+1)q\pi}{16}\cdot F +$$

$$\sum_{p=0}^{7}\sum_{q=0}^{7} C'_{pq} \sum_{i=9-m'}^{7}\sum_{j=8-n'}^{7} \cos\frac{(2i+2m'-17)p\pi}{16}\cos\frac{(2j+2n'-15)q\pi}{16}\cdot F$$

Expression (33) below represents the relationship between frame composite macro block e and the macro blocks a–d and a'–d' in the spatial domain when the odd and even fields are encoded based on the even and odd fields, respectively, of the anchor frame.

$$e_{i,j} = \begin{cases} a_{i+m,j+n} & 0, 2 \le i \le 7-m & 0 \le j \le 7-n \\ b_{i+m,j+n-8} & 0, 2 \le i \le 7-m & 8-n \le j \le 7 \\ c_{i+m-8,j+n} & 9-m \le i \le 6 & 0 \le j \le 7-n \\ d_{i+m-8,j+n-8} & 9-m \le i \le 6 & 8-n \le j \le 7 \\ a'_{i+m'-1,j+n'} & 1, 3 \le i \le 7-m' & 0 \le j \le 7-n' \\ b'_{i+m'-1,j+n'-8} & 1, 3 \le i \le 7-m' & 8-n' \le j \le 7 \\ c'_{i+m'-9,j+n'} & 9-m' \le i \le 7 & 0 \le j \le 7-n' \\ d'_{i+m'-9,j+n'-8} & 9-m' \le i \le 7 & 8-n' \le j \le 7 \end{cases} \tag{33}$$

where $m = 1, 3, 5, 7$ and $m' = 0, 2, 4, 6$

The summation terms including $A_{pq}$, $B_{pq}$, $C_{pq}$, and $D_{pq}$ in expression (34) represent the e→o portion of the frame composite macro block E, while the summation terms including $A'_{pq}$, $B'_{pq}$, $C'_{pq}$, and $D'_{pq}$ in expression (34) represent the o→e portion of the frame composite macro block E.

Using expression (34), the motion compensated frame macro block E can be derived for full-pel accuracy when the odd and even fields are encoded based on the even and odd fields, respectively, of the anchor frame.

Accordingly, using expressions (27), (30), (32), and (34), the DCT coefficients for the composite macro block E can be determined. As one skilled in the art will readily appreciate from the above disclosure, the expressions above provide a composite macro block for full pixel accuracy. In other words, the coordinates (m,n) and m',n') are the coordinates for a pixel in the composite macro block e. The coordinates (m,n) and (m',n') do not, however, always fall on a pixel in a macro block of the anchor frame. Instead, these coordinates could fall between two pixels in the horizontal direction, between two pixels in the vertical direction, or between two pixels in the diagonal direction.

Horizontal Half-Pel Accuracy

Case (1) o→o and o→e

Expression (35) below represents the relationship between the frame composite macro block e and the macro blocks a–d and a'–d' in the anchor frame in the spatial domain when the even and odd fields are encoded based on the odd field of the anchor frame.

$$e_{ij} = \begin{cases} \frac{1}{2}(a_{i+m,j+n} + a_{i+m,j+n+1}) & 0, 2 \leq i \leq 6-m; 0 \leq j \leq 6-n \\ \frac{1}{2}(b_{i+m,j+n-8} + b_{i+m,j+n-7}) & 0, 2 \leq i \leq 6-m; 8-n \leq j \leq 7 \\ \frac{1}{2}(c_{i+m-8,j+n} + c_{i+m-8,j+n+1}) & 8-m \leq i \leq 6; 0 \leq j \leq 6-n \\ \frac{1}{2}(d_{i+m-8,j+n-8} + d_{i+m-8,j+n-7}) & 8-m \leq i \leq 6; 8-n \leq j \leq 7 \\ \frac{1}{2}(a_{i+m,7} + b_{i+m,0}) & 0 \leq i \leq 6-m; j = 7-n \\ \frac{1}{2}(c_{i+m-8,7} + d_{i+m-8,0}) & 8-m \leq i \leq 6; j = 7-n \\ \frac{1}{2}(a'_{i+m'-1,j+n'} + a'_{i+m'-1,j+n'-1}) & 1, 3 \leq i \leq 7-m'; i = 0 \leq j \leq 6-n' \\ \frac{1}{2}b'_{i+m'-1,j+n'-8} + b'_{i+m'-1,j+n'-7}) & 1, 3 \leq i \leq 7-m'; 8-n' \leq j \leq 7 \\ \frac{1}{2}(c'_{i+m'-9,j+n'} + c'_{i+m'-9,j+n'+1}) & 9-m' \leq i \leq 7; 0 \leq j \leq 6-n' \\ \frac{1}{2}(d'_{i+m'-9,j+n'-8} + d'_{i+m'-9,j+n'-7}) & 9-m' \leq i \leq 7; 8-n' \leq j \leq 7 \\ \frac{1}{2}(a'_{i+m'-1,7} + b'_{i+m'-1,0}) & 1, 3 \leq i \leq 7-m'; j = 7-n' \\ \frac{1}{2}(c'_{i+m'-9,7} + d'_{i+m'-9,0}) & 9-m' \leq i \leq 7; j = 7-n' \end{cases} \quad (35)$$

where $m = 1, 3, 5, 7$ and $m' = 1, 3, 5, 7$

The top half of expression (35) represents the o→o portion of the frame composite macro block e, while the bottom portion of expression (35) represents the o→e portion of the frame composite macro block e.

Using expression (35), expression (36) below is derived in the same manner as expression (14).

$$E_{kl} = \sum_{p=0}^{7}\sum_{q=0}^{7} A_{pq}\left[\sum_{i=0,2}^{6-m}\sum_{j=0}^{6-n} \Upsilon \cos\frac{(2i+1)k\pi}{16}\cos\frac{(2j+1)l\pi}{16} + \right. \tag{36}$$

$$\sum_{i=0,2}^{6-m} \frac{1}{2}\cos\frac{(2i+2m+1)p\pi}{16}\cos\frac{15q\pi}{16}$$

$$\left. \cos\frac{(2i+1)k\pi}{16}\cos\frac{(15-2n)l\pi}{16}\right] +$$

$$\sum_{p=0}^{7}\sum_{q=0}^{7} B_{pq}\left[\sum_{i=0,2}^{6-m}\sum_{j=-n-1}^{-1} \Upsilon \cos\frac{(2i+1)k\pi}{16}\cos\frac{(2j+17)l\pi}{16} + \right.$$

$$\sum_{i=0,2}^{6-m} \frac{1}{2}\cos\frac{(2i+2m+1)p\pi}{16}\cos\frac{q\pi}{16}$$

$$\left. \cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+2,-m}^{-2}\sum_{j=0}^{6-n} \Upsilon \cos\frac{(2i+17)k\pi}{16}\cos\frac{(2j+1)l\pi}{16} + \right.$$

$$\sum_{i=-m}^{-2} \frac{1}{2}\cos\frac{(2i+2m+1)p\pi}{16}\cos\frac{15q\pi}{16}$$

$$\left. \cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m}^{-2}\sum_{j=-n}^{-1} \Upsilon \cos\frac{(2i+17)k\pi}{16}\cos\frac{(2j+17)l\pi}{16} + \right.$$

$$\sum_{i=-m}^{-2} \frac{1}{2}\cos\frac{(2i+2m+1)p\pi}{16}\cos\frac{q\pi}{16}$$

$$\left. \cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{6-m'}\sum_{j=0}^{6-n'} \Upsilon' \cos\frac{(2i+3)k\pi}{16}\cos\frac{(2j+1)l\pi}{16} + \right.$$

$$\sum_{i=0,2}^{6-m'} \frac{1}{2}\cos\frac{(2i+2m'+1)p\pi}{16}\cos\frac{15q\pi}{16}$$

$$\left. \cos\frac{(2i+3)k\pi}{16}\cos(15-2n')l\frac{\pi}{16} + \right.$$

$$\sum_{p=0}^{7}\sum_{q=0}^{7} B'_{pq}\left[\sum_{i=0,2}^{6-m'}\sum_{j=-n'}^{-1} \Upsilon' \cos\frac{(2i+3)k\pi}{16}\cos\frac{(2j+17)l\pi}{16} + \right.$$

-continued $$\sum_{i=0,2}^{6-m'} \frac{1}{2} \cos \frac{(2i+2m'+1)p\pi}{16} \cos \frac{q\pi}{16}$$

$$\cos \frac{(2i+3)k\pi}{16} \cos \frac{(15-2n')l\pi}{16} \Bigg] +$$

$$\sum_{p=0}^{7} \sum_{q=0}^{7} C'_{pq} \Bigg[ \sum_{i=-m'+2,-m'}^{-2} \sum_{j=0}^{6-n'} \Upsilon' \frac{(2i+19)k\pi}{16} \cos \frac{(2j+1)l\pi}{16} +$$

$$\sum_{i=-m'}^{-2} \frac{1}{2} \cos \frac{(2i+2m'+1)p\pi}{16} \cos \frac{15q\pi}{16}$$

$$\cos \frac{(2i+19)k\pi}{16} \cos \frac{(15-2n')l}{16} +$$

$$\sum_{p=0}^{7} \sum_{q=0}^{7} D'_{pq} \Bigg[ \sum_{i=-m'}^{-2} \sum_{j=-n'}^{-1} \Upsilon \cos \frac{(2i+19)k\pi}{16} \cos \frac{(2j+17)l\pi}{16} +$$

$$\sum_{i=-m'}^{-2} \frac{1}{2} \cos \frac{(2i+2m'+1)p\pi}{16} \cos \frac{q\pi}{16} \cos \frac{(2i+19)k\pi}{16}$$

-continued $$\cos \frac{(15-2n')l\pi}{16} \Bigg]$$

where $$\Upsilon = \cos \frac{(2i+2m+1)p\pi}{16} \cos \frac{q\pi}{16} \cos \frac{(j+n+1)q\pi}{8} \quad (37A)$$

$$\Upsilon' = \cos \frac{(2i+2m'+1)p\pi}{16} \cos \frac{q\pi}{16} \cos \frac{(j+n'+1)q\pi}{8} \quad (37B)$$

The summation terms including $A_{pq}$, $B_{pq}$, $C_{pq}$, and $D_{pq}$ in expression (36) represent the o→o portion of the frame composite macro block E, while the summation terms including $A'_{pq}$, $B'_{pq}$, $C'_{pq}$, and $D'_{pq}$ in expression (36) represent the o→e portion of the frame composite macro block E.

Using expression (36), the motion compensated frame macro block E can be derived for horizontal half-pel accuracy when the even and odd fields are encoded based on the odd field of the anchor frame.

Case (2) e→o e→e

Expression (38) below represents the relationship between frame composite macro block e and the macro blocks a–d and a'–d' in the spatial domain when the even and odd fields are encoded based on the even field of the anchor frame.

$$e_{ij} = \begin{cases} \frac{1}{2}(a_{i+m,j+n} + a_{i+m,j+n+1}) & 0, 2 \leq i \leq 7-m; 0 \leq j \leq 6-n \\ \frac{1}{2}(b_{i+m,j+n-8} + b_{i+m,j+n-7}) & 0, 2 \leq i \leq 7-m; 8-n \leq j \leq 7 \\ \frac{1}{2}(c_{i+m-8,j+n} + c_{i+m-8,j+n+1}) & 9-m \leq i \leq 6; 0 \leq j \leq 6-n \\ \frac{1}{2}(d_{i+m-8,j+n-8} + d_{i+m-8,j+n-7}) & 9-m \leq i \leq 6; 8-n \leq j \leq 7 \\ \frac{1}{2}(a_{i+m,7} + b_{i+m,0}) & 0 \leq i \leq 7-m; j=7-n \\ \frac{1}{2}(c_{i+m-8,7} + d_{i+m-8,0}) & 9-m \leq i \leq 6; j=7-n \\ \frac{1}{2}(a'_{i+m'-1,j+n'} + a'_{i+m'-1,j+n'-1}) & 1, 3 \leq i \leq 8-m'; i=0 \leq j \leq 6-n' \\ \frac{1}{2}(b'_{i+m'-1,j+n'-8} + b'_{i+m'-1,j+n'-7}) & 1, 3 \leq i \leq 8-m'; 8-n' \leq j \leq 7 \\ \frac{1}{2}(c'_{i+m'-9,j+n'} + c'_{i+m'-9,j+n'+1}) & 10-m' \leq i \leq 7; 0 \leq j \leq 6-n' \\ \frac{1}{2}(d'_{i+m'-9,j+n'-8} + d'_{i+m'-9,j+n'-7}) & 10-m' \leq i \leq 7; 8-n' \leq j \leq 7 \\ \frac{1}{2}(a'_{i+m'-1,7} + b'_{i+m'-1,0}) & 1, 3 \leq i \leq 8-m'; j=7-n' \\ \frac{1}{2}(c'_{i+m'-9,7} + d'_{i+m'-9,0}) & 10-m' \leq i \leq 7; j=7-n' \end{cases} \quad (38)$$

where $m = 0, 2, 4, 6$ and $m' = 0, 2, 4, 6$

The top half of expression (38) represents the e→o portion of the frame composite macro block e, while the bottom portion of expression (38) represents the e→e portion of the frame composite macro block e.

Using expression (38), expression (39) below is derived in the same manner as expression (14).

$$E_{kl} = \sum_{p=0}^{7}\sum_{q=0}^{7} A_{pq}\left[\sum_{i=0,2}^{7-m}\sum_{j=0}^{6-n}\Upsilon\cos\frac{(2i+1)k\pi}{16}\cos\frac{(2j+1)l\pi}{16} + \sum_{i=0,2}^{7-m}\frac{1}{2}\cos\frac{(2i+2m+1)p\pi}{16}\cos\frac{15q\pi}{16} \cos\frac{(2i+1)k\pi}{16}\cos\frac{(15-2n)l\pi}{16}\right] +$$

$$\sum_{p=0}^{7}\sum_{q=0}^{7} B_{pq}\left[\sum_{i=0,2}^{7-m}\sum_{j=-n}^{-1}\Upsilon\cos\frac{(2i+1)k\pi}{16}\cos\frac{(2j+17)l\pi}{16} + \sum_{i=0,2}^{7-m}\frac{1}{2}\cos\frac{(2i+2m+1)p\pi}{16}\cos\frac{q\pi}{16} \cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+1}^{-2}\sum_{j=0}^{6-n}\Upsilon\cos\frac{(2i+17)k\pi}{16}\cos\frac{(2j+1)l\pi}{16} + \sum_{i=-m+1}^{-2}\frac{1}{2}\cos\frac{(2i+2m+1)p\pi}{16}\cos\frac{15q\pi}{16} \cos\frac{(2i+17)k\pi}{16}\cos\frac{(15-2n)l\pi}{16}\right] +$$

$$\sum_{p=0}^{7}\sum_{q=0}^{7} D_{pq}\left[\sum_{i=-m+1}^{-2}\sum_{j=-n}^{-1}\Upsilon\cos\frac{(2i+17)k\pi}{16}\cos\frac{(2j+17)l\pi}{16} + \sum_{i=-m+1}^{-2}\frac{1}{2}\cos\frac{(2i+2m+1)p\pi}{16}\cos\frac{q\pi}{16} \cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{7-m'}\sum_{j=0}^{6-n'}\Upsilon'\cos\frac{(2i+3)k\pi}{16}\cos\frac{(2j+1)l\pi}{16} + \sum_{i=0,2}^{7-m'}\frac{1}{2}\cos\frac{(2i+2m'+1)p\pi}{16}\cos\frac{15q\pi}{16} \cos\frac{(2i+3)k\pi}{16}\cos\frac{(15-2n')l\pi}{16}\right] +$$

$$\sum_{p=0}^{7}\sum_{q=0}^{7} B'_{pq}\left[\sum_{i=0,2}^{7-m'}\sum_{j=-n'}^{-1}\Upsilon'\cos\frac{(2i+3)k\pi}{16}\cos\frac{(2j+17)l\pi}{16} + \sum_{i=0,2}^{7-m'}\frac{1}{2}\cos\frac{(2i+2m'+1)p\pi}{16}\cos\frac{q\pi}{16} \cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=-m'+1}^{-2}\sum_{j=0}^{6-n'}\Upsilon'\frac{(2i+19)k\pi}{16}\cos\frac{(2j+1)l\pi}{16} + \sum_{i=-m'+1}^{-2}\frac{1}{2}\cos\frac{(2i+2m'+1)p\pi}{16}\cos\frac{15q\pi}{16} \cos\frac{(2i+19)k\pi}{16}\cos\frac{(15-2n')l\pi}{16}\right] +$$

$$\sum_{p=0}^{7}\sum_{q=0}^{7} D'_{pq}\left[\sum_{i=-m'+1}^{-2}\sum_{j=-n'}^{-1}\Upsilon\cos\frac{(2i+19)k\pi}{16}\cos\frac{(2j+17)l\pi}{16} + \sum_{i=-m'+1}^{-2}\frac{1}{2}\cos\frac{(2i+2m'+1)p\pi}{16}\cos\frac{q\pi}{16} \cos\frac{(2i+19)k\pi}{16}\cos\frac{(15-2n')l\pi}{16}\right]$$

(39)

The summation terms including $A_{pq}$, $B_{pq}$, $C_{pq}$, and $D_{pq}$ in expression (39) represent the e→o portion of the frame composite macro block E, while the summation terms including $A'_{pq}$, $B'_{pq}$, $C'_{pq}$, and $D'_{pq}$ in expression (39) represent the e→e portion of the frame composite macro block E.

Using expression (39), the motion compensated frame macro block E can be derived for horizontal half-pel accuracy when the even and odd fields are encoded based on the even field of the anchor frame.

Case (3) o→o and e→e

Expression (40) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{2}(a_{i+m,j+n} + a_{i+m,j+n+1}) & 0, 2 \leq i \leq 6-m; 0 \leq j \leq 6-n \\ \frac{1}{2}(b_{i+m,j+n-8} + b_{i+m,j+n-7}) & 0, 2 \leq i \leq 6-m; 8-n \leq j \leq 7 \\ \frac{1}{2}(c_{i+m-8,j+n} + c_{i+m-8,j+n+1}) & 8-m \leq i \leq 6; 0 \leq j \leq 6-n \\ \frac{1}{2}(d_{i+m-8,j+n-8} + d_{i+m-8,j+n-7}) & 8-m \leq i \leq 6; 8-n \leq j \leq 7 \\ \frac{1}{2}(a_{i+m,7} + b_{i+m,0}) & 0 \leq i \leq 6-m; j = 7-n \\ \frac{1}{2}(c_{i+m-8,7} + d_{i+m-8,0}) & 8-m \leq i \leq 6; j = 7-n \\ \frac{1}{2}(a'_{i+m'-1,j+n'} + a'_{i+m'-1,j+n'-1}) & 1, 3 \leq i \leq 8-m'; 0 \leq j \leq 6-n' \\ \frac{1}{2}(b'_{i+m'-1,j+n'-8} + b'_{i+m'-1,j+n'-7}) & 1, 3 \leq i \leq 8-m'; 8-n' \leq j \leq 7 \\ \frac{1}{2}(c'_{i+m'-9,j+n'} + c'_{i+m'-9,j+n'+1}) & 10-m' \leq i \leq 7; 0 \leq j \leq 6-n' \\ \frac{1}{2}(d'_{i+m'-9,j+n'-8} + d'_{i+m'-9,j+n'-7}) & 10-m' \leq i \leq 7; 8-n' \leq j \leq 7 \\ \frac{1}{2}(a'_{i+m'-1,7} + b'_{i+m'-1,0}) & 1, 3 \leq i \leq 8-m'; j = 7-n' \\ \frac{1}{2}(c'_{i+m'-9,7} + d'_{i+m'-9,0}) & 10-m' \leq i \leq 7; j = 7-n' \end{cases} \quad (40)$$

where $m = 0, 2, 4, 6$ and $m' = 1, 3, 5, 7$

The top half of expression (40) represents the o→o portion of the frame composite macro block e, while the bottom portion of expression (40) represents the e→e portion of the frame composite macro block e.

Using expression (40), expression (41) below is derived in the same manner as expression (41).

$$E_{kl} = \sum_{p=0}^{7}\sum_{q=0}^{7} A_{pq}\left[\sum_{i=0,2}^{6-m}\sum_{j=0}^{6-n} \Upsilon\cos\frac{(2i+1)k\pi}{16}\cos\frac{(2j+1)l\pi}{16} + \sum_{i=0,2}^{6-m}\frac{1}{2}\cos\frac{(2i+2m+1)p\pi}{16}\cos\frac{15q\pi}{16}\cos\frac{(2i+1)k\pi}{16}\cos\frac{(15-2n)l\pi}{16}\right] + \quad (41)$$

$$\sum_{p=0}^{7}\sum_{q=0}^{7} B_{pq}\left[\sum_{i=0,2}^{6-m}\sum_{j=-n}^{-1} \Upsilon\cos\frac{(2i+1)k\pi}{16}\cos\frac{(2j+17)l\pi}{16} + \sum_{i=0,2}^{6-m}\frac{1}{2}\cos\frac{(2i+2m+1)p\pi}{16}\cos\frac{q\pi}{16}\cos\frac{(2i+1)k\pi}{16}\cos\frac{(15-2n)l\pi}{16}\right] +$$

$$\sum_{p=0}^{7}\sum_{q=0}^{7} C_{pq}\left[\sum_{i=-m+2,-m}^{-2}\sum_{j=0}^{6-n} \Upsilon\cos\frac{(2i+17)k\pi}{16}\cos\frac{(2j+1)l\pi}{16} + \sum_{i=-m}^{-2}\frac{1}{2}\cos\frac{(2i+2m+1)p\pi}{16}\cos\frac{15q\pi}{16}\cos\frac{(2i+17)k\pi}{16}\cos\frac{(15-2n)l\pi}{16}\right] +$$

-continued $$\sum_{p=0}^{7}\sum_{q=0}^{7} D_{pq}\left[\sum_{i=-m}^{-2}\sum_{j=-n}^{-1} \Upsilon\cos\frac{(2i+17)k\pi}{16}\cos\frac{(2j+17)l\pi}{16} + \sum_{i=-m}^{-2}\frac{1}{2}\cos\frac{(2i+2m+1)p\pi}{16}\cos\frac{q\pi}{16}\cos\frac{(2i+17)k\pi}{16}\cos\frac{(15-2n)l\pi}{16}\right] +$$

$$\sum_{p=0}^{7}\sum_{q=0}^{7} A'_{pq}\left[\sum_{i=0,2}^{7-m'}\sum_{j=0}^{6-n'} \Upsilon'\cos\frac{(2i+3)k\pi}{16}\cos\frac{(2j+1)l\pi}{16} + \sum_{i=0,2}^{7-m'}\frac{1}{2}\cos\frac{(2i+2m'+1)p\pi}{16}\cos\frac{15q\pi}{16}\cos\frac{(2i+3)k\pi}{16}\cos\frac{(15-2n')l\pi}{16}\right] +$$

$$\sum_{p=0}^{7}\sum_{q=0}^{7} B'_{pq}\left[\sum_{i=0,2}^{7-m'}\sum_{j=-n'}^{-1} \Upsilon'\cos\frac{(2i+3)k\pi}{16}\cos\frac{(2j+17)l\pi}{16} + \sum_{i=0,2}^{7-m'}\frac{1}{2}\cos\frac{(2i+2m'+1)p\pi}{16}\cos\frac{q\pi}{16}\cos\frac{(2i+3)k\pi}{16}\cos\frac{(15-2n')l\pi}{16}\right] +$$

$$\sum_{p=0}^{7}\sum_{q=0}^{7} C'_{pq}\left[\sum_{i=-m'+1}^{-2}\sum_{j=0}^{6-n'} \Upsilon'\frac{(2i+19)k\pi}{16}\cos\frac{(2j+1)l\pi}{16} + \sum_{i=-m'+1}^{-2}\frac{1}{2}\cos\frac{(2i+2m'+1)p\pi}{16}\cos\frac{15q\pi}{16}\right.$$

-continued $$\cos\frac{(2i+19)k\pi}{16}\cos\frac{(15-2n')l\pi}{16}\Bigg]+$$

$$\sum_{p=0}^{7}\sum_{q=0}^{7}D'_{pq}\Bigg[\sum_{i=-m'+1}^{-2}\sum_{j=-n'}^{-1}\Upsilon\cos\frac{(2i+19)k\pi}{16}\cos\frac{(2j+17)l\pi}{16}+$$

$$\sum_{i=-m'+1}^{-2}\frac{1}{2}\cos\frac{(2i+2m'+1)p\pi}{16}\cos\frac{q\pi}{16}$$

$$\cos\frac{(2i+19)k\pi}{16}\cos\frac{(15-2n')l\pi}{16}\Bigg]$$

The summation terms including $A_{pq}$, $B_{pq}$, $C_{pq}$, and $D_{pq}$ in expression (41) represent the o→o portion of the frame composite macro block E, while the summation terms including $A'_{pq}$, $B'_{pq}$, $C'_{pq}$, and $D'_{pq}$ in expression (41) represent the e→e portion of the frame composite macro block E.

Using expression (41), the motion compensated frame macro block E can be derived for horizontal half-pel accuracy when the odd and even fields are encoded based on the odd and even fields, respectively, of the anchor frame.

Case (4) e→o and o→e

Expression (42) below represents the relationship between frame composite macro block e and the macro blocks a–d and a'–d' in the spatial domain when the odd and even fields are encoded based on the even and odd fields, respectively, of the anchor frame.

$$e_{ij}=\begin{cases}\frac{1}{2}(a_{i+m,j+n}+a_{i+m,j+n+1}) & 0,2\leq i\leq 7-m;0\leq j\leq 6-n \\ \frac{1}{2}(b_{i+m,j+n-8}+b_{i+m,j+n-7}) & 0,2\leq i\leq 7-m;8-n\leq j\leq 7 \\ \frac{1}{2}(c_{i+m-8,j+n}+c_{i+m-8,j+n+1}) & 9-m\leq i\leq 6;0\leq j\leq 6-n \\ \frac{1}{2}(d_{i+m-8,j+n-8}+d_{i+m-8,j+n-7}) & 9-m\leq i\leq 6;8-n\leq j\leq 7 \\ \frac{1}{2}(a_{i+m,7}+b_{i+m,0}) & 0\leq i\leq 7-m;j=7-n \\ \frac{1}{2}(c_{i+m-8,7}+d_{i+m-8,0}) & 9-m\leq i\leq 6;j=7-n \\ \frac{1}{2}(a'_{i+m'-1,j+n'}+a'_{i+m'-1,j+n'-1}) & 1,3\leq i\leq 7-m';i=0\leq j\leq 6-n' \\ \frac{1}{2}(b'_{i+m'-1,j+n'-8}+b'_{i+m'-1,j+n'-7}) & 1,3\leq i\leq 7-m';8-n'\leq j\leq 7 \\ \frac{1}{2}(c'_{i+m'-9,j+n'}+c'_{i+m'-9,j+n'+1}) & 9-m'\leq i\leq 7;0\leq j\leq 6-n' \\ \frac{1}{2}(d'_{i+m'-9,j+n'-8}+d'_{i+m'-9,j+n'-7}) & 9-m'\leq i\leq 7;8-n'\leq j\leq 7 \\ \frac{1}{2}(a'_{i+m'-1,7}+b'_{i+m'-1,0}) & 1,3\leq i\leq 7-m';j=7-n' \\ \frac{1}{2}(c'_{i+m'-9,7}+d'_{i+m'-9,0}) & 9-m'\leq i\leq 7;j=7-n'\end{cases}\quad(42)$$

where $m=1,3,5,7$ and $m'=0,2,4,6$

The top half of expression (42) represents the e→o portion of the frame composite macro block e, while the bottom portion of expression (42) represents the o→e portion of the frame composite macro block e.

Using expression (42), expression (43) below is derived in the same manner as expression (14).

$$E_{kl}=\sum_{p=0}^{7}\sum_{q=0}^{7}A_{pq}\Bigg[\sum_{i=0,2}^{7-m}\sum_{j=0}^{6-n}\Upsilon\cos\frac{(2i+1)k\pi}{16}\cos\frac{(2j+1)l\pi}{16}+ \quad (43)$$

$$\sum_{i=0,2}^{7-m}\frac{1}{2}\cos\frac{(2i+2m+1)p\pi}{16}\cos\frac{15q\pi}{16}$$

$$\cos\frac{(2i+1)k\pi}{16}\cos\frac{(15-2n)l\pi}{16}\Bigg]+$$

$$\sum_{p=0}^{7}\sum_{q=0}^{7}B_{pq}\Bigg[\sum_{i=0,2}^{7-m}\sum_{j=-n}^{-1}\Upsilon\cos\frac{(2i+1)k\pi}{16}\cos\frac{(2j+17)l\pi}{16}+$$

$$\sum_{i=0,2}^{7-m}\frac{1}{2}\cos\frac{(2i+2m+1)p\pi}{16}\cos\frac{q\pi}{16}$$

$$\cos\frac{(2i+1)k\pi}{16}\cos\frac{(15-2n)l\pi}{16}\Bigg]+$$

$$\sum_{p=0}^{7}\sum_{q=0}^{7}C_{pq}\Bigg[\sum_{i=-m+1}^{-2}\sum_{j=0}^{6-n}\Upsilon\cos\frac{(2i+17)k\pi}{16}\cos\frac{(2j+1)l\pi}{16}+$$

$$\sum_{i=-m+1}^{-2}\frac{1}{2}\cos\frac{(2i+2m+1)p\pi}{16}\cos\frac{15q\pi}{16}$$

$$\cos\frac{(2i+17)k\pi}{16}\cos\frac{(15-2n)l\pi}{16}\Bigg]+$$

$$\sum_{p=0}^{7}\sum_{q=0}^{7}D_{pq}\left[\sum_{i=-m+1}^{-2}\sum_{j=-n}^{-1}\Upsilon\cos\frac{(2i+17)k\pi}{16}\cos\frac{(2j+17)l\pi}{16}+\right.$$

$$\sum_{i=-m+1}^{-2}\frac{1}{2}\cos\frac{(2i+2m+1)p\pi}{16}\cos\frac{q\pi}{16}$$

$$\left.\cos\frac{(2i+17)k\pi}{16}\cos\frac{(15-2n)l\pi}{16}\right]+$$

$$\sum_{p=0}^{7}\sum_{q=0}^{7}A'_{pq}\left[\sum_{i=0,2}^{6-m'}\sum_{j=0}^{6-n'}\Upsilon'\cos\frac{(2i+3)k\pi}{16}\cos\frac{(2j+1)l\pi}{16}+\right.$$

$$\sum_{i=0,2}^{6-m'}\frac{1}{2}\cos\frac{(2i+2m'+1)p\pi}{16}\cos\frac{15q\pi}{16}$$

$$\left.\cos\frac{(2i+3)k\pi}{16}\cos\frac{(15-2n')l\pi}{16}\right]+$$

$$\sum_{p=0}^{7}\sum_{q=0}^{7}B'_{pq}\left[\sum_{i=0,2}^{6-m'}\sum_{j=-n'}^{-1}\Upsilon'\cos\frac{(2i+3)k\pi}{16}\cos\frac{(2j+17)l\pi}{16}+\right.$$

$$\sum_{i=0,2}^{6-m'}\frac{1}{2}\cos\frac{(2i+2m'+1)p\pi}{16}\cos\frac{q\pi}{16}$$

$$\left.\cos\frac{(2i+3)k\pi}{16}\cos\frac{(15-2n')l\pi}{16}\right]+$$

$$\sum_{p=0}^{7}\sum_{q=0}^{7}C'_{pq}\left[\sum_{i=-m'+2,-m'}^{-2}\sum_{j=0}^{6-n'}\Upsilon'\frac{(2i+19)k\pi}{16}\cos\frac{(2j+1)l\pi}{16}+\right.$$

$$\sum_{i=-m'}^{-2}\frac{1}{2}\cos\frac{(2i+2m'+1)p\pi}{16}\cos\frac{15q\pi}{16}$$

$$\left.\cos\frac{(2i+19)k\pi}{16}\cos\frac{(15-2n')l}{16}+\right.$$

$$\sum_{p=0}^{7}\sum_{q=0}^{7}D'_{pq}\left[\sum_{i=-m'}^{-2}\sum_{j=-n'}^{-1}\Upsilon\cos\frac{(2i+19)k\pi}{16}\cos\frac{(2j+17)l\pi}{16}+\right.$$

$$\sum_{i=-m'}^{-2}\frac{1}{2}\cos\frac{(2i+2m'+1)p\pi}{16}\cos\frac{q\pi}{16}$$

$$\left.\cos\frac{(2i+19)k\pi}{16}\cos\frac{(15-2n')l\pi}{16}\right]$$

The summation terms including $A_{pq}$, $B_{pq}$, $C_{pq}$, and $D_{pq}$ in expression (43) represent the e→o portion of the frame composite macro block E, while the summation terms including $A'_{pq}$, $B'_{pq}$, $C'_{pq}$, and $D'_{pq}$ in expression (43) represent the o→e portion of the frame composite macro block E.

Using expression (43), the motion compensated frame macro block E can be derived for horizontal half-pel accuracy when the odd and even fields are encoded based on the even and odd fields, respectively, of the anchor frame.

Vertical Half-Pel Accuracy

Case (1) o→o and o→e

Expression (44) below represents the relationship between the frame composite macro block e and the macro blocks a–d and a'–d' in the anchor frame in the spatial domain when the even and odd fields are encoded based on the odd field of the anchor frame.

$$e_{ij} = \begin{cases} \frac{1}{2}(a_{i+m,j+n} + a_{i+m+2,j+n}) & 0, 2 \leq i \leq 4-m; 0 \leq j \leq 7-n \\ \frac{1}{2}(b_{i+m,j+n-8} + b_{i+m+2,j+n-8}) & 0, 2 \leq i \leq 4-m; 8-n \leq j \leq 7 \\ \frac{1}{2}(c_{i+m-8,j+n} + c_{i+m-6,j+n}) & 8-m \leq i \leq 6; 0 \leq j \leq 7-n \\ \frac{1}{2}(d_{i+m-8,j+n-8} + d_{i+m-6,j+n-8}) & 8-m \leq i \leq 6; 8-n \leq j \leq 7 \\ \frac{1}{2}(a_{i+m,j+n} + c_{i+m-6,j+n}) & i = 6-m; 0 \leq i \leq 7-n \\ \frac{1}{2}(b_{i+m,j+n-8} + d_{i+m-6,j+n-8}) & 8 = 6-m; 8-n \leq j \leq 7 \\ \frac{1}{2}(a'_{i+m'-1,j+n} + a'_{i+m'+1,j+n'}) & 1, 3 \leq i \leq 5-m'; 0 \leq j \leq 7-n' \\ \frac{1}{2}(b'_{i+m'-1,j+n'-8} + b'_{i+m'+1,j+n'-8}) & 1, 3 \leq i \leq 5-m'; 8-n' \leq j \leq 7 \\ \frac{1}{2}(c'_{i+m'-9,j+n'} + c'_{i+m'-7,j+n'}) & 9-m' \leq i \leq 7; 0 \leq j \leq 7-n' \\ \frac{1}{2}(d'_{i+m'-9,j+n'-8} + d'_{i+m'-7,j+n'-8}) & 9-m' \leq i \leq 7; 8-n' \leq j \leq 7 \\ \frac{1}{2}(a'_{i+m'-1,j+n'} + c'_{i+m'-7,j+n'}) & i = 7-m'; 0 \leq j \leq 7-n' \\ \frac{1}{2}(b'_{i+m'-1,j+n'-8} + d'_{i+m'-7,j+n'-8}) & i = 7-m'; 8-n' \leq j \leq 7 \end{cases} \quad (44)$$

where $m = 0, 2, 4, 6$ and $m' = 0, 2, 4, 6$

The top half of expression (44) represents the o→o portion of the frame composite macro block e, while the bottom portion of expression (44) represents the o→e portion of the frame composite macro block e.

Using expression (44), expression (45) below is derived in the same manner as expression (14).

$$E_{kl} = \sum_{p=0}^{7}\sum_{q=0}^{7} A_{pq} \left[ \sum_{i=0,2}^{4-m}\sum_{j=0}^{7-n} X \cos\frac{(2i+1)k\pi}{16}\cos\frac{(2j+1)l\pi}{16} + \sum_{j=0}^{7-m}\frac{1}{2}\cos\frac{13p\pi}{16}\cos\frac{(2j+2n+1)q\pi}{16} \cos\frac{(13-2m)k\pi}{16}\cos\frac{(2j+1)l\pi}{16} \right] +$$

$$\sum_{p=0}^{7}\sum_{q=0}^{7} B_{pq} \left[ \sum_{i=0,2}^{4-m}\sum_{j=-n}^{-1} X \cos\frac{(2i+1)k\pi}{16}\cos\frac{(2j+17)l\pi}{16} + \sum_{j=-n}^{-1}\frac{1}{2}\cos\frac{13p\pi}{16}\cos\frac{(2j+2n+1)q\pi}{16} \cos\frac{(13-2m)k\pi}{16}\cos\frac{(2j+17)l\pi}{16} \right] +$$

$$\sum_{p=0}^{7}\sum_{q=0}^{7} C_{pq} \left[ \sum_{i=2-m,-m}^{-2}\sum_{j=0}^{7-n} X \cos\frac{(2i+17)k\pi}{16}\cos\frac{(2j+1)l\pi}{16} + \sum_{j=0}^{7-n}\frac{1}{2}\cos\frac{p\pi}{16}\cos\frac{(2j+2n+1)q\pi}{16} \cos\frac{(13-2m)k\pi}{16}\cos\frac{(2j+1)l\pi}{16} \right] +$$

(45)

$$\sum_{p=0}^{7}\sum_{q=0}^{7} D_{pq} \left[ \sum_{i=-2-m,-m}^{-2}\sum_{j=-n}^{-1} X \cos\frac{(2i+17)k\pi}{16}\cos\frac{(2j+17)l\pi}{16} + \sum_{j=0}^{7-n}\frac{1}{2}\cos\frac{p\pi}{16}\cos\frac{(2j+2n+1)q\pi}{16} \cos\frac{(13-2m)k\pi}{16}\cos\frac{(2j+17)l\pi}{16} \right] +$$

$$\sum_{p=0}^{7}\sum_{q=0}^{7} A'_{pq} \left[ \sum_{i=0,2}^{4-m'}\sum_{j=0}^{7-n'} X' \cos\frac{(2i+3)k\pi}{16}\cos\frac{(2j+1)l\pi}{16} + \sum_{j=0}^{7-n'}\frac{1}{2}\cos\frac{13p\pi}{16}\cos\frac{(2j+2n'+1)q\pi}{16} \cos\frac{(15-2m')k\pi}{16}\cos\frac{(2j+1)l\pi}{16} \right] +$$

$$\sum_{p=0}^{7}\sum_{q=0}^{7} B'_{pq} \left[ \sum_{i=0,2}^{4-m'}\sum_{j=-n'}^{-1} X' \cos\frac{(2i+3)k\pi}{16}\cos\frac{(2j+17)l\pi}{16} + \sum_{j=-n'}^{-1}\frac{1}{2}\cos\frac{13p\pi}{16}\cos\frac{(2j+2n'+1)q\pi}{16} \cos\frac{(15-2m')k\pi}{16}\cos\frac{(2j+17)l\pi}{16} \right] +$$

-continued $$\sum_{p=0}^{7}\sum_{q=0}^{7}C'_{pq}\left[\sum_{i=2-m',-m'}^{-2}\sum_{j=0}^{7-n'}X'\cos\frac{(2i+19)k\pi}{16}\cos\frac{(2j+1)l\pi}{16}+\right.$$

$$\sum_{j=0}^{7-n'}\frac{1}{2}\cos\frac{p\pi}{16}\cos\frac{(2j+2n'+1)q\pi}{16}$$

$$\left.\cos\frac{(15-2m')k\pi}{16}\cos\frac{(2j+1)l\pi}{16}\right]+$$

$$\sum_{p=0}^{7}\sum_{q=0}^{7}D'_{pq}\left[\sum_{i=2-m',-m'}^{-2}\sum_{j=-1}^{-n'}X'\cos\frac{(2i+19)k\pi}{16}\cos\frac{(2j+17)l\pi}{16}+\right.$$

$$\sum_{j=0}^{7-n'}\frac{1}{2}\cos\frac{p\pi}{16}\cos\frac{(2j+2n'+1)q\pi}{16}$$

including $A'_{pq}$, $B'_{pq}$, $C'_{pq}$, and $D'_{pq}$ in expression (45) represent the o→e portion of the frame composite macro block E.

Using expression (45), the motion compensated frame macro block E can be derived for vertical half-pel accuracy when the even and odd fields are encoded based on the odd field of the anchor frame.

Case (2) e→o and e→e

Expression (47) below represents the relationship between frame composite macro block e and the macro blocks a–d and a'–d' in the spatial domain when the even and odd fields are encoded based on the even field of the anchor frame.

$$e_{ij}=\begin{cases}\frac{1}{2}(a_{i+m,j+n}+a_{i+m+2,j+n}) & 0,2\leq i\leq 5-m; 0\leq j\leq 7-n \\ \frac{1}{2}(b_{i+m,j+n-8}+b_{i+m+2,j+n-8}) & 0,2\leq i\leq 5-m; 8-n\leq j\leq 7 \\ \frac{1}{2}(c_{i+m-8,j+n}+c_{i+m-6,j+n}) & 9-m\leq i\leq 6; 0\leq j\leq 7-n \\ \frac{1}{2}(d_{i+m-8,j+n-8}+d_{i+m-6,j+n-8}) & 9-m\leq i\leq 6; 8-n\leq j\leq 7 \\ \frac{1}{2}(a_{i+m,j+n}+c_{i+m-6,j+n}) & i=7-m; 0\leq i\leq 7-n \\ \frac{1}{2}(b_{i+m,j+n-8}+d_{i+m-6,j+n-8}) & 8=7-m; 8-n\leq j\leq 7 \\ \frac{1}{2}(a'_{i+m'-1,j+n}+a'_{i+m'+1,j+n'}) & 1,3\leq i\leq 6-m'; 0\leq j\leq 7-n' \\ \frac{1}{2}(b'_{i+m'-1,j+n'-8}+b'_{i+m'+1,j+n'-8}) & 1,3\leq i\leq 6-m'; 8-n'\leq j\leq 7 \\ \frac{1}{2}(c'_{i+m'-9,j+n'}+c'_{i+m'-7,j+n'}) & 10-m'\leq i\leq 7; 0\leq j\leq 7-n' \\ \frac{1}{2}(d'_{i+m'-9,j+n'-8}+d'_{i+m'-7,j+n'-8}) & 10-m'\leq i\leq 7; 8-n'\leq j\leq 7 \\ \frac{1}{2}(a'_{i+m'-1,j+n'}+c'_{i+m'-7,j+n'}) & i=8-m'; 0\leq j\leq 7-n' \\ \frac{1}{2}(b'_{i+m'-1,j+n'-8}+d'_{i+m'-7,j+n'-8}) & i=8-m'; 8-n'\leq j\leq 7\end{cases}\quad(47)$$

where $m=1,3,5,7$ and $m'=1,3,5,7$

The top half of expression (47) represents the e→o portion of the frame composite macro block e, while the bottom portion of expression (47) represents the e→e portion of the frame composite macro block e.

-continued $$\cos\frac{(15-2m')k\pi}{16}\cos\frac{(2j+17)l\pi}{16}\right]$$

where $$X=\cos\frac{(2i+2m+3)p\pi}{16}\cos\frac{p\pi}{8}\cos\frac{(2j+2n+1)q\pi}{16}\quad(46A)$$

$$X'=\cos\frac{(2i+2m'+3)p\pi}{16}\cos\frac{p\pi}{8}\cos\frac{(2j+2n'+1)q\pi}{16}\quad(46B)$$

The summation terms including $A_{pq}$, $B_{pq}$, $C_{pq}$, and $D_{pq}$ in expression (45) represent the o→o portion of the frame composite macro block E, while the summation terms Using expression (47), expression (48) below is derived in the same manner as expression (14).

$$E_{kl}=\sum_{p=0}^{7}\sum_{q=0}^{7}A_{pq}\left[\sum_{i=0,2}^{5-m}\sum_{j=0}^{7-n}X\cos\frac{(2i+1)k\pi}{16}\cos\frac{(2j+1)l\pi}{16}+\right.\quad(48)$$

$$\sum_{j=0}^{7-m}\frac{1}{2}\cos\frac{15p\pi}{16}\cos\frac{(2j+2n+1)q\pi}{16}$$

$$\cos\frac{(15-2m)k\pi}{16}\cos\frac{(2j+1)l\pi}{16}\Bigg]+$$

$$\sum_{p=0}^{7}\sum_{q=0}^{7}B_{pq}\Bigg[\sum_{i=0,2}^{5-m}\sum_{j=-n}^{-1}X\cos\frac{(2i+1)k\pi}{16}\cos\frac{(2j+17)l\pi}{16}+$$

$$\sum_{j=-n}^{-1}\frac{1}{2}\cos\frac{15p\pi}{16}\cos\frac{(2j+2n+1)q\pi}{16}$$

$$\cos\frac{(15-2m)k\pi}{16}\cos\frac{(2j+17)l\pi}{16}\Bigg]+$$

$$\sum_{p=0}^{7}\sum_{q=0}^{7}C_{pq}\Bigg[\sum_{i=3-m,1-m}^{-2}\sum_{j=0}^{7-n}X\cos\frac{(2i+17)k\pi}{16}\cos\frac{(2j+1)l\pi}{16}+$$

$$\sum_{j=0}^{7-n}\frac{1}{2}\cos\frac{3p\pi}{16}\cos\frac{(2j+2n+1)q\pi}{16}$$

$$\cos\frac{(15-2m)k\pi}{16}\cos\frac{(2j+1)l\pi}{16}\Bigg]+$$

$$\sum_{p=0}^{7}\sum_{q=0}^{7}D_{pq}\Bigg[\sum_{i=3-m,1-m}^{-2}\sum_{j=-n}^{-1}X\cos\frac{(2i+17)k\pi}{16}\cos\frac{(2j+17)l\pi}{16}+$$

$$\sum_{j=0}^{7-n}\frac{1}{2}\cos\frac{3p\pi}{16}\cos\frac{(2j+2n+1)q\pi}{16}$$

$$\cos\frac{(15-2m)k\pi}{16}\cos\frac{(2j+17)l\pi}{16}\Bigg]+$$

$$\sum_{p=0}^{7}\sum_{q=0}^{7}A'_{pq}\Bigg[\sum_{i=0,2}^{5-m'}\sum_{j=0}^{7-n'}X'\cos\frac{(2i+3)k\pi}{16}\cos\frac{(2j+1)l\pi}{16}+$$

$$\sum_{j=0}^{7-n'}\frac{1}{2}\cos\frac{15p\pi}{16}\cos\frac{(2j+2n'+1)q\pi}{16}$$

$$\cos\frac{(17-2m')k\pi}{16}\cos\frac{(2j+1)l\pi}{16}\Bigg]+$$

$$\sum_{p=0}^{7}\sum_{q=0}^{7}B'_{pq}\Bigg[\sum_{i=0,2}^{5-m'}\sum_{j=-n'}^{-1}X'\cos\frac{(2i+3)k\pi}{16}\cos\frac{(2j+17)l\pi}{16}+$$

$$\sum_{j=-n'}^{-1}\frac{1}{2}\cos\frac{15p\pi}{16}\cos\frac{(2j+2n'+1)q\pi}{16}$$

$$\cos\frac{(17-2m')k\pi}{16}\cos\frac{(2j+17)l\pi}{16}\Bigg]+$$

$$\sum_{p=0}^{7}\sum_{q=0}^{7}C'_{pq}\Bigg[\sum_{i=3-m',1-m'}^{-2}\sum_{j=0}^{7-n'}X'\cos\frac{(2i+19)k\pi}{16}\cos\frac{(2j+1)l\pi}{16}+$$

$$\sum_{j=0}^{7-n'}\frac{1}{2}\cos\frac{3p\pi}{16}\cos\frac{(2j+2n'+1)q\pi}{16}$$

$$\cos\frac{(17-2m')k\pi}{16}\cos\frac{(2j+1)l\pi}{16}\Bigg] +$$

$$\sum_{p=0}^{7}\sum_{q=0}^{7}D'_{pq}\Bigg[\sum_{i=3-m',1-m'}^{-2}\sum_{j=-n'}^{-1}X'\cos\frac{(2i+19)k\pi}{16}\cos\frac{(2j+17)l\pi}{16} +$$

$$\sum_{j=0}^{7-n'}\frac{1}{2}\cos\frac{3p\pi}{16}\cos\frac{(2j+2n'+1)q\pi}{16}$$

$$\cos\frac{(17-2m')k\pi}{16}\cos\frac{(2j+17)l\pi}{16}\Bigg]$$

The summation terms including $A_{pq}$, $B_{pq}$, $C_{pq}$, and $D_{pq}$ in expression (48) represent the e→o portion of the frame composite macro block E, while the summation terms including $A'_{pq}$, $B'_{pq}$, $C'_{pq}$, and $D'_{pq}$ in expression (48) represent the e→e portion of the frame composite macro block E.

Using expression (48), the motion compensated frame macro block E can be derived for vertical half-pel accuracy when the even and odd fields are encoded based on the even field of the anchor frame.

Case (3) o→o and e→e

Expression (49) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{2}(a_{i+m,j+n}+a_{i+m+2,j+n}) & 0, 2 \le i \le 4-m; 0 \le j \le 7-n \\ \frac{1}{2}(b_{i+m,j+n-8}+b_{i+m+2,j+n-8}) & 0, 2 \le i \le 4-m; 8-n \le j \le 7 \\ \frac{1}{2}(c_{i+m-8,j+n}+c_{i+m-6,j+n}) & 8-m \le i \le 6; 0 \le j \le 7-n \\ \frac{1}{2}(d_{i+m-8,j+n-8}+d_{i+m-6,j+n-8}) & 8-m \le i \le 6; 8-n \le j \le 7 \\ \frac{1}{2}(a_{i+m,j+n}+c_{i+m-6,j+n}) & i = 6-m; 0 \le i \le 7-n \\ \frac{1}{2}(b_{i+m,j+n-8}+d_{i+m-6,j+n-8}) & 8 = 6-m; 8-n \le j \le 7 \\ \frac{1}{2}(a'_{i+m'-1,j+n}+a'_{i+m'+1,j+n'}) & 1, 3 \le i \le 6-m'; 0 \le j \le 7-n' \\ \frac{1}{2}(b'_{i+m'-1,j+n'-8}+b'_{i+m'+1,j+n'-8}) & 1, 3 \le i \le 6-m'; 8-n' \le j \le 7 \\ \frac{1}{2}(c'_{i+m'-9,j+n'}+c'_{i+m'-7,j+n'}) & 10-m' \le i \le 7; 0 \le j \le 7-n' \\ \frac{1}{2}(d'_{i+m'-9,j+n'-8}+d'_{i+m'-7,j+n'-8}) & 10-m' \le i \le 7; 8-n' \le j \le 7 \\ \frac{1}{2}(a'_{i+m'-1,j+n'}+c'_{i+m'-7,j+n'}) & i = 8-m'; 0 \le j \le 7-n' \\ \frac{1}{2}(b'_{i+m'-1,j+n'-8}+d'_{i+m'-7,j+n'-8}) & i = 8-m'; 8-n' \le j \le 7 \end{cases} \quad (49)$$

where $m = 0, 2, 4, 6$ and $m' = 1, 3, 5, 7$

The top half of expression (49) represents the o→o portion of the frame composite macro block e, while the bottom portion of expression (49) represents the e→e portion of the frame composite macro block e.

Using expression (49), expression (50) below is derived in the same manner as expression (14).

including $A'_{pq}$, $B'_{pq}$, $C'_{pq}$, and $D'_{pq}$ in expression (50) represent the e→e portion of the frame composite macro block E.

Using expression (50), the motion compensated frame macro block E can be derived for vertical half-pel accuracy $$E_{kl} = \sum_{p=0}^{7}\sum_{q=0}^{7} A_{pq}\left[\sum_{i=0,2}^{4-m}\sum_{j=0}^{7-n} X\cos\frac{(2i+1)k\pi}{16}\cos\frac{(2j+1)l\pi}{16} + \sum_{j=0}^{7-n}\frac{1}{2}\cos\frac{13p\pi}{16}\cos\frac{(2j+2n+1)q\pi}{16}\cos\frac{(13-2m)k\pi}{16}\cos\frac{(2j+1)l\pi}{16}\right] + \qquad(50)$$

$$\sum_{p=0}^{7}\sum_{q=0}^{7} B_{pq}\left[\sum_{i=0,2}^{4-m}\sum_{j=-n}^{-1} X\cos\frac{(2i+1)k\pi}{16}\cos\frac{(2j+17)l\pi}{16} + \sum_{j=-n}^{-1}\frac{1}{2}\cos\frac{13p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} C_{pq}\left[\sum_{i=2,-m}^{-2}\sum_{j=0}^{7-n} X\cos\frac{(2i+17)k\pi}{16}\cos\frac{(2j+1)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+1)l\pi}{16}\right] +$$

$$\sum_{p=0}^{7}\sum_{q=0}^{7} D_{pq}\left[\sum_{i=2-m,-m}^{-2}\sum_{j=-n}^{-1} X\cos\frac{(2i+17)k\pi}{16}\cos\frac{(2j+17)l\pi}{16} + \sum_{j=0}^{7-n}\frac{1}{2}\cos\frac{p\pi}{16}\cos\frac{(2j+2n+1)q\pi}{16}\cos\frac{(13-2m)k\pi}{16}\cos\frac{(2j+17)l\pi}{16}\right] +$$

$$\sum_{p=0}^{7}\sum_{q=0}^{7} A'_{pq}\left[\sum_{i=0,2}^{5-m'}\sum_{j=0}^{7-n'} X'\cos\frac{(2i+3)k\pi}{16}\cos\frac{(2j+1)l\pi}{16} + \sum_{j=0}^{7-n'}\frac{1}{2}\cos\frac{15p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} B'_{pq}\left[\sum_{i=0,2}^{5-m'}\sum_{j=-n'}^{-1} X'\cos\frac{(2i+3)k\pi}{16}\cos\frac{(2j+17)l\pi}{16} + \sum_{j=-n'}^{-1}\frac{1}{2}\cos\frac{15p\pi}{16}\cos\frac{(2j+2n'+1)q\pi}{16}\cos\frac{(17-2m')k\pi}{16}\cos\frac{(2j+17)l\pi}{16}\right] +$$

$$\sum_{p=0}^{7}\sum_{q=0}^{7} C'_{pq}\left[\sum_{i=3-m',1-m'}^{-2}\sum_{j=0}^{7-n'} X'\cos\frac{(2i+19)k\pi}{16}\cos\frac{(2j+1)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+1)l\pi}{16}\right] +$$

$$\sum_{p=0}^{7}\sum_{q=0}^{7} D'_{pq}\left[\sum_{i=3-m',1-m'}^{-2}\sum_{j=-n'}^{-1} X'\cos\frac{(2i+19)k\pi}{16}\cos\frac{(2j+17)l\pi}{16} + \sum_{j=0}^{7-n'}\frac{1}{2}\cos\frac{3p\pi}{16}\cos\frac{(2j+2n'+1)q\pi}{16}\cos\frac{(17-2m')k\pi}{16}\cos\frac{(2j+17)l\pi}{16}\right]$$

The summation terms including $A_{pq}$, $B_{pq}$, $C_{pq}$, and $D_{pq}$ in expression (50) represent the o→o portion of the frame composite macro block E, while the summation terms when the odd and even fields are encoded based on the odd and even fields, respectively, of the anchor frame.

Case (4) e→o and o→e

Expression (51) below represents the relationship between frame composite macro block e and the macro blocks a–d and a'–d' in the spatial domain when the odd and even fields are encoded based on the even and odd fields, respectively, of the anchor frame.

The top half of expression (51) represents the e→o portion of the frame composite macro block e, while the bottom portion of expression (51) represents the o→e portion of the frame composite macro block e.

Using expression (51), expression (52) below is derived in the same manner as expression (14).

$$e_{ij} = \begin{cases} \frac{1}{2}(a_{i+m,j+n} + a_{i+m+2,j+n}) & 0, 2 \leq i \leq 5-m; 0 \leq j \leq 7-n \\ \frac{1}{2}(b_{i+m,j+n-8} + b_{i+m+2,j+n-8}) & 0, 2 \leq i \leq 5-m; 8-n \leq j \leq 7 \\ \frac{1}{2}(c_{i+m-8,j+n} + c_{i+m-6,j+n}) & 9-m \leq i \leq 6; 0 \leq j \leq 7-n \\ \frac{1}{2}(d_{i+m-8,j+n-8} + d_{i+m-6,j+n-8}) & 9-m \leq i \leq 6; 8-n \leq j \leq 7 \\ \frac{1}{2}(a_{i+m,j+n} + c_{i+m-6,j+n}) & i = 7-m; 0 \leq j \leq 7-n \\ \frac{1}{2}(b_{i+m,j+n-8} + d_{i+m-6,j+n-8}) & i = 7-m; 8-n \leq j \leq 7 \\ \frac{1}{2}(a'_{i+m'-1,j+n} + a'_{i+m'+1,j+n'}) & 1, 3 \leq i \leq 5-m'; 0 \leq j \leq 7-n' \\ \frac{1}{2}(b'_{i+m'-1,j+n'-8} + b'_{i+m'+1,j+n'-8}) & 1, 3 \leq i \leq 5-m'; 8-n' \leq j \leq 7 \\ \frac{1}{2}(c'_{i+m'-9,j+n'} + c'_{i+m'-7,j+n'}) & 9-m' \leq i \leq 7; 0 \leq j \leq 7-n' \\ \frac{1}{2}(d'_{i+m'-9,j+n'-8} + d'_{i+m'-7,j+n'-8}) & 9-m' \leq i \leq 7; 8-n' \leq j \leq 7 \\ \frac{1}{2}(a'_{i+m'-1,j+n'} + c'_{i+m'-7,j+n'}) & i = 7-m'; 0 \leq j \leq 7-n' \\ \frac{1}{2}(b'_{i+m'-1,j+n'-8} + d'_{i+m'-7,j+n'-8}) & i = 7-m'; 8-n' \leq j \leq 7 \end{cases} \quad (51)$$

where $m = 1, 3, 5, 7$ and $m' = 0, 2, 4, 6$ $$E_{kl} = \sum_{p=0}^{7}\sum_{q=0}^{7} A_{pq} \left[\sum_{i=0,2}^{5-m}\sum_{j=0}^{7-n} X\cos\frac{(2i+1)k\pi}{16}\cos\frac{(2j+1)l\pi}{16} + \sum_{j=0}^{7-n}\frac{1}{2}\cos\frac{15p\pi}{16}\cos\frac{(2j+2n+1)q\pi}{16}\cos\frac{(15-2m)k\pi}{16}\cos\frac{(2j+1)l\pi}{16}\right] + $$

$$\sum_{p=0}^{7}\sum_{q=0}^{7} B_{pq} \left[\sum_{i=0,2}^{5-m}\sum_{j=-n}^{-1} X\cos\frac{(2i+1)k\pi}{16}\cos\frac{(2j+17)l\pi}{16} + \sum_{j=-n}^{-1}\frac{1}{2}\cos\frac{15p\pi}{16}\cos\frac{(2j+2n+1)q\pi}{16}\cos\frac{(15-2m)k\pi}{16}\cos\frac{(2j+17)l\pi}{16}\right] + $$

$$\sum_{p=0}^{7}\sum_{q=0}^{7} C_{pq} \left[\sum_{i=3-m,1-m}^{-2}\sum_{j=0}^{7-n} X\cos\frac{(2i+17)k\pi}{16}\cos\frac{(2j+1)l\pi}{16} + \sum_{j=0}^{7-n}\frac{1}{2}\cos\frac{3p\pi}{16}\cos\frac{(2j+2n+1)q\pi}{16}\cos\frac{(15-2m)k\pi}{16}\cos\frac{(2j+1)l\pi}{16}\right] + $$

$$\sum_{p=0}^{7}\sum_{q=0}^{7} D_{pq} \left[\sum_{i=3-m,1-m}^{-2}\sum_{j=-n}^{-1} X\cos\frac{(2i+17)k\pi}{16}\cos\frac{(2j+17)l\pi}{16} + \sum_{j=0}^{7-n}\frac{1}{2}\cos\frac{3p\pi}{16}\cos\frac{(2j+2n+1)q\pi}{16}\cos\frac{(15-2m)k\pi}{16}\cos\frac{(2j+17)l\pi}{16}\right] + \quad (52)$$

-continued $$\sum_{p=0}^{7}\sum_{q=0}^{7}A'_{pq}\left[\sum_{i=0,2}^{4-m'}\sum_{j=0}^{7-n'}X'\cos\frac{(2i+3)k\pi}{16}\cos\frac{(2j+1)l\pi}{16}+\sum_{j=0}^{7-n'}\frac{1}{2}\cos\frac{13p\pi}{16}\cos\frac{(2j+2n'+1)q\pi}{16}\cos\frac{(15-2m')k\pi}{16}\cos\frac{(2j+1)l\pi}{16}\right]+$$

$$\sum_{p=0}^{7}\sum_{q=0}^{7}B'_{pq}\left[\sum_{i=0,2}^{4-m'}\sum_{j=-n'}^{-1}X'\cos\frac{(2i+3)k\pi}{16}\cos\frac{(2j+17)l\pi}{16}+\sum_{j=-n}^{-1}\frac{1}{2}\cos\frac{13p\pi}{16}\cos\frac{(2j+2n'+1)q\pi}{16}\cos\frac{(15-2m')k\pi}{16}\cos\frac{(2j+17)l\pi}{16}\right]+$$

$$\sum_{p=0}^{7}\sum_{q=0}^{7}C'_{pq}\left[\sum_{i=2-m',-m'}^{-2}\sum_{j=0}^{7-n'}X'\cos\frac{(2i+19)k\pi}{16}\cos\frac{(2j+1)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+1)l\pi}{16}\right]+$$

$$\sum_{p=0}^{7}\sum_{q=0}^{7}D'_{pq}\left[\sum_{i=2-m',-m'}^{-2}\sum_{j=-1}^{-n'}X'\cos\frac{(2i+19)k\pi}{16}\cos\frac{(2j+17)l\pi}{16}+\sum_{j=0}^{7-n'}\frac{1}{2}\cos\frac{p\pi}{16}\cos\frac{(2j+2n'+1)q\pi}{16}\cos\frac{(15-2m')k\pi}{16}\cos\frac{(2j+17)l\pi}{16}\right]$$

The summation terms including $A_{pq}$, $B_{pq}$, $C_{pq}$, and $D_{pq}$ in expression (52) represent the e→o portion of the frame composite macro block E, while the summation terms including $A'_{pq}$, $B'_{pq}$, $C'_{pq}$, and $D'_{pq}$ in expression (52) represent the o→e portion of the frame composite macro block E.

Using expression (52), the motion compensated frame macro block E can be derived for vertical half-pel accuracy when the odd and even fields are encoded based on the even and odd fields, respectively, of the anchor frame.

Diagonal Half-Pel Accuracy

Case (1) o→o and o→e

Expression (53) below represents the relationship between the frame composite macro block e and the macro blocks a–d and a'–d' in the anchor frame in the spatial domain when the even and odd fields are encoded based on the odd field of the anchor frame.

$$e_{ij} = \begin{cases} \frac{1}{4}(a_{i+m,j+n} + a_{i+m,j+n+1} + a_{i+m+2,j+n} + a_{i+m+2,j+n+1}) & 0, 2 \leq i \leq 4-m; 0 \leq j \leq 6-n \\ \frac{1}{4}(b_{i+m,j+n-8} + b_{i+m,j+n-7} + b_{i+m+2,j+n-8} + b_{i+m+2,j+n-7}) & 0, 2 \leq i \leq 4-m; 8-n \leq j \leq 7 \\ \frac{1}{4}(c_{i+m-8,j+n} + c_{i+m-8,j+n+1} + c_{i+m-6,j+n} + c_{i+m-6,j+n+1}) & 8-m \leq i \leq 6; 0 \leq j \leq 6-n \\ \frac{1}{4}(d_{i+m-8,j+n-8} + d_{i+m-8,j+n-7} + d_{i+m-6,j+n-8} + d_{i+m-6,j+n-7}) & 8-m \leq i \leq 6; 8-n \leq j \leq 7 \\ \frac{1}{4}(a_{6,j+n} + a_{6,j+n+1} + c_{0,j+n} + c_{0,j+n+1}) & i = 6-m; 0 \leq j \leq 6-n \\ \frac{1}{4}(b_{6,j+n-8} + b_{6,j+n-7} + d_{0,j+n-8} + d_{0,j+n-7}) & i = 6-m; 8-n \leq j \leq 7 \\ \frac{1}{4}(a_{i+m,7} + a_{i+m+2,7} + b_{i+m,0} + b_{i+m+2,0}) & j = 7-n; 0 \leq i \leq 4-m \\ \frac{1}{4}(c_{i+m-8,7} + c_{i+m-6,7} + d_{i+m-8,0} + d_{i+m-6,0}) & j = 7-n; 8-m \leq i \leq 6 \\ \frac{1}{4}(a_{6,7} + b_{6,0} + c_{0,7} + d_{0,0}) & i = 6-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'+1}) & 1, 3 \leq i \leq 5-m'; 0 \leq j \leq 6-n' \\ \frac{1}{4}(b'_{i+m'-1,j+n'-8} + b'_{i+m'-1,j+n'-7} + b'_{i+m'+1,j+n'-8} + b'_{i+m'+1,j+n'-7}) & 1, 3 \leq i \leq 5-m'; 8-n' \leq j \leq 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 9-m' \leq i \leq 7; 0 \leq j \leq 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 9-m' \leq i \leq 7; 8-n' \leq j \leq 7 \\ \frac{1}{4}(a'_{6,j+n'} + a'_{6,j+n'+1} + c'_{0,j+n'} + c'_{0,j+n'+1}) & i = 7-m'; 0 \leq j \leq 6-n' \\ \frac{1}{4}(b'_{6,j+n'-8} + b'_{6,j+n'-7} + d'_{0,j+n'-8} + d'_{0,j+n'-7}) & i = 7-m'; 8-n' \leq j \leq 7 \\ \frac{1}{4}(a'_{i+m'-1,7} + a'_{i+m'+1,7} + b'_{i+m'-1,0} + b'_{i+m'+1,0}) & 1, 3 \leq i \leq 5-m'; j = 7-n' \\ \frac{1}{4}(c'_{i+m'-9,7} + c'_{i+m'-7,7} + d'_{i+m'-9,0} + d'_{i+m'-7,0}) & 1, 3 \leq i \leq 5-m'; j = 7-n' \\ \frac{1}{4}(a'_{6,7} + b'_{6,0} + c'_{0,7} + d'_{0,0}) & i = 7-m'; j = 7-n' \end{cases} \quad (53)$$

where $m = 0, 2, 4, 6$ and $m' = 0, 2, 4, 6$

The top half of expression (53) represents the o→o portion of the frame composite macro block e, while the bottom portion of expression (53) represents the o→e portion of the frame composite macro block e.

Using expression (53), expression (54) below is derived in the same manner as expression (14).

$$E_{k1} = \sum_{p=0}^{7} \sum_{q=0}^{7} A_{pq} \left[ \sum_{i=0,2}^{4-m} \sum_{j=0}^{6-n} \left( W\cos\frac{(2i+1)k\pi}{16} \cos\frac{(2j+1)l\pi}{16} \right) + \frac{1}{2} \sum_{j=0}^{6-n} \left( \cos\frac{13p\pi}{16} \cos\frac{q\pi}{16} \cos\frac{(j+n+1)q\pi}{8} \cos\frac{(13-2m)k\pi}{16} \cos\frac{(2j+1)l\pi}{16} \right) + \right.$$

$$\left. \frac{1}{2} \sum_{i=0,2}^{4-m} \left( \cos\frac{(2i+2m+3)p\pi}{16} \cos\frac{p\pi}{8} \cos\frac{15q\pi}{16} \cos\frac{(2i+1)k\pi}{16} \cos\frac{(15-2n)l\pi}{16} \right) + \left( \frac{1}{4} \cos\frac{13p\pi}{16} \cos\frac{15q\pi}{16} \cos\frac{(13-2m)k\pi}{16} \cos\frac{(15-2n)l\pi}{16} \right) \right] +$$

$$\sum_{p=0}^{7} \sum_{q=0}^{7} B_{pq} \left[ \sum_{i=0,2}^{4-m} \sum_{j=-n}^{-1} \left( W\cos\frac{(2i+1)k\pi}{16} \cos\frac{(2j+17)l\pi}{16} \right) + \frac{1}{2} \sum_{j=-n}^{-1} \left( \cos\frac{13p\pi}{16} \cos\frac{q\pi}{16} \cos\frac{(j+n+1)q\pi}{8} \cos\frac{(13-2m)k\pi}{16} \cos\frac{(2j+17)l\pi}{16} \right) + \right.$$

$$\left. \frac{1}{2} \sum_{i=0,2}^{4-m} \left( \cos\frac{(2i+2m+3)p\pi}{16} \cos\frac{p\pi}{8} \cos\frac{q\pi}{16} \cos\frac{(2i+1)k\pi}{16} \cos\frac{(15-2n)l\pi}{16} \right) + \left( \frac{1}{4} \cos\frac{13p\pi}{16} \cos\frac{q\pi}{16} \cos\frac{(13-2m)k\pi}{16} \cos\frac{(15-2n)l\pi}{16} \right) \right] + \quad (54)$$

$$\sum_{p=0}^{7}\sum_{q=0}^{7}C_{pq}\left[\sum_{i=-m}^{-2}\sum_{j=0}^{6-n}\left(W\cos\frac{(2i+17)k\pi}{16}\cos\frac{(2j+1)l\pi}{16}\right)+\frac{1}{2}\sum_{j=0}^{6-n}\left(\cos\frac{p\pi}{16}\cos\frac{q\pi}{16}\cos\frac{(j+n+1)q\pi}{8}\cos\frac{(13-2m)k\pi}{16}\cos\frac{(2j+1)l\pi}{16}\right)+\right.$$

$$\frac{1}{2}\sum_{i=-m}^{-2}\left(\cos\frac{(2i+2m+3)p\pi}{16}\cos\frac{p\pi}{8}\cos\frac{15q\pi}{16}\cos\frac{(2i+17)k\pi}{16}\cos\frac{(15-2n)l\pi}{16}\right)+\frac{1}{4}\left(\cos\frac{p\pi}{16}\cos\frac{15q\pi}{16}\cos\frac{(13-2m)k\pi}{16}\cos\frac{(15-2n)l\pi}{16}\right)\right]+$$

$$\sum_{p=0}^{7}\sum_{q=0}^{7}D_{pq}\left[\sum_{i=-m}^{-2}\sum_{j=-n}^{-1}\left(W\cos\frac{(2i+17)k\pi}{16}\cos\frac{(2j+1)l\pi}{16}\right)+\frac{1}{2}\sum_{j=-n}^{-1}\left(\cos\frac{p\pi}{16}\cos\frac{q\pi}{16}\cos\frac{(j+n+1)q\pi}{8}\cos\frac{(13-2m)k\pi}{16}\cos\frac{(2j+17)l\pi}{16}\right)+\right.$$

$$\frac{1}{2}\sum_{i=-m}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right)+\left(\frac{1}{4}\cos\frac{p\pi}{16}\cos\frac{q\pi}{16}\cos\frac{(13-2m)k\pi}{16}\cos\frac{(15-2n)l\pi}{16}\right)\right]+$$

$$\sum_{p=0}^{7}\sum_{q=0}^{7}A'_{pq}\left[\sum_{i=0}^{4-m'}\sum_{j=0}^{6-n'}\left(W'\cos\frac{(2i+3)k\pi}{16}\cos\frac{(2j+1)l\pi}{16}\right)+\frac{1}{2}\sum_{j=0}^{6-n'}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)+\right.$$

$$\frac{1}{2}\sum_{j=0,2}^{4-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right)+\frac{1}{4}\left(\cos\frac{13p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}B'_{pq}\left[\sum_{i=0,2}^{4-m'}\sum_{j=-n'}^{-1}\left(W'\cos\frac{(2i+3)k\pi}{16}\cos\frac{(2j+17)l\pi}{16}\right)+\frac{1}{2}\sum_{j=-n'}^{-1}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)+\right.$$

$$\frac{1}{2}\sum_{i=0,2}^{4-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right)+\frac{1}{4}\left(\cos\frac{13p\pi}{16}\cos\frac{q\pi}{16}\cos\frac{(15-2m')k\pi}{16}\cos\frac{(15-2n')l\pi}{16}\right)\right]+$$

$$\sum_{p=0}^{7}\sum_{q=0}^{7}C'_{pq}\left[\sum_{i=-m'}^{-2}\sum_{j=0}^{6-n'}\left(W'\cos\frac{(2i+19)k\pi}{16}\cos\frac{(2j+1)l\pi}{16}\right)+\frac{1}{2}\sum_{j=0}^{6-n'}\left(\cos\frac{p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)+\right.$$

$$\frac{1}{2}\sum_{i=-m'}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right)+\frac{1}{4}\left(\cos\frac{p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}D'_{pq}\left[\sum_{i=-m'}^{-2}\sum_{j=-n'}^{-1}\left(W'\cos\frac{(2i+19)k\pi}{16}\cos\frac{(2j+1)l\pi}{16}\right)+\frac{1}{2}\sum_{j=-n'}^{-1}\left(\cos\frac{p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)+\right.$$

$$\frac{1}{2}\sum_{i=-m'}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right)+\frac{1}{4}\left(\cos\frac{p\pi}{16}\cos\frac{q\pi}{16}\cos\frac{(15-2m')k\pi}{16}\cos\frac{(15-2n')l\pi}{16}\right)\right]$$

where $$W = \cos\frac{(2i+2m+3)p\pi}{16}\cos\frac{p\pi}{8}\cos\frac{q\pi}{16}\cos\frac{(i+n+1)q\pi}{16} \quad (55\,A)$$

$$W' = \cos\frac{(2i+2m'+3)p\pi}{16}\cos\frac{p\pi}{8}\cos\frac{q\pi}{16}\cos\frac{(i+n'+1)q\pi}{16} \quad (55\,B)$$

The summation terms including $A_{pq}$, $B_{pq}$, $C_{pq}$, and $D_{pq}$ in expression (54) represent the o→o portion of the frame composite macro block E, while the summation terms including $A'_{pq}$, $B'_{pq}$, $C'_{pq}$, and $D'_{pq}$ in expression (54) represent the o→o portion of the frame composite macro block E.

Using expression (54) below represents the relationship between frame composite macro block e and the macro blocks a–d and a'–d' in the spatial domain when the even and odd fields are encoded based on the even field of the anchor frame.

$$e_{ij} = \begin{cases} \frac{1}{4} = (a_{i+m,j+n} + a_{i+m,j+n+1} + a_{i+m+2,j+n} + a_{i+m+2,j+n+1}) & 0, 2 \le i \le 5-m; 0 \le j \le 6-n \\ \frac{1}{4}(b_{i+m,j+n-8} + b_{i+m,j+n-7} + b_{i+m+2,j+n-8} + b_{i+m+2,j+n-7}) & 0, 2 \le i \le 5-m; 8-n \le j \le 7 \\ \frac{1}{4}(c_{i+m-8,j+n} + c_{i+m-8,j+n+1} + c_{i+m-6,j+n} + c_{i+m-6,j+n+1}) & 9-m \le i \le 6; 0 \le j \le 6-n \\ \frac{1}{4}(d_{i+m-8,j+n-8} + d_{i+m-8,j+n-7} + d_{i+m-6,j+n-8} + d_{i+m-6,j+n-7}) & 9-m \le i \le 6; 8-n \le j \le 7 \\ \frac{1}{4}(a_{6,j+n} + a_{6,j+n+1} + c_{0,j+n} + c_{0,j+n+1}) & i = 7-m; 0 \le j \le 6-n \\ \frac{1}{4}(b_{6,j+n-8} + b_{6,j+n-7} + d_{0,j+n-8} + d_{0,j+n-7}) & i = 7-m; 8-n \le j \le 7 \\ \frac{1}{4}(a_{i+m,7} + a_{i+m+2,7} + b_{i+m,0} + b_{i+m+2,0}) & j = 7-n; 0 \le i \le 5-m \\ \frac{1}{4}(c_{i+m-8,7} + c_{i+m-6,7} + d_{i+m-8,0} + d_{i+m-6,0}) & i = 7-n; 9-m \le i \le 6 \\ \frac{1}{4}(a_{6,7} + b_{6,0} + c_{0,7} + d_{0,0}) & i = 7-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'}) & 1, 3 \le i \le 6-m'; 0 \le j \le 6-n' \\ \frac{1}{4}(b'_{i+m'-1,j+n'-8} + b'_{i+m'-1,j+n'-7} + b'_{i+m'+1,j+n'-8} + b'_{i+m'+1,j+n'-7}) & 1, 3 \le i \le 6-m'; 8-n' \le j \le 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 10-m' \le i \le 7; 0 \le j \le 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 10-m' \le i \le 7; 8-n' \le j \le 7 \\ \frac{1}{4}(a'_{7,j+n'} + a'_{7,j+n'+1} + c'_{1,j+n'} + c_{1,j+n'+1}) & i = 8-m'; 0 \le j \le 6-n' \\ \frac{1}{4}(b'_{7,j+n'-8} + b'_{7,j+n'-7} + d'_{1,j+n'-8} + d'_{1,j+n'-7}) & i = 8-m'; 8-n' \le j \le 7 \\ \frac{1}{4}(a'_{i+m'-1,7} + a'_{i+m'+1,7} + b'_{i+m'-1,0} + b'_{i+m'+1,0} + b'_{i+m'+1,0}) & 1, 3 \le i \le 6-m'; j = 7-n' \\ \frac{1}{4}(c'_{i+m'-9,7} + c'_{i+m'-7,7} + d'_{i+m'-9,0} + d'_{i+m'-7,0}) & 10-m' \le i \le 7; j = 7-n' \\ \frac{1}{4}(a'_{7,7} + b'_{7,0} + c'_{1,7} + d'_{1,0}) & i = 8-m'; j = 7-n' \end{cases} \quad (56)$$

where $m = 1, 3, 5, 7$ and $m' = 1, 3, 5, 7$

The top half of expression (56) represents the e→o portion of the frame composite macro block e, while the bottom portion of expression (56) represents the e→e portion of the frame composite macro block e.

Using expression (56), expression (57) below is derived in the same manner as expression (14).

$$E_{kl} = \sum_{p=0}^{7}\sum_{q=0}^{7} A_{pq} \left[ \sum_{i=0,2}^{5-m}\sum_{j=0}^{6-n} \left( W\cos\frac{(2i+1)k\pi}{16}\cos\frac{(2j+1)l\pi}{16} \right) + \frac{1}{2}\sum_{j=0}^{6-n}\left(\cos\frac{15p\pi}{16}\cos\frac{q\pi}{16}\cos\frac{(j+n+1)q\pi}{8}\cos\frac{(15-2m)k\pi}{16}\cos\frac{(2j+1)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left(\frac{1}{4}\cos\frac{15p\pi}{16}\cos\frac{15q\pi}{16}\cos\frac{(15-2m)k\pi}{16}\cos\frac{(15-2n)l\pi}{16}\right) \bigg] +$$

$$\sum_{p=0}^{7}\sum_{q=0}^{7} B_{pq} \left[ \sum_{i=0,2}^{5-m}\sum_{j=-n}^{-1} \left( W\cos\frac{(2i+1)k\pi}{16}\cos\frac{(2j+17)l\pi}{16} \right) + \frac{1}{2}\sum_{j=-n}^{-1}\left(\cos\frac{15p\pi}{16}\cos\frac{q\pi}{16}\cos\frac{(j+n+1)q\pi}{8}\cos\frac{(15-2m)k\pi}{16}\cos\frac{(2j+17)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right) + \left(\frac{1}{4}\cos\frac{15p\pi}{16}\cos\frac{q\pi}{16}\cos\frac{(15-2m)k\pi}{16}\cos\frac{(15-2n)l\pi}{16}\right) \bigg] +$$

(57)

-continued $$\sum_{p=0}^{7}\sum_{q=0}^{7} C_{pq} \left[ \sum_{i=-m+1}^{-2} \sum_{j=0}^{6-n} \left( W \cos\frac{(2i+17)k\pi}{16} \cos\frac{(2j+1)l\pi}{16} \right) + \frac{1}{2} \sum_{j=0}^{6-n} \left( \cos\frac{3p\pi}{16} \cos\frac{q\pi}{16} \cos\frac{(j+n+1)q\pi}{8} \cos\frac{(15-2m)k\pi}{16} \cos\frac{(2j+1)l\pi}{16} \right) + \right.$$

$$\frac{1}{2} \sum_{i=-m+1}^{-2} \left( \cos\frac{(2i+2m+3)p\pi}{16} \cos\frac{p\pi}{8} \cos\frac{15q\pi}{16} \cos\frac{(2i+17)k\pi}{16} \cos\frac{(15-2n)l\pi}{16} \right) + \frac{1}{4} \left( \cos\frac{3p\pi}{16} \cos\frac{15q\pi}{16} \cos\frac{(15-2m)k\pi}{16} \cos\frac{(15-2n)l\pi}{16} \right) \right] +$$

$$\sum_{p=0}^{7}\sum_{q=0}^{7} D_{pq} \left[ \sum_{i=-m+1}^{-2} \sum_{j=-n}^{-1} \left( W \cos\frac{(2i+17)k\pi}{16} \cos\frac{(2j+1)l\pi}{16} \right) + \frac{1}{2} \sum_{j=-n}^{-1} \left( \cos\frac{3p\pi}{16} \cos\frac{q\pi}{16} \cos\frac{(j+n+1)q\pi}{8} \cos\frac{(15-2m)k\pi}{16} \cos\frac{(2j+17)l\pi}{16} \right) + \right.$$

$$\frac{1}{2} \sum_{i=-m+1}^{-2} \left( \cos\frac{(2i+2m+3)p\pi}{16} \cos\frac{p\pi}{8} \cos\frac{q\pi}{16} \cos\frac{(2i+17)k\pi}{16} \cos\frac{(15-2n)l\pi}{16} \right) + \left( \frac{1}{4} \cos\frac{3p\pi}{16} \cos\frac{q\pi}{16} \cos\frac{(15-2m)k\pi}{16} \cos\frac{(15-2n)l\pi}{16} \right) \right] +$$

$$\sum_{p=0}^{7}\sum_{q=0}^{7} A'_{pq} \left[ \sum_{i=0,2}^{5-m'} \sum_{j=0}^{6-n'} \left( W' \cos\frac{(2i+3)k\pi}{16} \cos\frac{(2j+1)l\pi}{16} \right) + \frac{1}{2} \sum_{j=0}^{6-n'} \left( \cos\frac{15p\pi}{16} \cos\frac{q\pi}{16} \cos\frac{(j+n'+1)q\pi}{8} \cos\frac{(17-2m')k\pi}{16} \cos\frac{(2j+1)l\pi}{16} \right) + \right.$$

$$\frac{1}{2} \sum_{i=0,2}^{5-m'} \left( \cos\frac{(2i+2m'+3)p\pi}{16} \cos\frac{p\pi}{8} \cos\frac{15q\pi}{16} \cos\frac{(2i+3)k\pi}{16} \cos\frac{(15-2n')l\pi}{16} \right) + \frac{1}{4} \left( \cos\frac{13p\pi}{16} \cos\frac{15q\pi}{16} \cos\frac{(17-2m')k\pi}{16} \cos\frac{(15-2n')l\pi}{16} \right) \right] +$$

$$\sum_{p=0}^{7}\sum_{q=0}^{7} B'_{pq} \left[ \sum_{i=0,2}^{5-m'} \sum_{j=-n'}^{-1} \left( W' \cos\frac{(2i+3)k\pi}{16} \cos\frac{(2j+17)l\pi}{16} \right) + \frac{1}{2} \sum_{j=-n'}^{-1} \left( \cos\frac{15p\pi}{16} \cos\frac{q\pi}{16} \cos\frac{(j+n'+1)q\pi}{8} \cos\frac{(17-2m')k\pi}{16} \cos\frac{(2j+17)l\pi}{16} \right) + \right.$$

$$\frac{1}{2} \sum_{i=0,2}^{5-m'} \left( \cos\frac{(2i+2m'+3)p\pi}{16} \cos\frac{p\pi}{8} \cos\frac{q\pi}{16} \cos\frac{(2j+3)k\pi}{16} \cos\frac{(15-2n')l\pi}{16} \right) + \frac{1}{4} \left( \cos\frac{13p\pi}{16} \cos\frac{q\pi}{16} \cos\frac{(17-2m')k\pi}{16} \cos\frac{(15-2n')l\pi}{16} \right) \right] +$$

$$\sum_{p=0}^{7}\sum_{q=0}^{7} C'_{pq} \left[ \sum_{i=-m'+1}^{-2} \sum_{j=0}^{6-n'} \left( W' \cos\frac{(2i+19)k\pi}{16} \cos\frac{(2j+1)l\pi}{16} \right) + \frac{1}{2} \sum_{j=0}^{6-n'} \left( \cos\frac{3p\pi}{16} \cos\frac{q\pi}{16} \cos\frac{(j+n'+1)q\pi}{8} \cos\frac{(17-2m')k\pi}{16} \cos\frac{(2j+1)l\pi}{16} \right) + \right.$$

$$\frac{1}{2} \sum_{i=-m'+1}^{-2} \left( \cos\frac{(2i+2m'+3)p\pi}{16} \cos\frac{p\pi}{8} \cos\frac{15q\pi}{16} \cos\frac{(2i+19)k\pi}{16} \cos\frac{(15-2n')l\pi}{16} \right) + \frac{1}{4} \left( \cos\frac{p\pi}{16} \cos\frac{15q\pi}{16} \cos\frac{(17-2m')k\pi}{16} \cos\frac{(15-2n')l\pi}{16} \right) \right] +$$

$$\sum_{p=0}^{7}\sum_{q=0}^{7} D'_{pq} \left[ \sum_{i=-m'+1}^{-2} \sum_{j=-n'}^{-1} \left( W' \cos\frac{(2i+19)k\pi}{16} \cos\frac{(2j+1)l\pi}{16} \right) + \frac{1}{2} \sum_{j=-n'}^{-1} \left( \cos\frac{3p\pi}{16} \cos\frac{q\pi}{16} \cos\frac{(j+n'+1)q\pi}{8} \cos\frac{(17-2m')k\pi}{16} \cos\frac{(2j+17)l\pi}{16} \right) + \right.$$

$$\frac{1}{2} \sum_{i=-m'+1}^{-2} \left( \cos\frac{(2i+2m'+3)p\pi}{16} \cos\frac{p\pi}{8} \cos\frac{q\pi}{16} \cos\frac{(2i+19)k\pi}{16} \cos\frac{(15-2n')l\pi}{16} \right) + \frac{1}{4} \left( \cos\frac{p\pi}{16} \cos\frac{q\pi}{16} \cos\frac{(17-2m')k\pi}{16} \cos\frac{(15-2n')l\pi}{16} \right) \right]$$

The summation terms including $A_{pq}$, $B_{pq}$, $C_{pq}$, and $D_{pq}$ in expression (57) represent the e→o portion of the frame composite macro block E, while the summation terms including $A'_{pq}$, $B'_{pq}$, $C'_{pq}$, and $D'_{pq}$ in expression (57) represent the e→e portion of the frame composite macro block E.

Using expression (57), the motion compensated frame macro block E can be derived for diagonal half-pel accuracy when the even and odd fields are encoded based on the even field of the anchor frame.

Case (3) o→o and e→e

Expression (58) below represents the relationship between frame composite macro block e and the macro blocks a–d and a'–d' in the spatial domain when the odd and even fields are encoded based on the odd and even fields, respectively, of the anchor frame.

$$e_{ij} = \begin{cases} \frac{1}{4}(a_{i+m,j+n} + a_{i+m,j+n+1} + a_{i+m+2,j+n} + a_{i+m+2,j+n+1}) & 0, 2 \le i \le 4-m; 0 \le j \le 6-n \\ \frac{1}{4}(b_{i+m,j+n-8} + b_{i+m,j+n-7} + b_{i+m+2,j+n-8} + b_{i+m+2,j+n-7}) & 0, 2 \le i \le 4-m; 8-n \le j \le 7 \\ \frac{1}{4}(c_{i+m-8,j+n} + c_{i+m-8,j+n+1} + c_{i+m-6,j+n} + c_{i+m-6,j+n+1}) & 8-m \le i \le 6; 0 \le j \le 6-n \\ \frac{1}{4}(d_{i+m-8,j+n-8} + d_{i+m-8,j+n-7} + d_{i+m-6,j+n-8} + d_{i+m-6,j+n-7}) & 8-m \le i \le 6; 8-n \le j \le 7 \\ \frac{1}{4}(a_{6,j+n} + a_{6,j+n+1} + c_{0,j+n} + c_{0,j+n+1}) & i = 6-m; 0 \le j \le 6-n \\ \frac{1}{4}(b_{6,j+n-8} + b_{6,j+n-7} + d_{0,j+n-8} + d_{0,j+n-7}) & i = 6-m; 8-n \le j \le 7 \\ \frac{1}{4}(a_{i+m,7} + a_{i+m+2,7} + b_{i+m,0} + b_{i+m+2,0}) & j = 7-n; 0 \le i \le 4-m \\ \frac{1}{4}(c_{i+m-8,7} + c_{i+m-6,7} + d_{i+m-8,0} + d_{i+m-6,0}) & j = 7-n; 8-m \le i \le 6 \\ \frac{1}{4}(a_{6,7} + b_{6,0} + c_{0,7} + d_{0,0}) & i = 6-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'+1}) & 1, 3 \le i \le 6-m'; 0 \le j \le 6-n' \\ \frac{1}{4}(b'_{i+m'-1,j+n'-8} + b'_{i+m'-1,j+n'-7} + b'_{i+m'+1,j+n'-8} + b'_{i+m'+1,j+n'-7}) & 1, 3 \le i \le 6-m'; 8-n' \le j \le 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 10-m' \le i \le 7; 0 \le j \le 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 10-m' \le i \le 7; 8-n' \le j \le 7 \\ \frac{1}{4}(a'_{7,j+n'} + a'_{7,j+n'+1} + c'_{1,j+n'} + c'_{1,j+n'+1}) & i = 8-m'; 0 \le j \le 6-n' \\ \frac{1}{4}(b'_{7,j+n'-8} + b'_{7,j+n'-7} + d'_{1,j+n'-8} + d'_{1,j+n'-7}) & i = 8-m'; 8-n' \le j \le 7 \\ \frac{1}{4}(a'_{i+m'-1,7} + a'_{i+m'+1,7} + b'_{i+m'-1,0} + b'_{i+m'+1,0}) & 1, 3 \le i \le 6-m'; j = 7-n' \\ \frac{1}{4}(c'_{i+m'-9,7} + c'_{i+m'-7,7} + d'_{i+m'-9,0} + d'_{i+m'-7,0}) & 10-m' \le i \le 7; j = 7-n' \\ \frac{1}{4}(a'_{7,7} + b'_{7,0} + c'_{1,7} + d'_{1,0}) & i = 8-m'; j = 7-n' \end{cases} \quad (58)$$

where $m = 0, 2, 4, 6$ and $m' = 1, 3, 5, 7$

The top half of expression (58) represents the o→o portion of the frame composite macro block e, while the bottom portion of expression (58) represents the e→e portion of the frame composite macro block e.

Using expression (58), expression (59) below is derived in the same manner as expression (14).

$$
\begin{aligned}
E_{k1} = \sum_{p=0}^{7}\sum_{q=0}^{7} A_{pq} & \left[\sum_{i=0,2}^{4-m}\sum_{j=0}^{6-n}\left(W\cos\frac{(2i+1)k\pi}{16}\cos\frac{(2j+1)l\pi}{16}\right) + \frac{1}{2}\sum_{j=0}^{6-n}\left(\cos\frac{13p\pi}{16}\cos\frac{q\pi}{16}\cos\frac{(j+n+1)q\pi}{8}\cos\frac{(13-2m)k\pi}{16}\cos\frac{(2j+1)l\pi}{16}\right) + \right. \\
& \left. \frac{1}{2}\sum_{i=0,2}^{4-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left(\frac{1}{4}\cos\frac{13p\pi}{16}\cos\frac{15q\pi}{16}\cos\frac{(13-2m)k\pi}{16}\cos\frac{(15-2n)l\pi}{16}\right)\right] + \\
\sum_{p=0}^{7}\sum_{q=0}^{7} B_{pq} & \left[\sum_{i=0,2}^{4-m}\sum_{j=-n}^{-1}\left(W\cos\frac{(2i+1)k\pi}{16}\cos\frac{(2j+17)l\pi}{16}\right) + \frac{1}{2}\sum_{j=-n}^{-1}\left(\cos\frac{13p\pi}{16}\cos\frac{q\pi}{16}\cos\frac{(j+n+1)q\pi}{8}\cos\frac{(13-2m)k\pi}{16}\cos\frac{(2j+17)l\pi}{16}\right) + \right. \\
& \left. \frac{1}{2}\sum_{i=0,2}^{4-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right) + \left(\frac{1}{4}\cos\frac{13p\pi}{16}\cos\frac{q\pi}{16}\cos\frac{(13-2m)k\pi}{16}\cos\frac{(15-2n)l\pi}{16}\right)\right] + \\
\sum_{p=0}^{7}\sum_{q=0}^{7} C_{pq} & \left[\sum_{i=-m}^{-2}\sum_{j=0}^{6-n}\left(W\cos\frac{(2i+17)k\pi}{16}\cos\frac{(2j+1)l\pi}{16}\right) + \frac{1}{2}\sum_{j=0}^{6-n}\left(\cos\frac{p\pi}{16}\cos\frac{q\pi}{16}\cos\frac{(j+n+1)q\pi}{8}\cos\frac{(13-2m)k\pi}{16}\cos\frac{(2j+1)l\pi}{16}\right) + \right. \\
& \left. \frac{1}{2}\sum_{i=-m}^{-2}\left(\cos\frac{(2i+2m+3)p\pi}{16}\cos\frac{p\pi}{8}\cos\frac{15q\pi}{16}\cos\frac{(2i+17)k\pi}{16}\cos\frac{(15-2n)l\pi}{16}\right) + \frac{1}{4}\left(\cos\frac{p\pi}{16}\cos\frac{15q\pi}{16}\cos\frac{(13-2m)k\pi}{16}\cos\frac{(15-2n)l\pi}{16}\right)\right] + \\
\sum_{p=0}^{7}\sum_{q=0}^{7} D_{pq} & \left[\sum_{i=-m}^{-2}\sum_{j=-n}^{-1}\left(W\cos\frac{(2i+17)k\pi}{16}\cos\frac{(2j+1)l\pi}{16}\right) + \frac{1}{2}\sum_{j=-n}^{-1}\left(\cos\frac{p\pi}{16}\cos\frac{q\pi}{16}\cos\frac{(j+n+1)q\pi}{8}\cos\frac{(13-2m)k\pi}{16}\cos\frac{(2j+17)l\pi}{16}\right) + \right. \\
& \left. \frac{1}{2}\sum_{i=-m}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right) + \left(\frac{1}{4}\cos\frac{p\pi}{16}\cos\frac{q\pi}{16}\cos\frac{(13-2m)k\pi}{16}\cos\frac{(15-2n)l\pi}{16}\right)\right] + \\
\sum_{p=0}^{7}\sum_{q=0}^{7} A'_{pq} & \left[\sum_{i=0,2}^{5-m'}\sum_{j=0}^{6-n'}\left(W'\cos\frac{(2i+3)k\pi}{16}\cos\frac{(2j+1)l\pi}{16}\right) + \frac{1}{2}\sum_{j=0}^{6-n'}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right) + \right. \\
& \left. \frac{1}{2}\sum_{j=0,2}^{5-m'}\left(\cos\frac{(2i+2m'+3)p\pi}{16}\cos\frac{p\pi}{8}\cos\frac{15q\pi}{16}\cos\frac{(2j+3)k\pi}{16}\cos\frac{(15-2n')l\pi}{16}\right) + \frac{1}{4}\left(\cos\frac{13p\pi}{16}\cos\frac{15q\pi}{16}\cos\frac{(17-2m')k\pi}{16}\cos\frac{(15-2n')l\pi}{16}\right)\right] + \\
\sum_{p=0}^{7}\sum_{q=0}^{7} B'_{pq} & \left[\sum_{i=0,2}^{5-m'}\sum_{j=-n'}^{-1}\left(W'\cos\frac{(2i+3)k\pi}{16}\cos\frac{(2j+17)l\pi}{16}\right) + \frac{1}{2}\sum_{j=-n'}^{-1}\left(\cos\frac{15p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right) + \right. \\
& \left. \frac{1}{2}\sum_{i=0,2}^{5-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right) + \frac{1}{4}\left(\cos\frac{13p\pi}{16}\cos\frac{q\pi}{16}\cos\frac{(17-2m')k\pi}{16}\cos\frac{(15-2n')l\pi}{16}\right)\right] + \\
\sum_{p=0}^{7}\sum_{q=0}^{7} C'_{pq} & \left[\sum_{i=-m'+1}^{-2}\sum_{j=0}^{6-n'}\left(W'\cos\frac{(2i+19)k\pi}{16}\cos\frac{(2j+1)l\pi}{16}\right) + \frac{1}{2}\sum_{j=0}^{6-n'}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+1)l\pi}{16}\right) + \right. \\
& \left. \frac{1}{2}\sum_{i=-m'+1}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right) + \frac{1}{4}\left(\cos\frac{p\pi}{16}\cos\frac{15q\pi}{16}\cos\frac{(17-2m')k\pi}{16}\cos\frac{(15-2n')l\pi}{16}\right)\right] + \\
\sum_{p=0}^{7}\sum_{q=0}^{7} D'_{pq} & \left[\sum_{i=-m'+1}^{-2}\sum_{j=-n'}^{-1}\left(W'\cos\frac{(2i+19)k\pi}{16}\cos\frac{(2j+1)l\pi}{16}\right) + \frac{1}{2}\sum_{j=-n'}^{-1}\left(\cos\frac{3p\pi}{16}\cos\frac{q\pi}{16}\cos\frac{(j+n'+1)q\pi}{8}\cos\frac{(17-2m')k\pi}{16}\cos\frac{(2j+17)l\pi}{16}\right) + \right. \\
& \left. \frac{1}{2}\sum_{i=-m'+1}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right) + \frac{1}{4}\left(\cos\frac{p\pi}{16}\cos\frac{q\pi}{16}\cos\frac{(17-2m')k\pi}{16}\cos\frac{(15-2n')l\pi}{16}\right)\right]
\end{aligned}
$$
(59)

The summation terms including $a_{pq}$, $B_{pq}$, $C_{pq}$, and $D_{pq}$ in expression (59) represent the o→o portion of the frame composite macro block E, while the summation terms including $a'_{pq}$, $B'_{pq}$, $C'_{pq}$, and $D'_{pq}$ in expression (59) represent the e→e portion of the frame composite macro block E.

Using expression (59), the motion compensated frame macro block E can be derived for diagonal half-pel accuracy when the odd and even fields are encoded based on the odd and even fields, respectively, of the anchor frame.

Case (4) e→o and o→e

Expression (60) below represents the relationship between frame composite macro block e and the macro blocks a–d and a'–d' in the spatial domain when the odd and even fields are encoded based on the even and odd fields, respectively, of the anchor frame.

$$e_{ij} = \begin{cases} \frac{1}{4}(a_{i+m,j+n} + a_{i+m,j+n+1} + a_{i+m+2,j+n} + a_{i+m+2,j+n+1}) & 0, 2 \leq i \leq 5-m; 0 \leq j \leq 6-n \\ \frac{1}{4}(b_{i+m,j+n-8} + b_{i+m,j+n-7} + b_{i+m+2,j+n-8} + b_{i+m+2,j+n-7}) & 0, 2 \leq i \leq 5-m; 8-n \leq j \leq 7 \\ \frac{1}{4}(c_{i+m-8,j+n} + c_{i+m-8,j+n+1} + c_{i+m-6,j+n} + c_{i+m-6,j+n+1}) & 9-m \leq i \leq 6; 0 \leq j \leq 6-n \\ \frac{1}{4}(d_{i+m-8,j+n-8} + d_{i+m-8,j+n-7} + d_{i+m-6,j+n-8} + d_{i+m-6,j+n-7}) & 9-m \leq i \leq 6; 8-n \leq j \leq 7 \\ \frac{1}{4}(a_{6,j+n} + a_{6,j+n+1} + c_{0,j+n} + c_{0,j+n+1}) & i = 7-m; 0 \leq j \leq 6-n \\ \frac{1}{4}(b_{6,j+n-8} + b_{6,j+n-7} + d_{0,j+n-8} + d_{0,j+n-7}) & i = 7-m; 8-n \leq j \leq 7 \\ \frac{1}{4}(a_{i+m,7} + a_{i+m+2,7} + b_{i+m,0} + b_{i+m+2,0}) & j = 7-n; 0 \leq j \leq 5-m \\ \frac{1}{4}(c_{i+m-8,7} + c_{i+m-6,7} + d_{i+m-8,0} + d_{i+m-6,0}) & i = 7-n; 9-m \leq i \leq 6 \\ \frac{1}{4}(a_{6,7} + b_{6,0} + c_{0,7} + d_{0,0}) & i = 7-m; j = 7-n \\ \frac{1}{4}(a'_{i+m'-1,j+n'} + a'_{i+m'-1,j+n'+1} + a'_{i+m'+1,j+n'} + a'_{i+m'+1,j+n'+1}) & 1, 3 \leq i \leq 5-m'; 0 \leq j \leq 6-n' \\ \frac{1}{4}(b'_{i+m'-1,j+n'-8} + b'_{i+m'-1,j+n'-7} + b'_{i+m'+1,j+n'-8} + b'_{i+m'+1,j+n'-7}) & 1, 3 \leq i \leq 5-m'; 8-n' \leq j \leq 7 \\ \frac{1}{4}(c'_{i+m'-9,j+n'} + c'_{i+m'-9,j+n'+1} + c'_{i+m'-7,j+n'} + c'_{i+m'-7,j+n'+1}) & 9-m' \leq i \leq 7; 0 \leq j \leq 6-n' \\ \frac{1}{4}(d'_{i+m'-9,j+n'-8} + d'_{i+m'-9,j+n'-7} + d'_{i+m'-7,j+n'-8} + d'_{i+m'-7,j+n'-7}) & 9-m' \leq i \leq 7; 8-n' \leq j \leq 7 \\ \frac{1}{4}(a'_{6,j+n'} + a'_{6,j+n'+1} + c'_{0,j+n'} + c'_{0,j+n'+1}) & i = 7-m'; 0 \leq j \leq 6-n' \\ \frac{1}{4}(b'_{6,j+n'-8} + b'_{6,j+n'-7} + d'_{0,j+n'-8} + d'_{0,j+n'-7}) & i = 7-m'; 8-n' \leq j \leq 7 \\ \frac{1}{4}(a'_{i+m'-1,7} + a'_{i+m'+1,7} + b'_{i+m'-1,0} + b'_{i+m'+1,0}) & 1, 3 \leq i \leq 5-m'; j = 7-n' \\ \frac{1}{4}(c'_{i+m'-9,7} + c'_{i+m'-7,7} + d'_{i+m'-9,0} + d'_{i+m'-7,0}) & 1, 3 \leq i \leq 5-m'; j = 7-n' \\ \frac{1}{4}(a'_{6,7} + b'_{6,0} + c'_{0,7} + d'_{0,0}) & i = 7-m'; j = 7-n' \end{cases}$$ (60)

where $m = 1, 3, 5, 7$ and $m' = 0, 2, 4, 6$

The top half of expression (60) represents the e→o portion of the frame composite macro block e, while the bottom portion of expression (60) represents the o→e portion of the frame composite macro block e.

Using expression (60), expression (61) below is derived in the same manner as expression (14).

$$E_{k1} = \sum_{p=0}^{7}\sum_{q=0}^{7} A_{pq} \left[ \sum_{i=0,2}^{5-m}\sum_{j=0}^{6-n}\left(W\cos\frac{(2i+1)k\pi}{16}\cos\frac{(2j+1)l\pi}{16}\right) + \frac{1}{2}\sum_{j=0}^{6-n}\left(\cos\frac{15p\pi}{16}\cos\frac{q\pi}{16}\cos\frac{(j+n+1)q\pi}{8}\cos\frac{(15-2m)k\pi}{16}\cos\frac{(2j+1)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{15q\pi}{16}\cos\frac{(2i+1)k\pi}{16}\cos\frac{(15-2n)l\pi}{16}\right) + \left(\frac{1}{4}\cos\frac{15p\pi}{16}\cos\frac{15q\pi}{16}\cos\frac{(15-2m)k\pi}{16}\cos\frac{(15-2n)l\pi}{16}\right)\Bigg] +$$

$$\sum_{p=0}^{7}\sum_{q=0}^{7} B_{pq} \left[ \sum_{i=0,2}^{5-m}\sum_{j=-n}^{-1}\left(W\cos\frac{(2i+1)k\pi}{16}\cos\frac{(2j+17)l\pi}{16}\right) + \frac{1}{2}\sum_{j=-n}^{-1}\left(\cos\frac{15p\pi}{16}\cos\frac{q\pi}{16}\cos\frac{(j+n+1)q\pi}{8}\cos\frac{(15-2m)k\pi}{16}\cos\frac{(2j+17)l\pi}{16}\right) + \right.$$

$$\frac{1}{2}\sum_{i=0,2}^{5-m}\left(\cos\frac{(2i+2m+3)p\pi}{16}\cos\frac{p\pi}{8}\cos\frac{q\pi}{16}\cos\frac{(2i+1)k\pi}{16}\cos\frac{(15-2n)l\pi}{16}\right) + \left(\frac{1}{4}\cos\frac{15p\pi}{16}\cos\frac{q\pi}{16}\cos\frac{(15-2m)k\pi}{16}\cos\frac{(15-2n)l\pi}{16}\right)\Bigg] +$$

(61)

-continued $$\sum_{p=0}^{7}\sum_{q=0}^{7}C_{pq}\left[\sum_{i=-m+1}^{-2}\sum_{j=0}^{6-n}\left(W\cos\frac{(2i+17)k\pi}{16}\cos\frac{(2j+1)l\pi}{16}\right)+\frac{1}{2}\sum_{j=0}^{6-n}\left(\cos\frac{3p\pi}{16}\cos\frac{q\pi}{16}\cos\frac{(j+n+1)q\pi}{8}\cos\frac{(15-2m)k\pi}{16}\cos\frac{(2j+1)l\pi}{16}\right)\right]+$$

$$\frac{1}{2}\sum_{i=-m+1}^{-2}\left(\cos\frac{(2i+2m+3)p\pi}{16}\cos\frac{p\pi}{8}\cos\frac{15q\pi}{16}\cos\frac{(2i+17)k\pi}{16}\cos\frac{(15-2n)l\pi}{16}\right)+\frac{1}{4}\left(\cos\frac{3p\pi}{16}\cos\frac{15q\pi}{16}\cos\frac{(15-2m)k\pi}{16}\cos\frac{(15-2n)l\pi}{16}\right)\right]+$$

$$\sum_{p=0}^{7}\sum_{q=0}^{7}D_{pq}\left[\sum_{i=-m+1}^{-2}\sum_{j=-n}^{-1}\left(W\cos\frac{(2i+17)k\pi}{16}\cos\frac{(2j+1)l\pi}{16}\right)+\frac{1}{2}\sum_{j=-n}^{-1}\left(\cos\frac{3p\pi}{16}\cos\frac{q\pi}{16}\cos\frac{(j+n+1)q\pi}{8}\cos\frac{(15-2m)k\pi}{16}\cos\frac{(2j+17)l\pi}{16}\right)\right]+$$

$$\frac{1}{2}\sum_{i=-m+1}^{-2}\left(\cos\frac{(2i+2m+3)p\pi}{16}\cos\frac{p\pi}{8}\cos\frac{q\pi}{16}\cos\frac{(2i+17)k\pi}{16}\cos\frac{(15-2n)l\pi}{16}\right)+\left(\frac{1}{4}\cos\frac{3p\pi}{16}\cos\frac{q\pi}{16}\cos\frac{(15-2m)k\pi}{16}\cos\frac{(15-2n)l\pi}{16}\right)\right]+$$

$$\sum_{p=0}^{7}\sum_{q=0}^{7}A'_{pq}\left[\sum_{i=0}^{4-m'}\sum_{j=0}^{6-n'}\left(W'\cos\frac{(2i+3)k\pi}{16}\cos\frac{(2j+1)l\pi}{16}\right)+\frac{1}{2}\sum_{j=0}^{6-n'}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)\right]+$$

$$\frac{1}{2}\sum_{j=0,2}^{4-m'}\left(\cos\frac{(2i+2m'+3)p\pi}{16}\cos\frac{p\pi}{8}\cos\frac{15q\pi}{16}\cos\frac{(2i+3)k\pi}{16}\cos\frac{(15-2n')l\pi}{16}\right)+\frac{1}{4}\left(\cos\frac{13p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}B'_{pq}\left[\sum_{i=0,2}^{4-m'}\sum_{j=-n'}^{-1}\left(W'\cos\frac{(2i+3)k\pi}{16}\cos\frac{(2j+17)l\pi}{16}\right)+\frac{1}{2}\sum_{j=-n'}^{-1}\left(\cos\frac{13p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)\right]+$$

$$\frac{1}{2}\sum_{i=0,2}^{4-m'}\left(\cos\frac{(2i+2m'+3)p\pi}{16}\cos\frac{p\pi}{8}\cos\frac{q\pi}{16}\cos\frac{(2j+3)k\pi}{16}\cos\frac{(15-2n')l\pi}{16}\right)+\frac{1}{4}\left(\cos\frac{13p\pi}{16}\cos\frac{q\pi}{16}\cos\frac{(17-2m')k\pi}{16}\cos\frac{(15-2n')l\pi}{16}\right)\right]+$$

$$\sum_{p=0}^{7}\sum_{q=0}^{7}C'_{pq}\left[\sum_{i=-m'}^{-2}\sum_{j=0}^{6-n'}\left(W'\cos\frac{(2i+19)k\pi}{16}\cos\frac{(2j+1)l\pi}{16}\right)+\frac{1}{2}\sum_{j=0}^{6-n'}\left(\cos\frac{p\pi}{16}\cos\frac{q\pi}{16}\cos\frac{(j+n'+1)q\pi}{8}\cos\frac{(15-2m')k\pi}{16}\cos\frac{(2j+1)l\pi}{16}\right)\right]+$$

$$\frac{1}{2}\sum_{i=-m'}^{-2}\left(\cos\frac{(2i+2m'+3)p\pi}{16}\cos\frac{p\pi}{8}\cos\frac{15q\pi}{16}\cos\frac{(2i+19)k\pi}{16}\cos\frac{(15-2n')l\pi}{16}\right)+\frac{1}{4}\left(\cos\frac{p\pi}{16}\cos\frac{15q\pi}{16}\cos\frac{(15-2m')k\pi}{16}\cos\frac{(15-2n')l\pi}{16}\right)\right]+$$

$$\sum_{p=0}^{7}\sum_{q=0}^{7}D'_{pq}\left[\sum_{i=-m'}^{-2}\sum_{j=-n'}^{-1}\left(W'\cos\frac{(2i+19)k\pi}{16}\cos\frac{(2j+1)l\pi}{16}\right)+\frac{1}{2}\sum_{j=-n'}^{-1}\left(\cos\frac{p\pi}{16}\cos\frac{q\pi}{16}\cos\frac{(j+n'+1)q\pi}{8}\cos\frac{(15-2m')k\pi}{16}\cos\frac{(2j+17)l\pi}{16}\right)\right]+$$

$$\frac{1}{2}\sum_{i=-m'}^{-2}\left(\cos\frac{(2i+2m'+3)p\pi}{16}\cos\frac{p\pi}{8}\cos\frac{q\pi}{16}\cos\frac{(2i+19)k\pi}{16}\cos\frac{(15-2n')l\pi}{16}\right)+\frac{1}{4}\left(\cos\frac{p\pi}{16}\cos\frac{q\pi}{16}\cos\frac{(15-2m')k\pi}{16}\cos\frac{(15-2n')l\pi}{16}\right)\right]$$

The summation terms including $A_{pq}$, $B_{pq}$, $C_{pq}$, and $D_{pq}$ in expression (61) represent the e→o portion of the frame composite macro block E, while the summation terms including $a'_{pq}$, $B'_{pq}$, $C'_{pq}$, and $D'_{pq}$ in expression (61) represent the o→e portion of the frame composite macro block E.

Using expression (61), the motion compensated frame macro block E can be derived for diagonal half-pel accuracy when the odd and even fields are encoded based on the even and odd fields, respectively, of the anchor frame.

With field motion compensation, both motion vectors do not always have the same accuracy, half or full-pel, in the same direction. For instance, the odd field portion vector could have full-pel accuracy, while the even field motion vector has half-pel accuracy in the horizontal direction. As another example, the odd field could have half-pel accuracy in the horizontal direction, while the even field motion vector has half-pel accuracy in the vertical direction.

The composite macro block expressions for these instances can be readily generated from those portions of the previously discussed expressions corresponding to the motion vectors. For instance, if the odd field is encoded based on the previous odd field and the motion vector therefor has half-pel accuracy in the horizontal direction, then the top half of expression (35) represents the first part of the frame composite macro block $e_{ij}$, while the summation terms $A_{pq}$, $B_{pq}$, $C_{pq}$, and $D_{pq}$ from expression (36) are used to generate the first part of the frame composite macro block $E_{kl}$. Next, if the even field is encoded based on the previous even field and the motion vector therefore has half-pel accuracy in the vertical direction, then the bottom half of expression (49) represents the second part of the frame composite macro block $e_{ij}$, while the summation terms $A'_{pq}$, $B'_{pq}$, $C'_{pq}$, and $D'_{pq}$ from expression (50) are used to generate then second part of the frame composite macro block $E_{kl}$.

As discussed above, B-pictures may be bi-directionally encoded. Accordingly, two motion vectors are associated with each field or frame of a bi-directionally encoded B-picture. The motion vector address generator 62 identifies and informs the composiler 68 when a picture is a bi-directionally inter-coded picture. In response, the compositer 68 forms composite anchor frame blocks with respect to each anchor frame pointed to by the motion vectors. The compositer 68 then averages the two composite macro blocks to form a weighted average composite macro block, and outputs the weighted average composite macro block to the adder 74.

The adder 74 adds the composite macro block to the macro block of the picture data currently output by the variable length decoder and dequantizer 58, or optionally the field-to-frame converter 69, to reconstruct a complete macro block. In this manner, both P-pictures and B-pictures are converted into I-pictures.

Of course, if an I-picture is currently being output by the variable length decoder and dequantizer 58, then the adder 74 will not receive anything from the compositer 68 to add thereto. The motion vector address generator 62 will have recognized the I-picture as an I-picture and disabled the compositer 68 from sending output to the adder 74.

The output of the adder 74 is received by a reformatter 78. The reformatter 78 is also connected to the memory 64 via the variable length decoder and dequantizer 66. Because all of the pictures in the HDTV signal are converted into I-pictures, if not already I-pictures, the reformatter 78 restores the order of the pictures in the digital video signal to the display order.

The reformatter 78 generates output according to the following rules: (1) if the picture received is the first anchor picture received, then no output will be sent as the output of the digital video decoder and the I-picture will be output to the memory 64 for storage; (2) if the picture received is an anchor picture but not the first anchor picture received, then the previously received anchor picture will be obtained from the memory 64 via the variable length decoder 66 and output as the output of the digital video decoder, and the current anchor frame will be output to the memory 64 for storage; and (3) if the picture received is a B-picture, then the B-picture will be immediately output.

Therefore, upon receipt of I-picture $I_1$, the reformatter 78 will output the I-picture $I_1$ to the memory 64 for storage via the quantizer 70, the variable length coder 72, and the bity stream parser 59. The next picture output by the adder 74 will be P-picture $P_1$. Since this picture is an anchor picture, the memory 64 will then store the P-picture $P_1$, albeit converted into an I-picture, under the control of the bit stream parser 59. And, the reformatter 78 will send the memory 64 a control signal to output the I-picture $I_1$ (i.e., the previous anchor picture) to the reformatter 78, and the reformatter 78 will output the I-picture $I_1$. The reformatter 78 will then receive and immediately output the B-pictures. Consequently, the output order from the reformatter 78 will be $I_1 B_1 B_2$.

Next, the P-picture $P_2$ is received and processed in the same manner as P-picture $P_1$. Consequently, the bit stream parser 59 will replace the I-picture $I_1$ with the P-picture $P_2$ in the memory 64. The reformatter 78, according to the rules discussed above, will then receive P-picture $P_1$ from the memory 64, and output P-picture $P_1$. In this manner, the reformatter 78 will output the pictures in the proper display order, and these pictures will all be I-pictures. Therefore, the digital video decoder outputs the digital video signal comprised entirely of I-pictures in the display order.

Because the digital video decoder of FIG. 2 stores anchor frames which are in the DCT domain and which have been variable length encoded and quantized, the digital video decoder of FIG. 2 significantly reduces the amount of memory required to decode digital video signals including inter-coded pictures.

The above described embodiment may have several different forms of implementation. For instance, the embodiment could be implemented using a programmed microprocessor. Alternatively, each embodiment could be implemented using hard-wired logic.

While the present invention has been described with respect to specific coding sequences, it should be understood that the present invention is not limited to the coding sequences described. Additionally, the present invention is not restricted to use with a particular digital format such as MPEG or a particular level of definition such as high definition television. Instead, the present invention may be used with any format in any application where decoding of a digital video signal is desired.

Furthermore, while the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. An apparatus for decoding a digital video signal, comprising:

means for performing motion compensation including a motion compensator for receiving a digital video signal and performing undistorted motion compensation on said digital video signal in frequency domain with sub-pel accuracy; and means for reformatting including a reformatter reformatting pictures in said digital video signal output by said motion compensation such that said pictures are in a display order.

2. The apparatus of claim 1, wherein said motion compensator forms, for each inter-coded picture in said digital video signal, a composite picture representing a reference picture corresponding to said inter-coded picture, and adds said composite picture to said inter-coded picture to perform said motion compensation.

3. The apparatus of claim 2, wherein said motion compensator comprises:

an anchor picture memory storing at least one anchor picture for forming said composite picture based on said anchor picture and motion vectors associated with said inter-coded picture.

4. The apparatus of claim 3, wherein said anchor picture memory stores two anchor frames.

5. The apparatus of claim 3, wherein said anchor picture memory stores said anchor picture as compressed bits via quantization and variable length coding of frequency domain blocks.

6. The apparatus of claim 3, wherein said anchor picture memory stores an anchor picture having most recently undergone motion compensation.

7. The apparatus of claim 2, wherein said motion compensator outputs intra-coded pictures in said digital video signal without performing motion compensation thereon.

8. The apparatus of claim 3, wherein said motion compensator outputs intra-coded pictures in said digital video signal without performing motion compensation thereon.

9. The apparatus of claim 8, wherein said anchor frame memory stores an anchor picture which is an intra-coded picture in said digital video signal received by said motion compensator.

10. The apparatus of claim 1, wherein said motion compensator performs.

11. The apparatus of claim 3, wherein said anchor picture memory stores said anchor picture in a compressed format.

12. The apparatus of claim 1, wherein said reformatter reformats said pictures in the frequency domain.

13. The apparatus of claim 3, wherein said anchor picture memory stores said anchor picture as variable length coded bits in the frequency domain.

14. An apparatus for decoding a digital video signal, comprising:

motion compensation means for receiving a digital video signal and performing motion compensation on said digital video signal in the frequency domain; and a reformatter reformatting pictures in said digital video signal output by said motion compensation means such that said pictures are in a display order; wherein said motion compensation means forms, for each inter-coded picture in said digital video signal, a composite picture in said frequency domain representing a reference picture corresponding to said inter-coded picture, and adds said composite picture to said inter-coded picture to perform said motion compensation;

said motion compensation means comprises:

an anchor picture memory storing at least one anchor picture in said frequency domain; and means for forming said composite picture based on said anchor picture and a motion vector associated with said inter-coded picture, said means for forming comprising:

motion vector generating means for separating said motion vectors from said inter-coded picture, and addressing portions of said anchor picture stored in said anchor picture memory based on said motion vectors; and a compositor synthesizing, for each motion vector, portions of said anchor picture addressed based on said motion vectors to form said composite picture.

15. The apparatus of claim 14, wherein said anchor picture memory stores said anchor picture on a macro block by macro block basis;

said motion vector generating means separates said motion vector associated with each macro block in said inter-coded picture, and addresses macro blocks of said anchor picture based on said motion vector;

said compositor synthesizes said addressed macro blocks to form a composite macro block based on said motion vector.

16. The apparatus of claim 15, wherein said motion compensation means further comprises:

an adder for adding each macro block in said inter-coded picture to a corresponding composite macro block output by said compositer.

17. The apparatus of claim 16, wherein said adder receives said digital video signal, adds each macro block in said inter-coded picture to a corresponding composite macro block output by said compositer, and outputs intra-coded pictures in said digital video signal unchanged.

18. The apparatus of claim 17, wherein said anchor picture memory stores a last two anchor pictures output from said adder.

19. The apparatus of claim 17, wherein said motion compensation means further comprises:

a quantizer for quantizing each anchor picture output by said adder;

a variable length coder variable length coding output of said quantizer;

parser means for storing output of said variable length coder in said anchor picture memory.

20. The apparatus of claim 19, wherein said quantizer quantizes each anchor picture such that distortion is eliminated.

21. An apparatus for decoding a digital video signal, comprising:

means for converting inter-coded to intra-coded pictures including a converter receiving a digital video signal and converting, in frequency domain with sub-pel accuracy, inter-coded pictures in said digital video signal into undistorted intra-coded pictures; and means for reformatting including a reformatter for reformatting pictures in said digital video signal output by said converter such that said pictures are in a display order.

22. The apparatus of claim 21, wherein said converter performs motion compensation on said inter-coded picture sin said digital video signal to convert said inter-coded pictures into intra-coded pictures.

23. The apparatus of claim 22, wherein said converter forms, for each inter-coded picture in said digital video signal, a composite picture representing a reference picture corresponding to said inter-coded picture, and adds said composite picture to said corresponding inter-coded picture to perform said motion compensation.

24. The apparatus of claim 23, wherein said motion compensator comprises:

an anchor picture memory storing at least one anchor picture;

means for forming said composite picture based on said anchor picture and motion vectors associated with said inter-coded picture.

25. The apparatus of claim 24, wherein said anchor picture memory stores said anchor picture in a compressed format.

26. The apparatus of claim 21, wherein said reformatter reformats said pictures in the frequency domain.

27. An apparatus for decoding a digital video signal, comprising:

a converter receiving a digital video signal and converting, in the frequency domain, inter-coded pictures in said digital video signal into intra-coded pictures; and a reformatter reformatting pictures in said digital video signal output by said converter such that said pictures are in a display order; wherein said converter performs motion compensation in said frequency domain on said inter-coded pictures in said digital video signal to convert said inter-coded pictures into intra-coded pictures;

said converter forms, for each inter-coded picture in said digital video signal, a composite picture in said frequency domain representing a reference picture corresponding to said inter-coded picture, and adds said composite picture to said corresponding inter-coded picture to perform said motion compensation;

said converter comprises:

an anchor picture memory storing at least one anchor picture in said frequency domain;

means for forming said composite picture based on said anchor picture and motion vectors associated with said inter-coded picture, said means for forming comprising:

motion vector generating means for separating said motion vectors from said inter-coded picture, and addressing portions of said anchor picture stored in said anchor picture memory based on said motion vectors; and a compositor synthesizing, for each motion vector, portions of said anchor picture addressed base don said motion vectors to form said composite picture.

28. The apparatus of claim 27, wherein said anchor picture memory stores said anchor picture on a macro block by macro block basis;

said motion vector generating means separates said motion vector associated with each macro block in said inter-coded picture, and addresses macro blocks of said anchor picture based on said motion vector;

said compositor synthesizes said addressed macro blocks to form a composite macro block based on said motion vector.

29. A method for decoding a digital video signal, comprising:

(a) receiving a digital video signal;

(b) performing motion compensation on said digital video signal in the frequency domain, including storing anchor pictures as compressed bits; and (c) reformatting pictures in said digital video signal output by said step (b) such that said pictures are in a display order.

30. The method of claim 29, wherein said step (b) comprises the steps of:

(b1) forming, for each inter-coded picture in said digital video signal, a composite picture representing a reference picture corresponding to said inter-coded picture; and (b2) adding said composite picture to said inter-coded picture to perform said motion compensation.

31. The method of claim 30, wherein said (b1) comprises the steps of:

(b11) storing at least one anchor picture;

(b12) forming said composite picture based on said anchor picture and motion vectors associated with said inter-coded picture.

32. The method of claim 31, wherein said step (b11) stores two anchor frames.

33. The method of claim 31, wherein said step (b11) stores said anchor picture quantized bits.

34. The method of claim 31, wherein said step (b11) stores an anchor picture having most recently undergone motion compensation.

35. The method of claim 30, wherein said step (b) further comprises the step of (b3) outputting intra-coded pictures in said digital video signal without performing motion compensation thereon.

36. The method of claim 31, wherein said step (b) further comprises the step of (b3) outputting intra-coded pictures in said digital video signal without performing motion compensation thereon.

37. The method of claim 36, wherein said step (b11) stores an anchor picture which is an intra-coded picture in said digital video signal received by said step (a).

38. The method of claim 29, wherein said step (b) performs and field motion compensation.

39. The method of claim 31, wherein said step (b11) stores said anchor picture in a compressed format.

40. The method of claim 29, wherein said pictures are reformatted in the frequency domain.

41. The method of claim 31, wherein said anchor picture is stored as variable length coded bits.

42. A method for decoding a digital video signal, comprising:

(a) receiving a digital video signal;

(b) performing motion compensation on said digital video signal in the frequency domain; and (c) reformatting pictures in said digital video signal output by said step (b) such that said pictures are in a display order; wherein said step (b) comprises the steps of:

(b1) forming, for each inter-coded picture in said digital video signal, a composite picture in said frequency domain representing a reference picture corresponding to said inter-coded picture; and (b2) adding said composite picture to said inter-coded picture to perform said motion compensation, wherein said (b1) comprises the steps of:

(b11) storing at least one anchor picture in said frequency domain; and (b12) forming said composite picture based on said anchor picture and motion vectors associated with said inter-coded picture, said step (b12) comprises the steps of:

(b121) separating said motion vectors from said inter-coded picture;

(b122) addressing portions of said anchor picture stored in said step (b11) based on said motion vectors; and (b123) synthesizing, for each motion vector, portions of said anchor picture addressed based on said motion vectors to form said composite picture.

43. The method of claim 42, wherein said step (b11) stores said anchor picture on a macro block by macro block basis;

said step (b121) separates said motion vector associated with each macro block in said inter-coded picture;

said step (b122) addresses macro blocks of said anchor picture based on said motion vector;

said step (b123) synthesizes, in said frequency domain, said addressed macro blocks to form a composite macro block based on said motion vector.

44. The method of claim 43, wherein step (b2) adds each macro block in said inter-coded picture to a corresponding composite macro block output by said step (b123).

45. The method of claim 44, wherein said step (b2) comprises the steps of:
(b21) receiving said digital video signal;
(b22) adding each macro block in said inter-coded picture to a corresponding composite macro block output by said step (b123); and
(b23) outputting intra-coded pictures in said digital video signal unchanged.

46. The method of claim 45, wherein
said step (b11) stores a last two anchor pictures output from said adder.

47. The method of claim 46, wherein said step (b) further comprises:
(b3) quantizing each anchor picture output by said step (b2);
(b4) variable length coding output of said step (b3); and wherein
said step (b11) stores output of said step (b4).

48. The method of claim 47, wherein said step (b3) quantizes each anchor picture such that distortion is eliminated.

49. A method for decoding a digital video signal, comprising:
(a) receiving a digital video signal;
(b) converting, in the frequency domain, inter-coded pictures in said digital video signal into intra-coded pictures, including storing anchor pictures as compressed bits; and
(c) reformatting pictures in said digital video signal output by said step (b) such that said pictures are in a display order.

50. The method of claim 49, wherein said step (b) performs motion compensation on said inter-coded pictures in said digital video signal to convert said inter-coded pictures into intra-coded pictures.

51. The method of claim 50, wherein said step (b) comprises the steps of:
(b1) forming, for each inter-coded picture in said digital video signal, a composite picture representing a reference picture corresponding to said inter-coded picture; and
(b2) adding said composite picture to said inter-coded picture to perform said motion compensation.

52. The method of claim 51, wherein said (b1) comprises the steps of:
(b11) storing at least one another picture;
(b12) forming said composite picture based on said anchor picture and motion vector associated with said inter-coded picture.

53. The method of claim 52, wherein said step (b11) stores said anchor picture in a compressed format.

54. The method of claim 49, wherein said pictures are reformatted in the frequency domain.

55. A method for decoding a digital video signal, comprising:
(a) receiving a digital video signal;
(b) converting, in the frequency domain, inter-coded pictures in said digital video signal into intra-coded pictures; and
(c) reformatting pictures in said digital video signal output by said step (b) such that said pictures are in a display order; wherein
said step (b) performs motion compensation in said frequency domain on said inter-coded pictures in said digital video signal to convert said inter-coded pictures intra-=coded pictures, and comprises the steps of:
(b1) forming, for each inter-coded picture in said digital video signal, a composite picture in said frequency domain representing a reference picture corresponding to said inter-coded picture; and
(b2) adding said composite picture to said inter-coded picture to perform said motion compensation;
wherein said (b1) comprises the step of:
(b11) storing at least one anchor picture in said frequency domain;
(b12) forming said composite picture based on said anchor picture and motion vectors associated with said inter-coded picture; and
(b121) separating said motion vectors from said inter-coded picture;
(b122) addressing portions of said anchor picture stored in said step (b11) based on said motion vectors;
(b123) synthesizing, for each motion vector, portions of said anchor picture addressed based on said motion vectors to form said composite picture.

56. The method of claim 55, wherein
said step (b11) stores said anchor picture on a macro block by macro block basis;
said step (b121) separates said motion vector associated with each macro block in said inter-coded picture;
said step (b122) addresses macro blocks of said anchor picture based on said motion vector;
said step (b123) synthesizes, in said frequency domain, said addressed macro blocks to form a composite macro block based on said motion vector.

57. An apparatus for decoding a digital video signal, comprising:
motion compensation means for receiving a digital video signal and performing motion compensation on said digital video signal; and
a reformatter reformatting pictures in said digital video signal output by said motion compensation means such that said pictures are in a display order; wherein
said motion compensation means forms, for each inter-coded picture in said digital video signal, a composite picture representing a reference picture corresponding to said inter-coded picture, and adds said composite picture to said inter-coded picture to perform said motion compensation;
said motion compensation means comprises:
an anchor picture memory storing at least one anchor picture; and
means for forming said composite picture based on said anchor picture and motion vectors associated with said inter-coded picture; and
said anchor picture memory stores said anchor pictures as compressed bits via quantization and variable length coding.

58. A method for decoding a digital video signal, comprising:
- (a) receiving a digital video signal;
- (b) performing motion compensation on said digital video signal; and
- (c) reformatting pictures in said digital video signal output by said step (b) such that said pictures are in a display order; wherein said step (b) comprises the steps:
- (b1) forming, for each inter-coded picture in said digital video signal, a composite picture representing a reference picture corresponding to said inter-coded picture; and
- (b2) adding said composite picture to said inter-coded picture to perform said motion compensation;

said (b1) comprises the steps of:
- (b11) storing at least one anchor picture; and
- (b12) forming said composite picture based on said anchor picture and motion vectors associated with said inter-coded picture; and said step (b11) stores said anchor pictures as compressed bits via quantization and variable length coding.

* * * * *